United States Patent
Kim et al.

(10) Patent No.: US 12,041,627 B2
(45) Date of Patent: Jul. 16, 2024

(54) METHOD FOR PERFORMING UPLINK TRANSMISSION USING PRECONFIGURED RESOURCE IN WIRELESS COMMUNICATION SYSTEM, AND DEVICE THEREFOR

(71) Applicant: LG ELECTRONICS INC., Seoul (KR)

(72) Inventors: Jaehyung Kim, Seoul (KR); Changhwan Park, Seoul (KR); Seokmin Shin, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 463 days.

(21) Appl. No.: 17/440,948

(22) PCT Filed: Mar. 30, 2020

(86) PCT No.: PCT/KR2020/004338
§ 371 (c)(1),
(2) Date: Sep. 20, 2021

(87) PCT Pub. No.: WO2020/197355
PCT Pub. Date: Oct. 1, 2020

(65) Prior Publication Data
US 2022/0232608 A1    Jul. 21, 2022

(30) Foreign Application Priority Data
Mar. 28, 2019   (KR) .................. 10-2019-0036399

(51) Int. Cl.
*H04W 72/12* (2023.01)
*H04W 68/00* (2009.01)
*H04W 72/23* (2023.01)

(52) U.S. Cl.
CPC ......... *H04W 72/23* (2023.01); *H04W 68/005* (2013.01)

(58) Field of Classification Search
CPC . H04W 72/23; H04W 72/569; H04W 72/044; H04W 72/53; H04W 72/20; H04W 76/27
See application file for complete search history.

(56) References Cited

U.S. PATENT DOCUMENTS

| 2014/0098761 A1* | 4/2014 | Lee ............... H04L 5/0055 370/329 |
| 2017/0208571 A1 | 7/2017 | Lee et al. |
| 2018/0376422 A1 | 12/2018 | Shu et al. |

FOREIGN PATENT DOCUMENTS

| EP | 3823384 | 5/2021 |
| KR | 10-2021-0114984 | 9/2021 |

OTHER PUBLICATIONS

Extended European Search Report in European Application No. 20778264.0, dated Mar. 28, 2022, 13 pages.
(Continued)

*Primary Examiner* — Jamal Javaid
(74) *Attorney, Agent, or Firm* — Fish & Richardson P.C.

(57) ABSTRACT

Disclosed is a method for performing preconfigured uplink resource (PUR) transmission by means of a PUR in a wireless communication system. The method performed by a terminal comprises the steps of: receiving information relating to PUR transmission from a base station; receiving information relating to a first paging SS from the base station; performing the PUR transmission to the base station; and receiving downlink control information (DCI) in accordance with the PUR transmission from the base station.

20 Claims, 32 Drawing Sheets

(56) References Cited

OTHER PUBLICATIONS

Huawei et al., "Feature lead summary of Support for transmission in preconfigured UL resources," 3GPP TSG RAN WG1 Meeting #96, R1-1903254, Athens, Greece, Feb. 25-Mar. 1, 2019, 23 pages.
NTT Docomo, Inc., "Discussion on preconfigured UL resources in NB-Iot," 3GPP TSG RAN WG1 #96, R1-1902779, Athens, Greece, Feb. 25-Mar. 1, 2019, 4 pages.
ZTE, "Support for transmission in preconfigured UL resources for NB-Iot," 3GPP TSG RAN WG1 Meeting #96, R1-1901866, Athens, Greece, Feb. 25-Mar. 1, 2019, 11 pages.
Ericsson, "PUR UE multiplexing," R2-1900738, Presented at 3GPP TSG-RAN WG2 #105, Athens, Greece, Feb. 25-Mar. 1, 2019, 5 pages.
Ericsson, "Support for transmission in preconfigured UL resources in NB-Iot," R1-1901747, Presented at 3GPP TSG-RAN WG1 Meeting #96, Athens, Greece Feb. 25-Mar. 1, 2019, 17 pages.
PCT International Search Report in International Appln. No. PCT/KR2020/004338, dated Jul. 17, 2020, 5 pages (with English translation).
Sierra Wireless, "Pre-configured UL Resources Design Considerations," R2-1817940, Presented at 3GPP TSG RAN WG2 Meeting #104, Spokane, USA, Nov. 12-16, 2018, 9 pages.
ZTE, "Support for transmission in preconfigured UL resources for MTC," R1-1901858, Presented at 3GPP TSG RAN WG1 Meeting #96, Athens, Greece, Feb. 25-Mar. 1, 2019, 13 pages.
Notice of Allowance in Korean Appln. No. 10-2021-7028607, mailed on Jan. 9, 2024, 20 pages (with English translation).
Sequans Communications, "Consideration for preconfigured uplink resources (PUR)," 3GPP TSG RAN WG1 Meeting #96, R1-1904747, Xi'An, China, Apr. 8-12, 2019, 6 pages.
ZTE Corporation, "Further consideration on UL aspects of D-PUR in Idle," 3GPP TSG-RAN2 meeting#105, R2-1901477, Athens, Greece, Feb. 25-Mar. 1, 2019, 11 pages.
ZTE Corporation, Sanechips, "Further consideration on DL aspects of D-PUR in Idle," 3GPP TSG-RAN2 meeting#105, R2-1901479, Athens, Greece, Feb. 25-Mar. 1, 2019, 8 pages.

* cited by examiner

[FIG. 1]
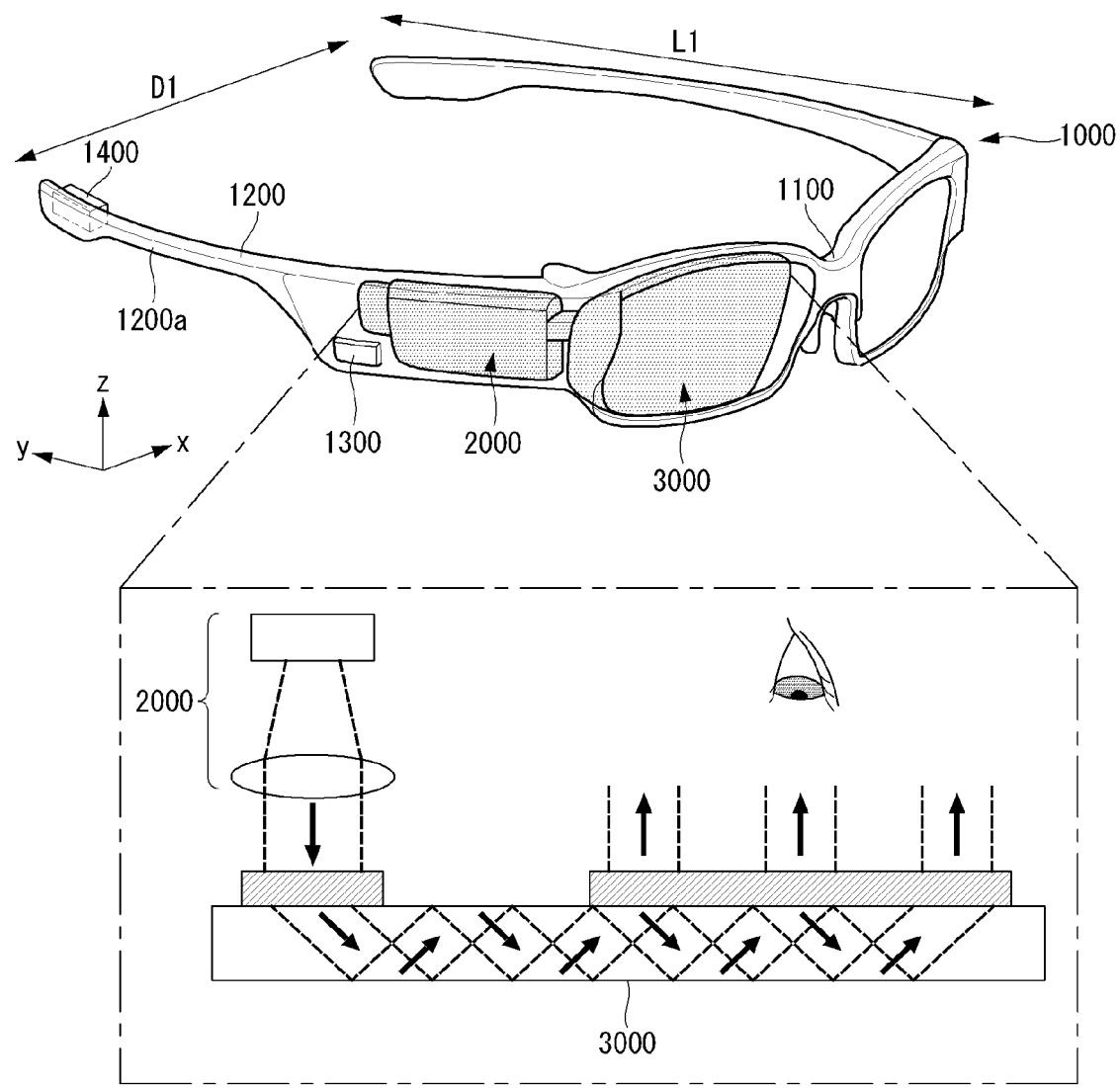

[FIG. 2]
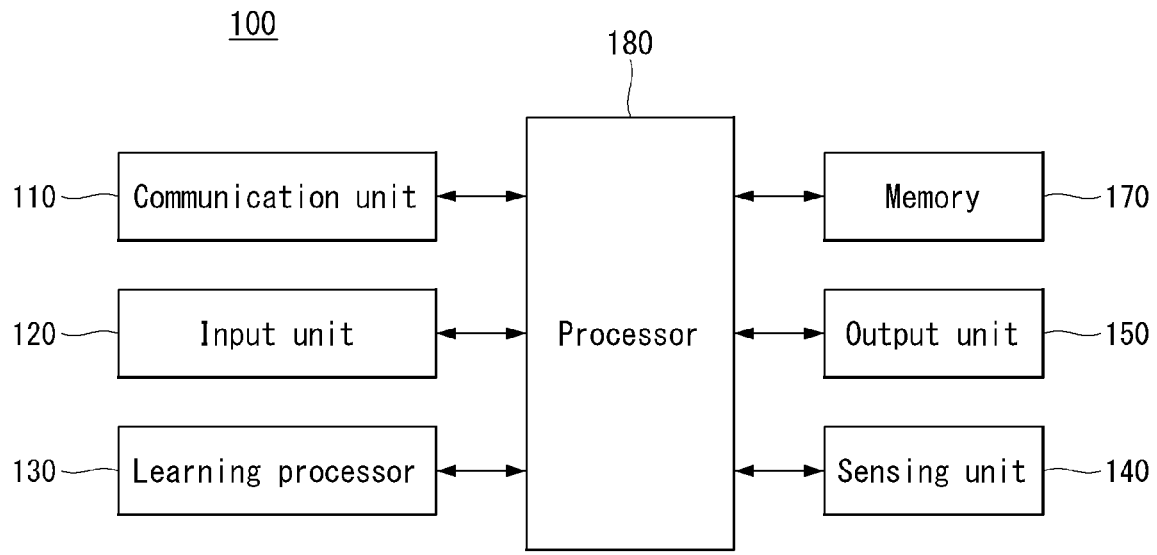
[FIG. 3]
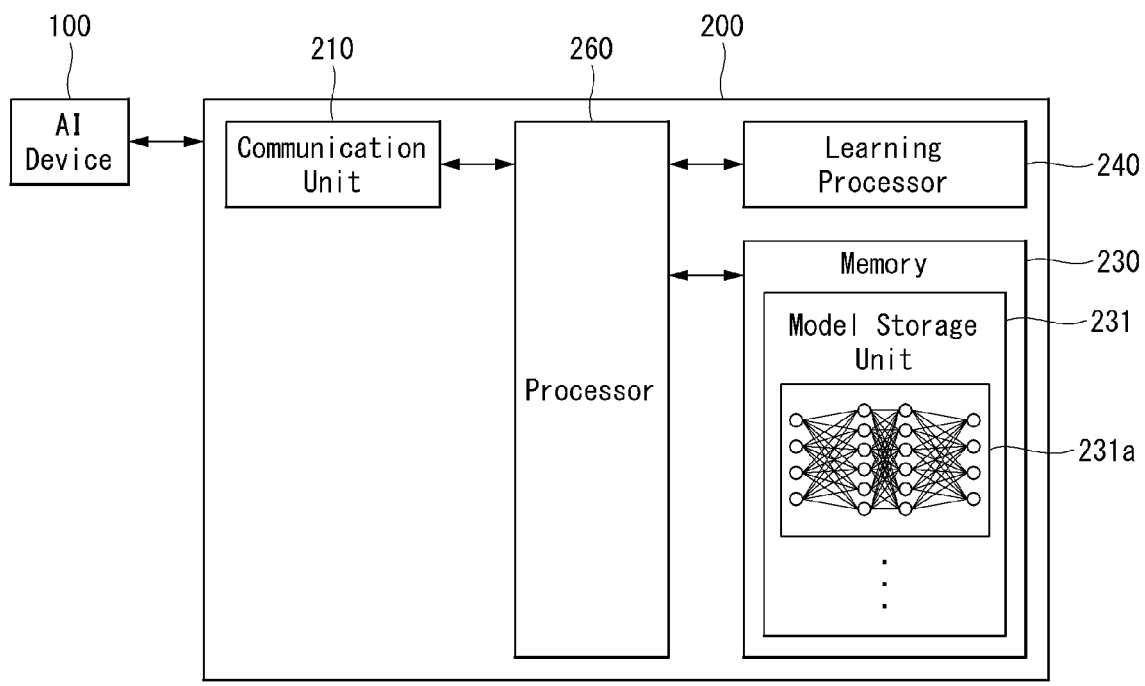

[FIG. 4]
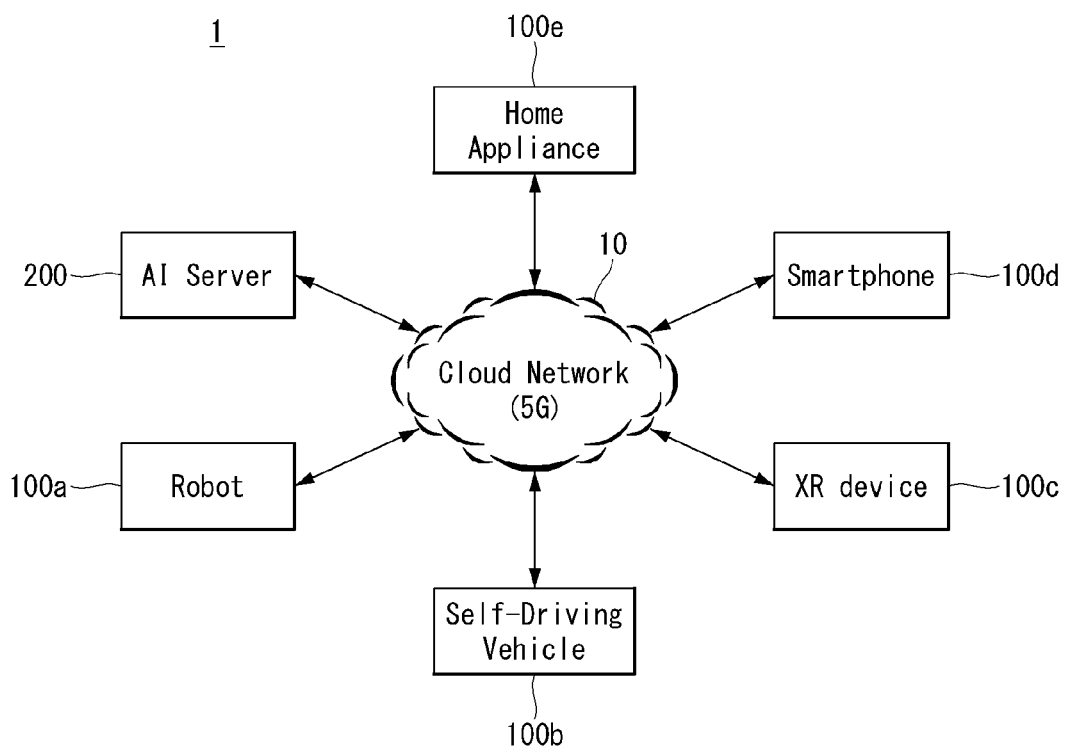

[ FIG. 5]
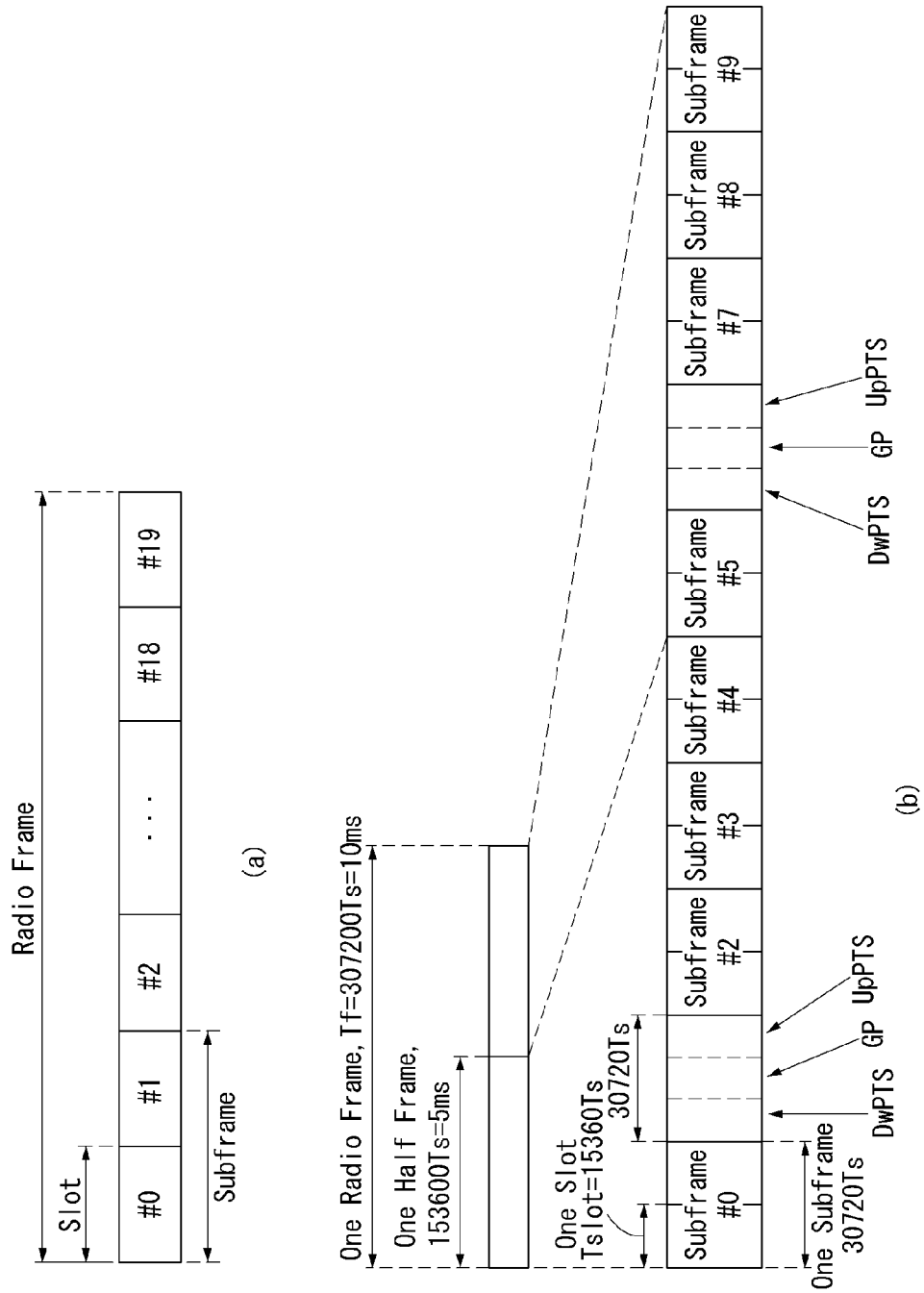

[FIG. 6]
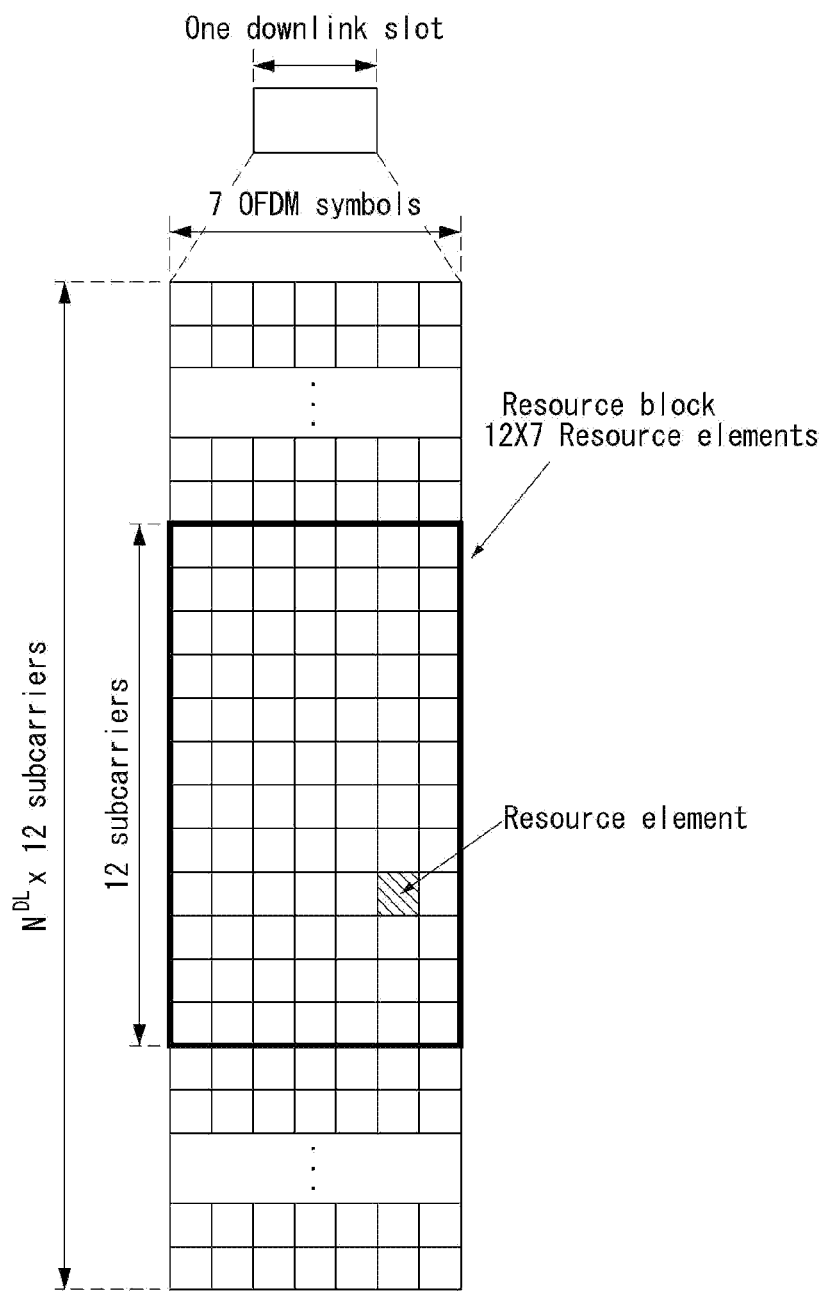

[FIG. 7]
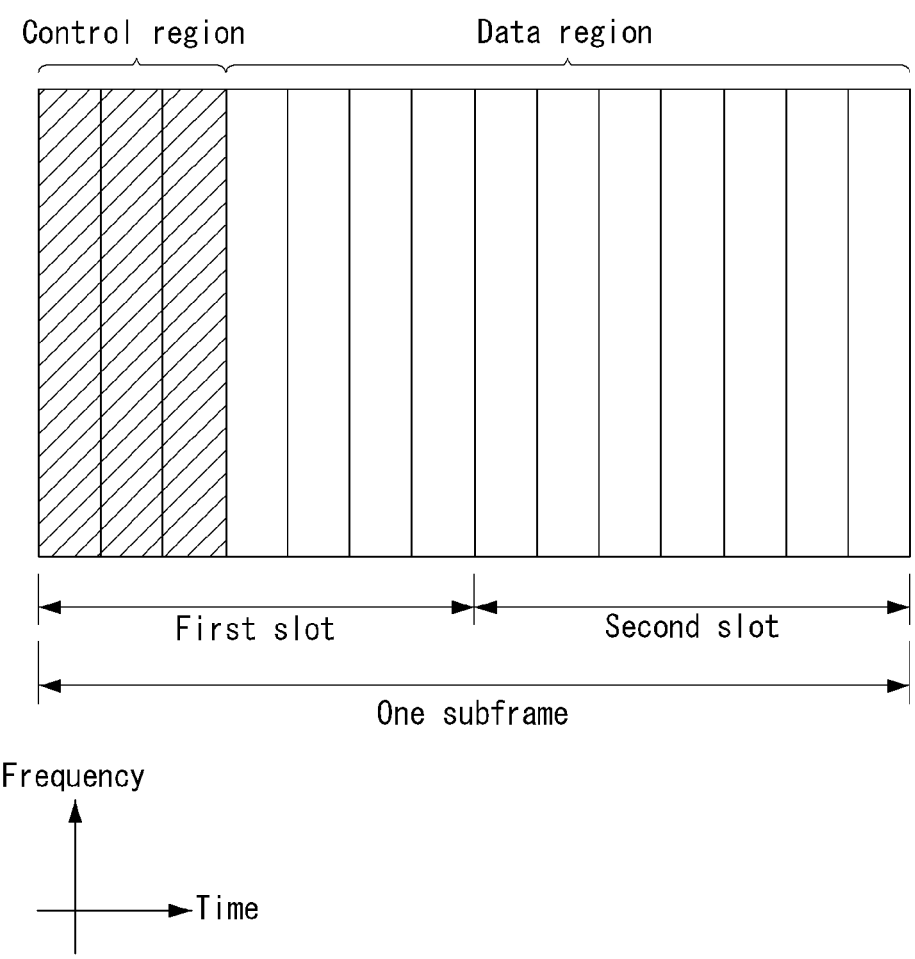

[FIG. 8]
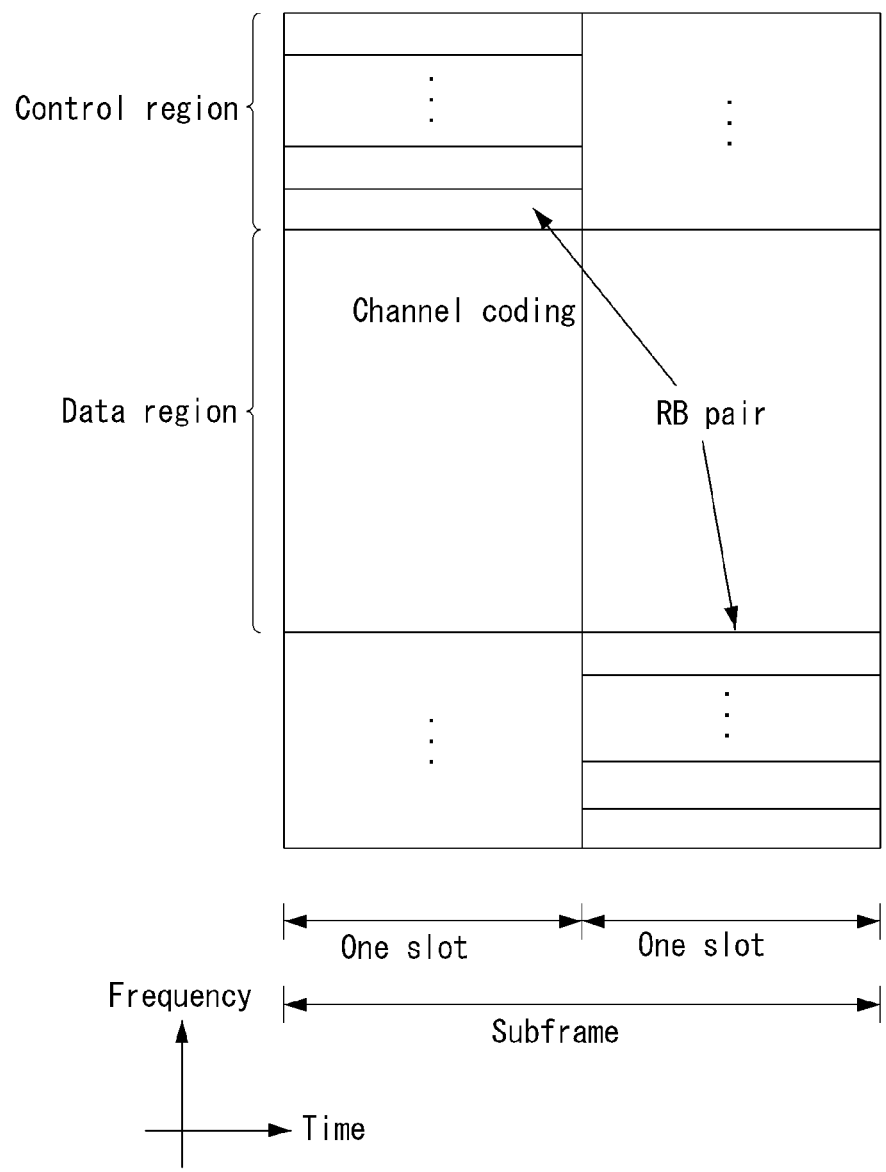

[FIG. 9]
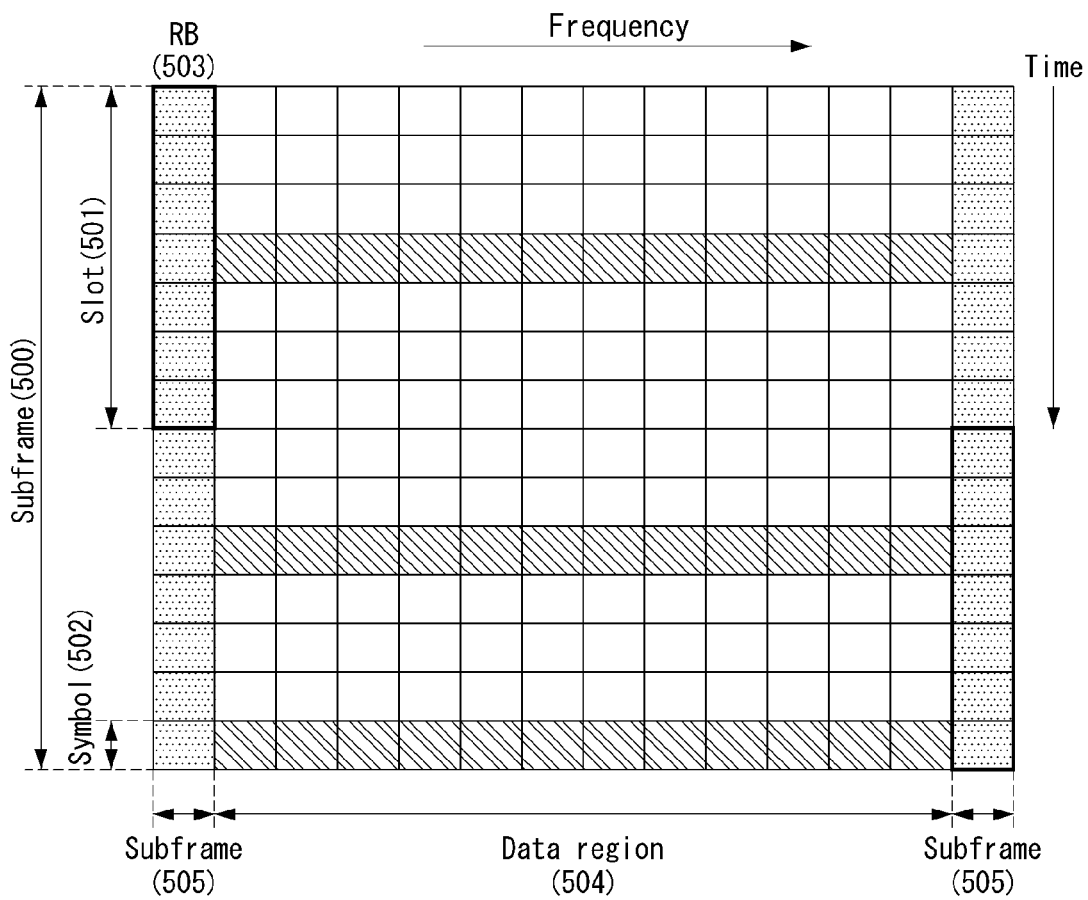

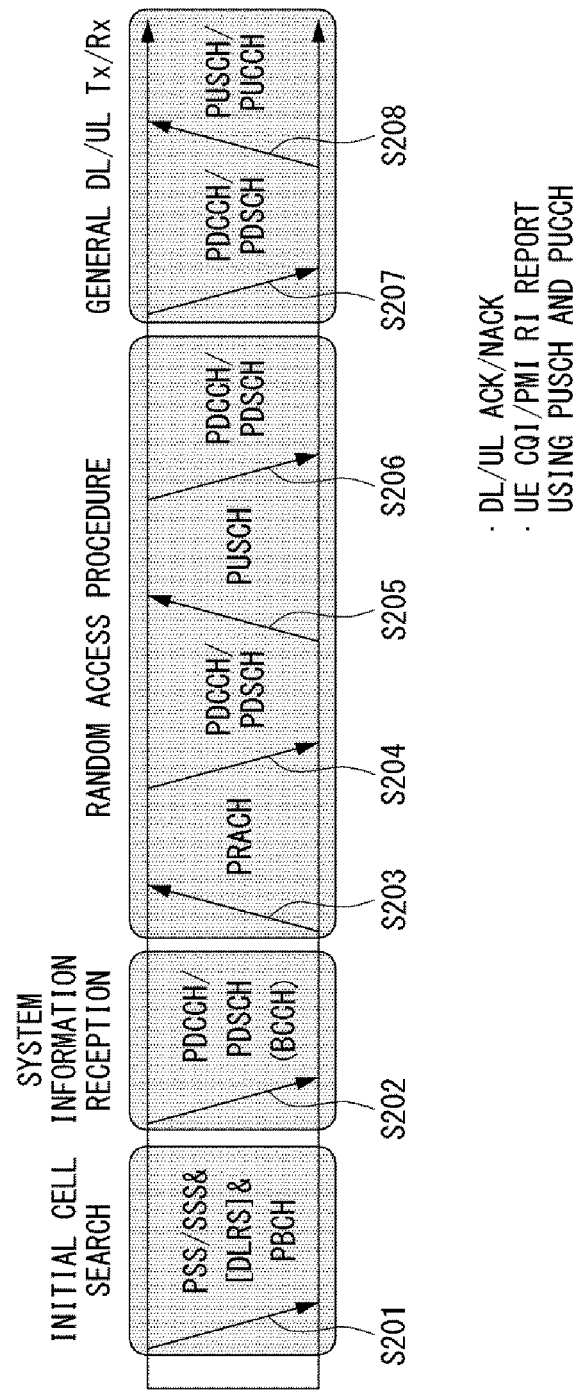
[ FIG. 10 ]

[FIG. 11]
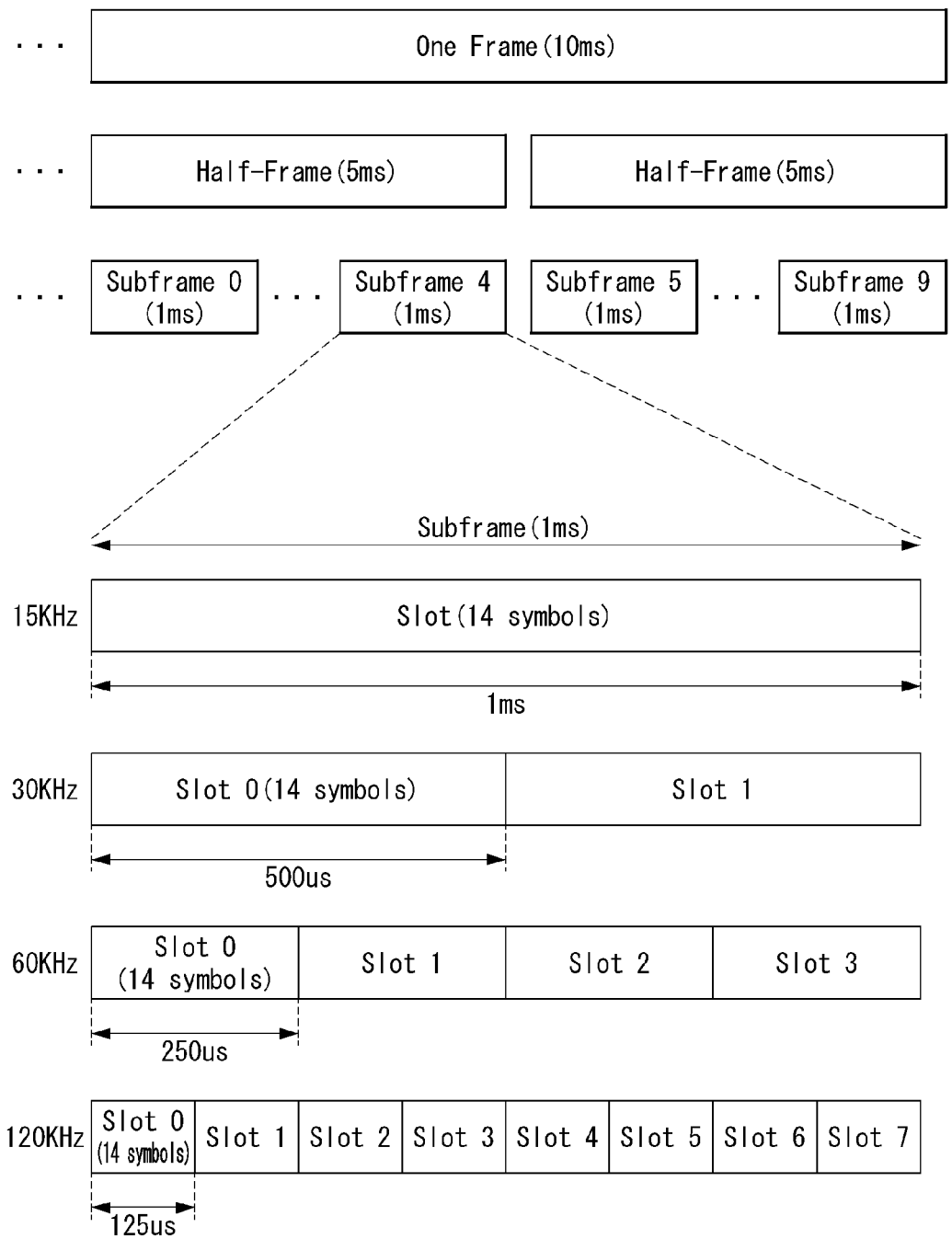

[FIG. 12]
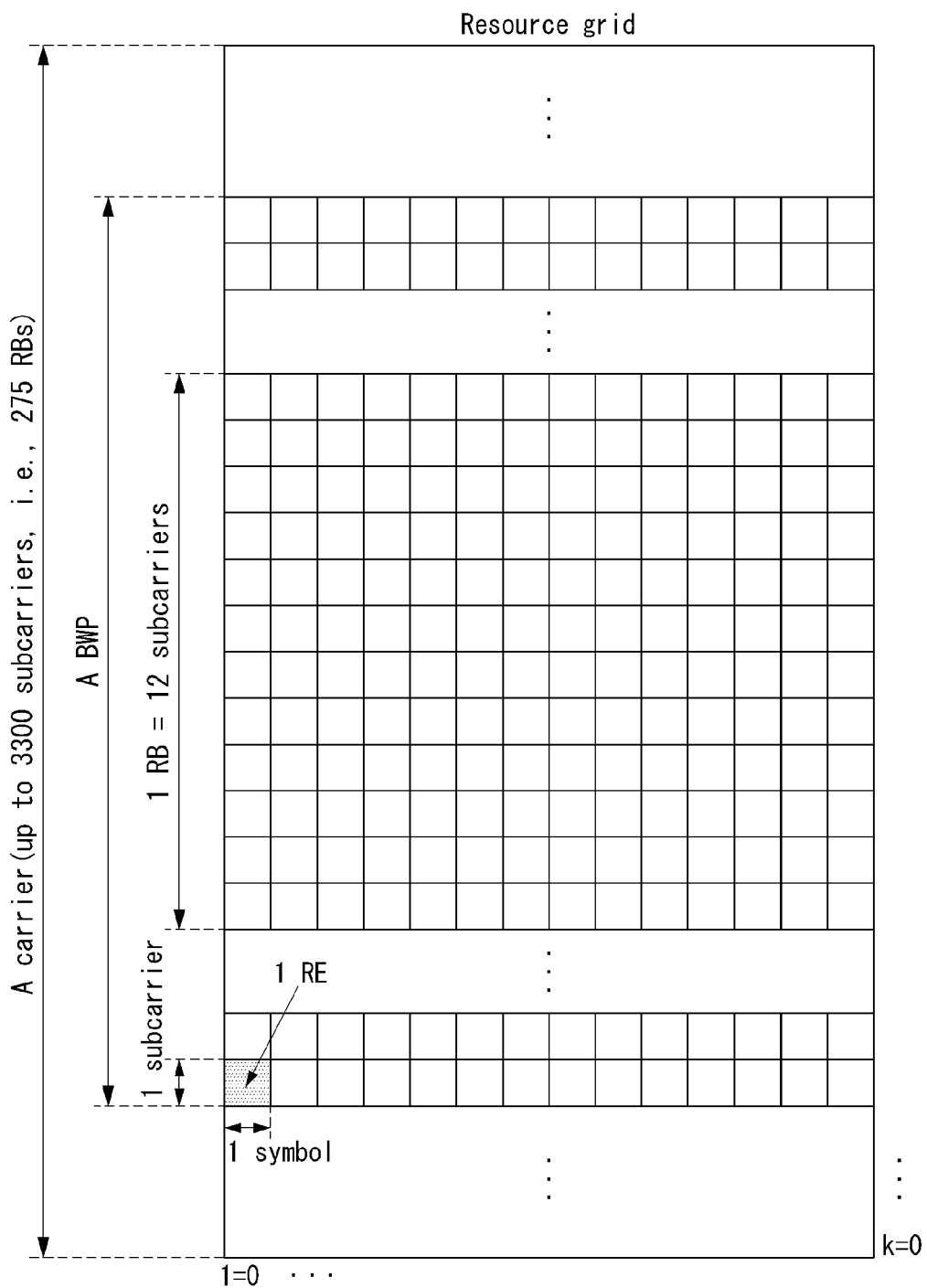

[FIG. 13]
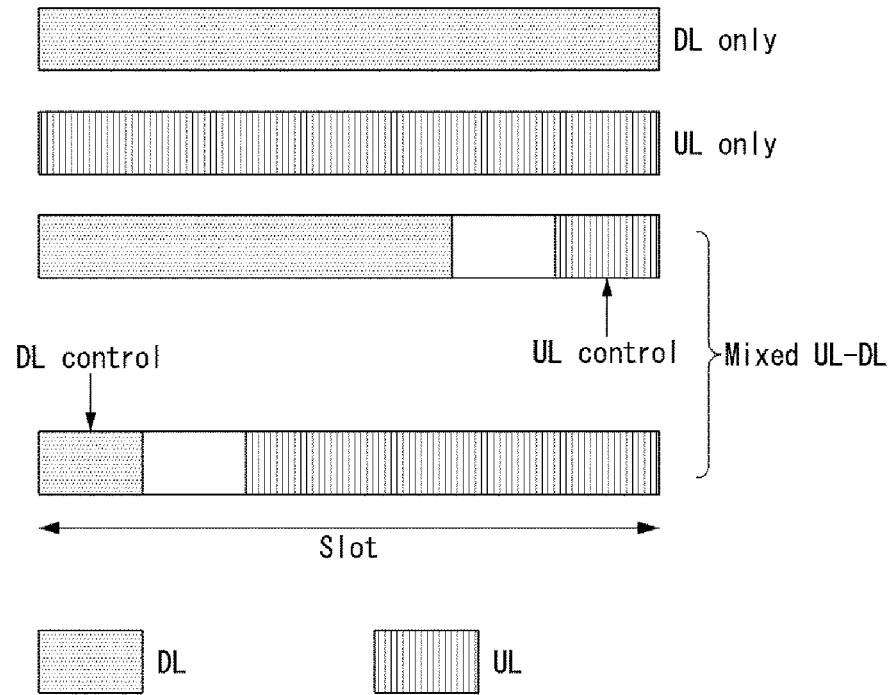
[FIG. 14]
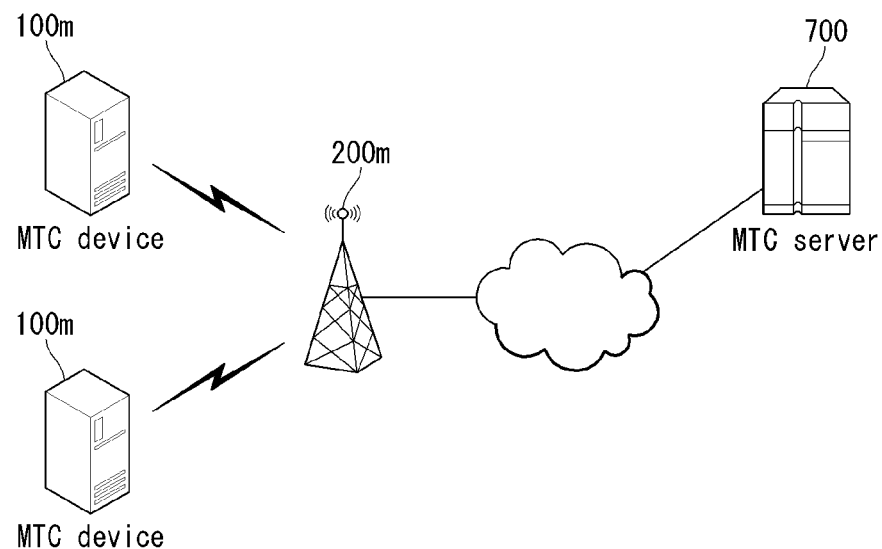

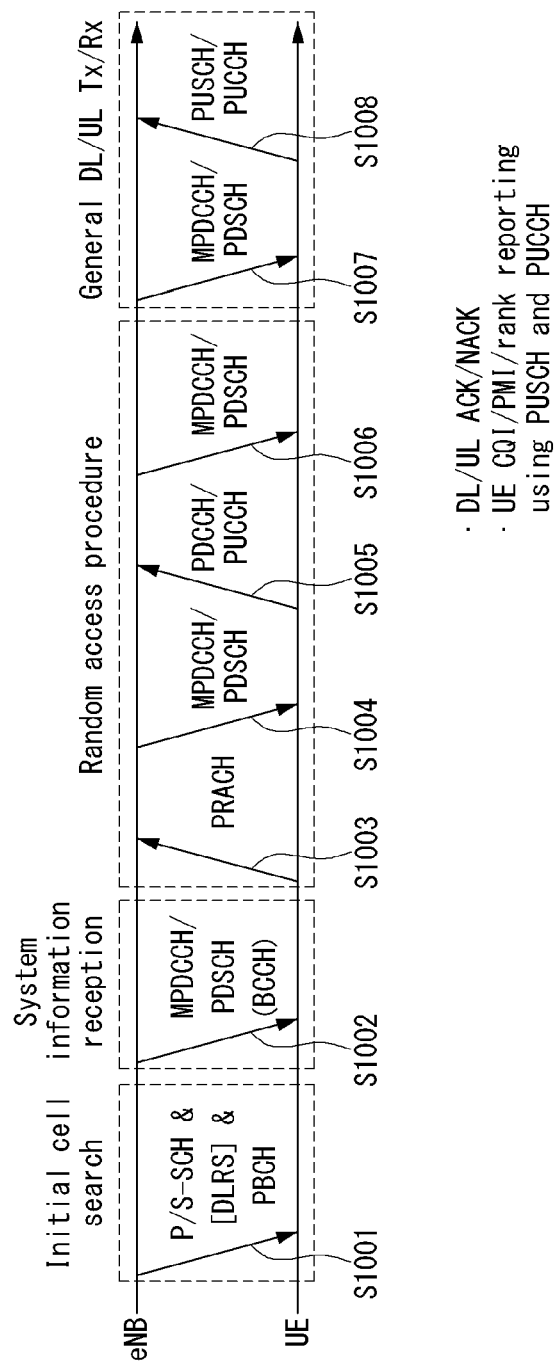
[ FIG. 15 ]

[FIG. 16]
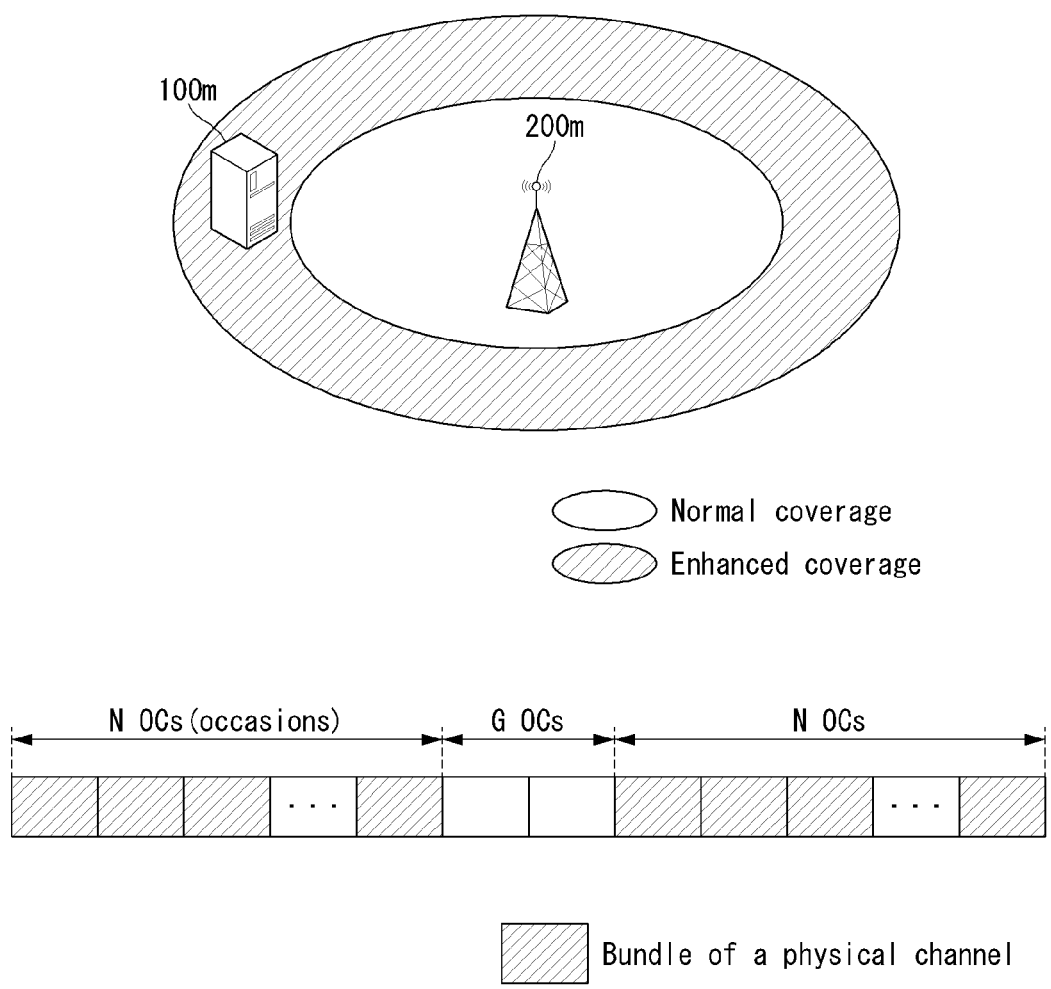

[FIG. 17]
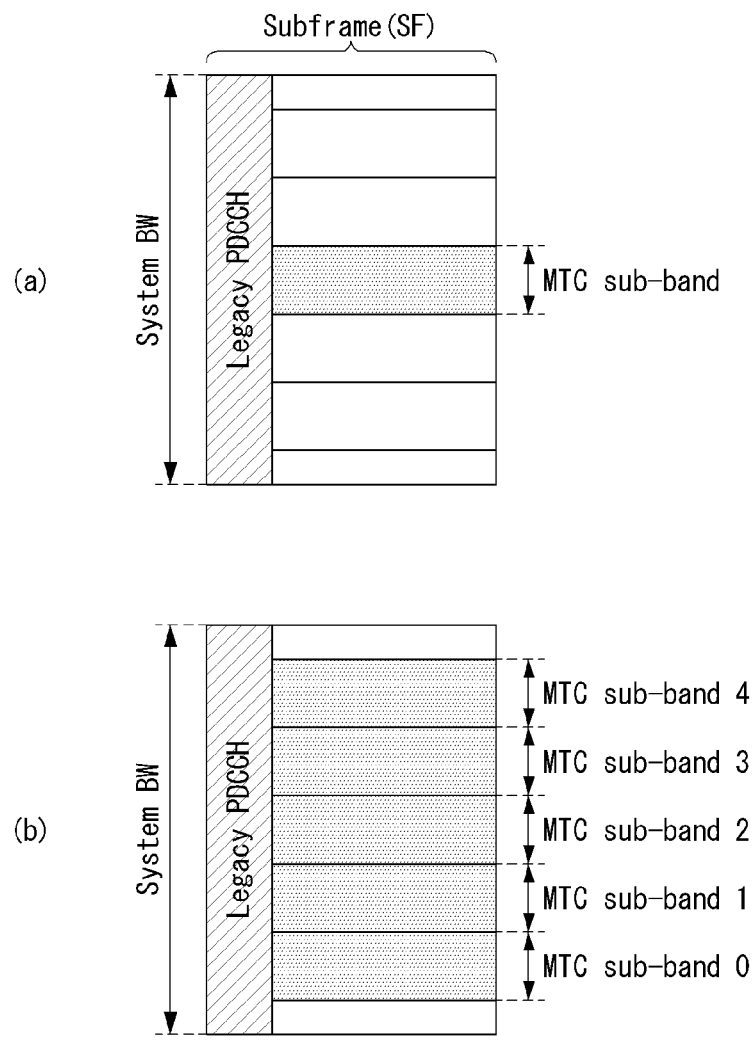

[FIG. 18]
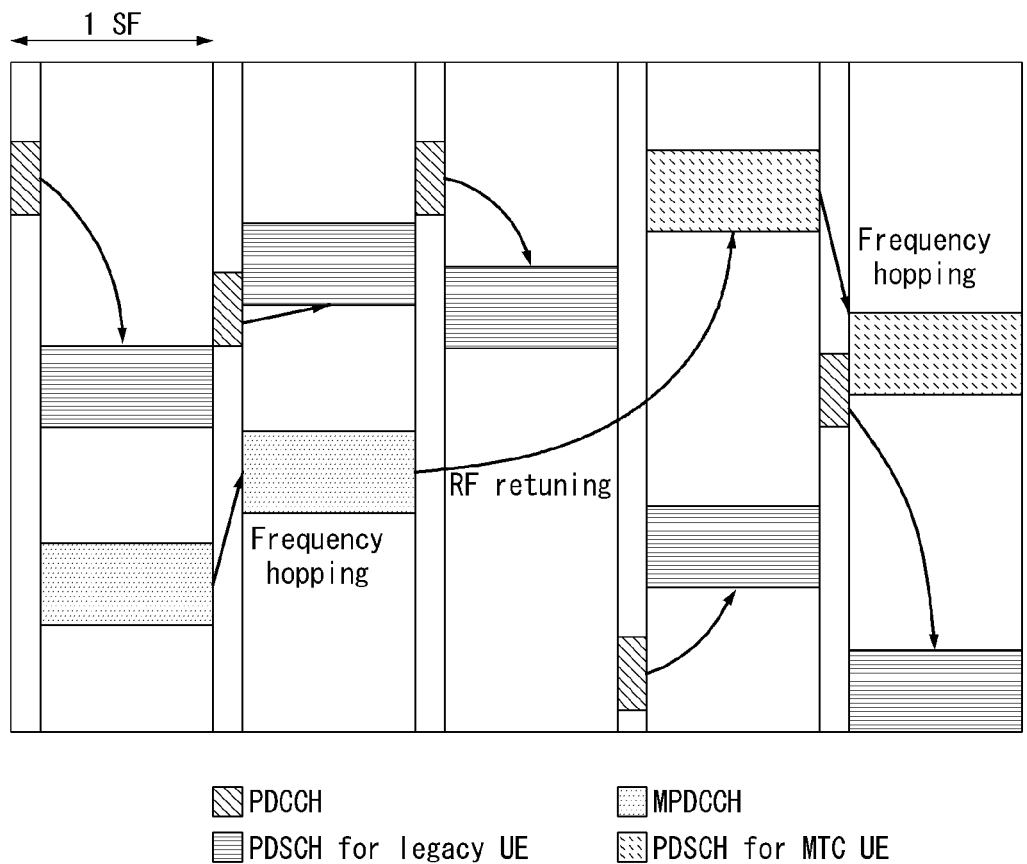

[ FIG. 19 ]
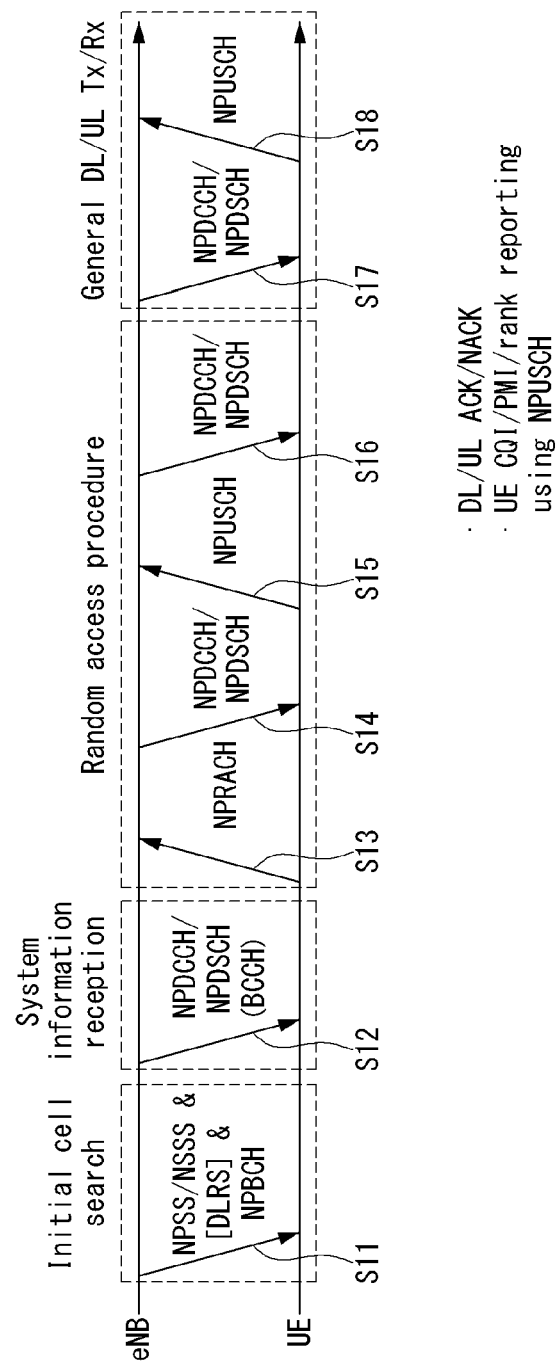

[FIG. 20]
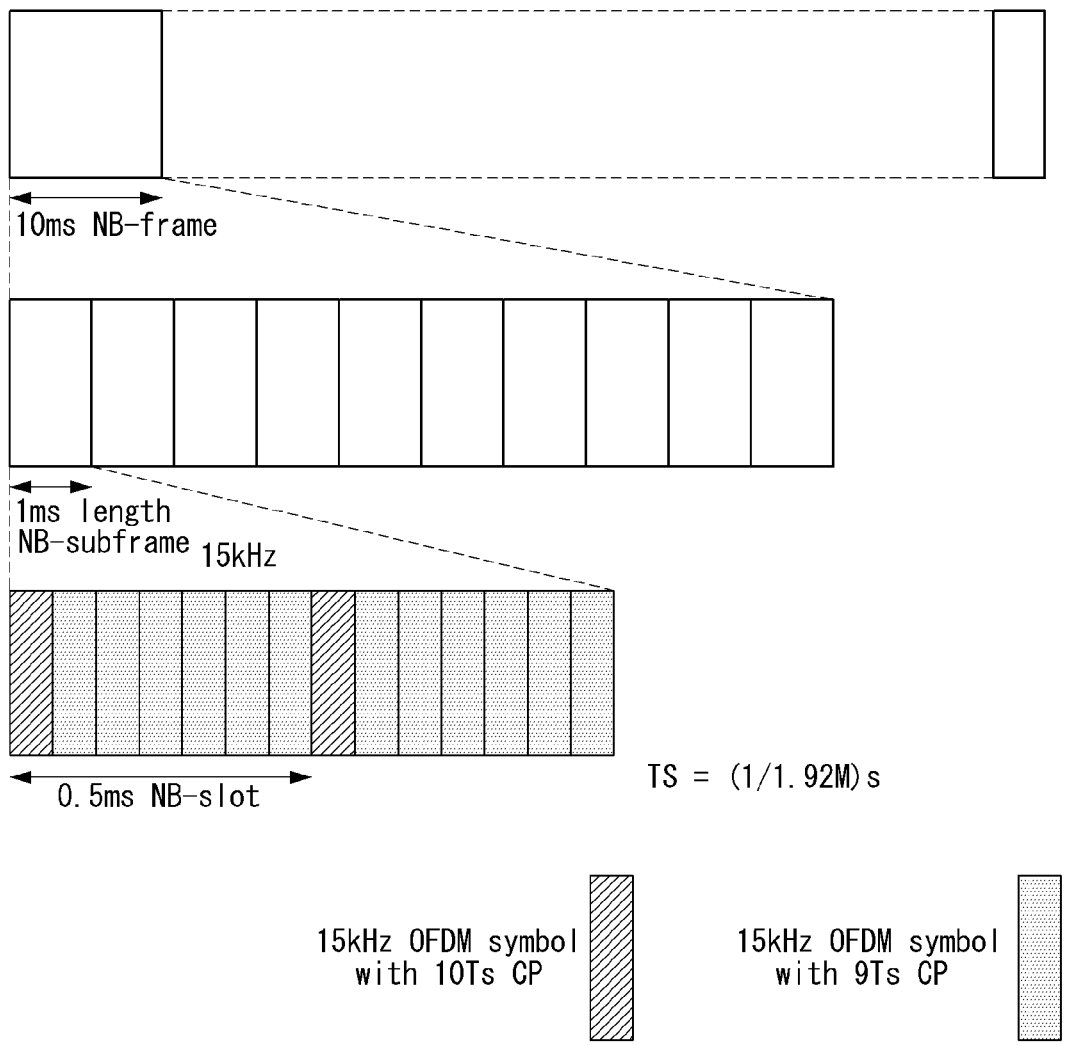

[FIG. 21]
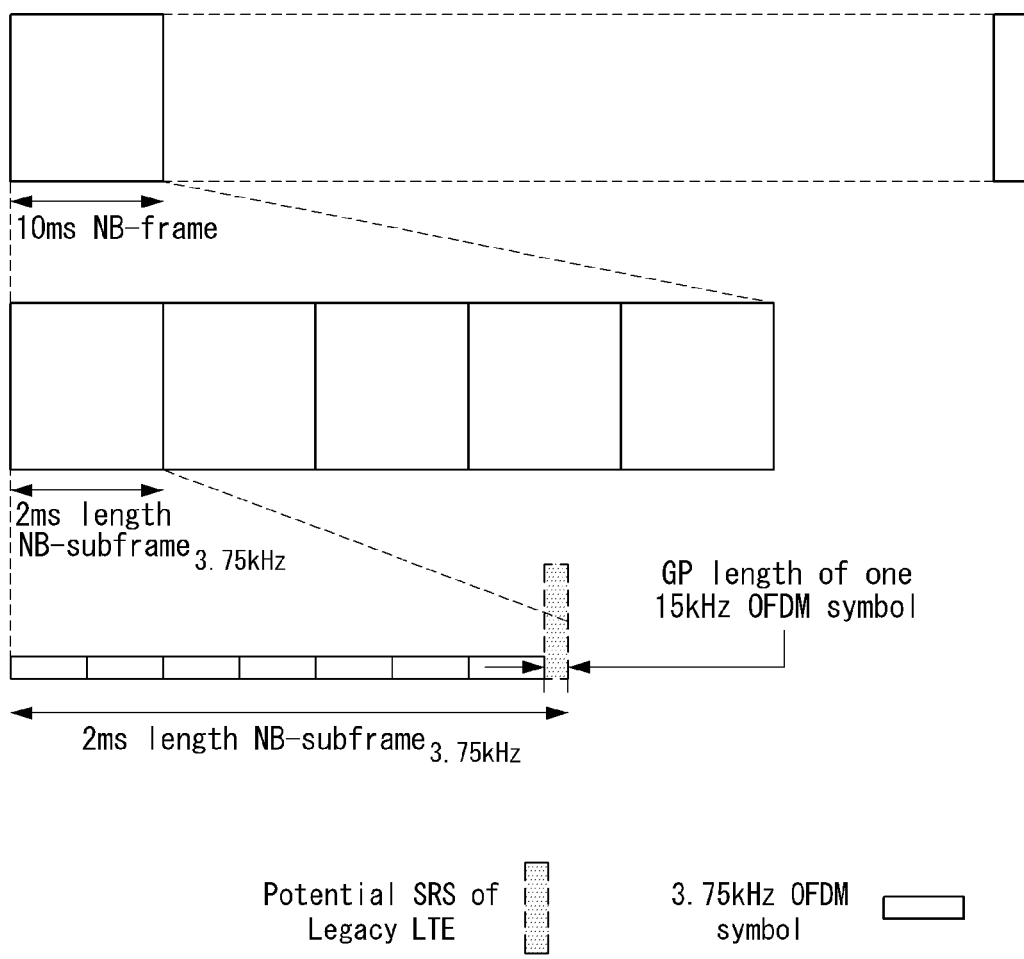

[FIG. 22]
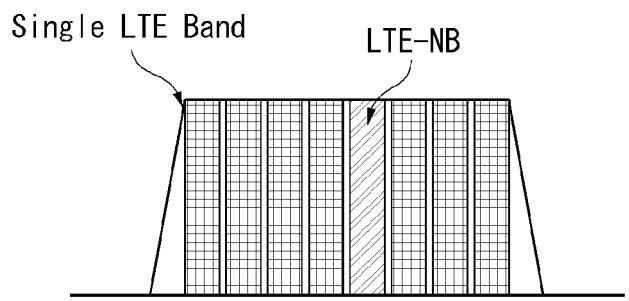
(a) In-band system
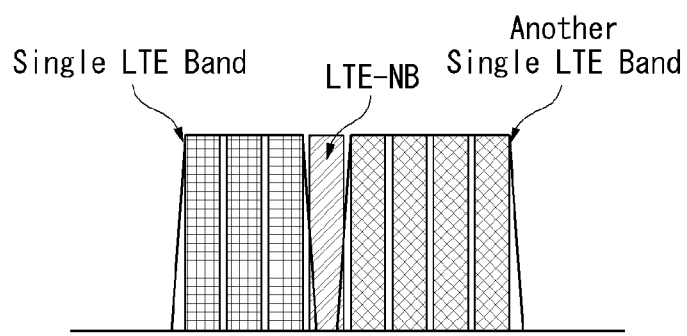
(b) Guard-band system
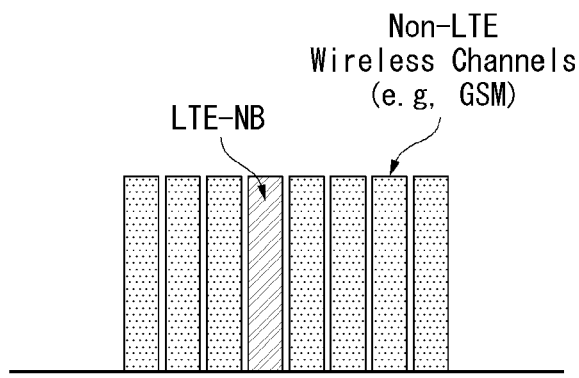
(c) Stand-alone system

[FIG. 23]
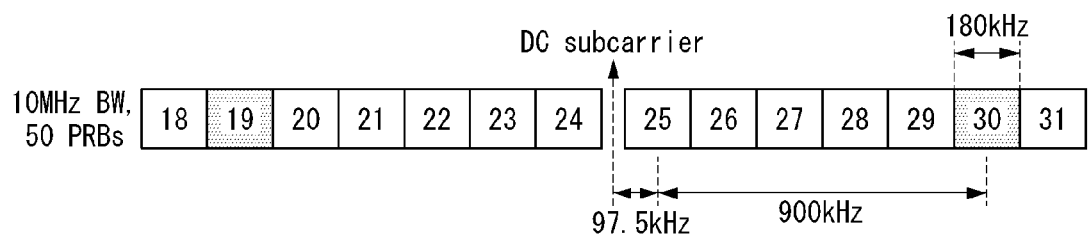
[FIG. 24]
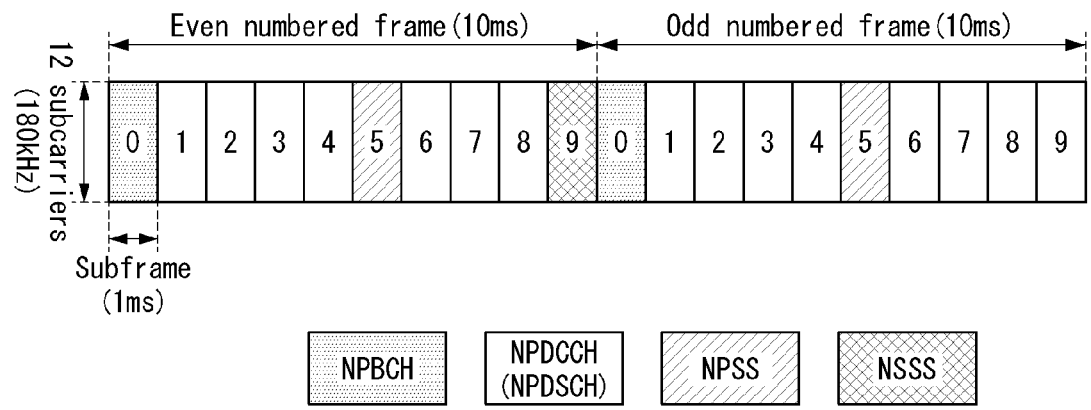

[FIG. 25]
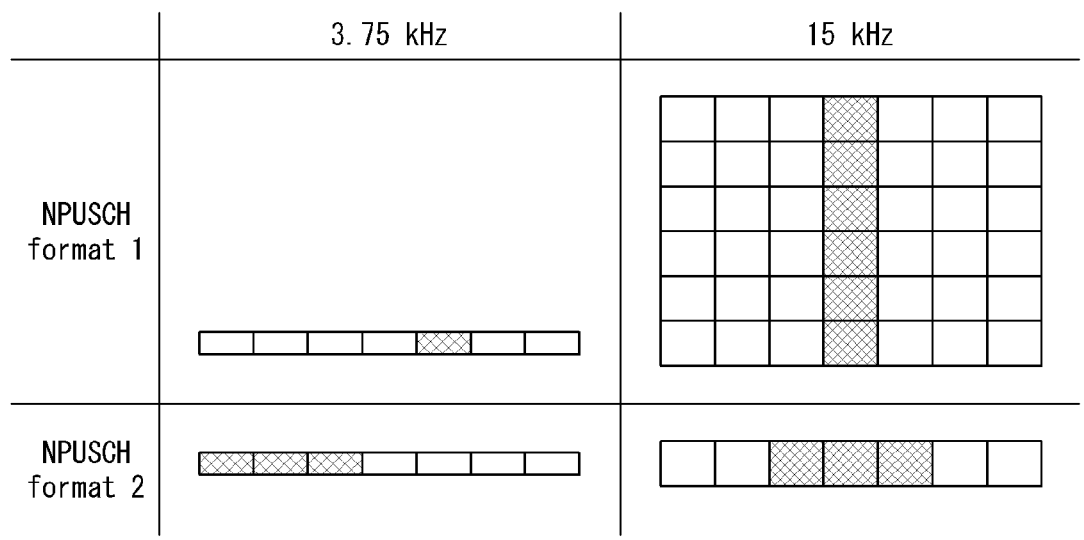

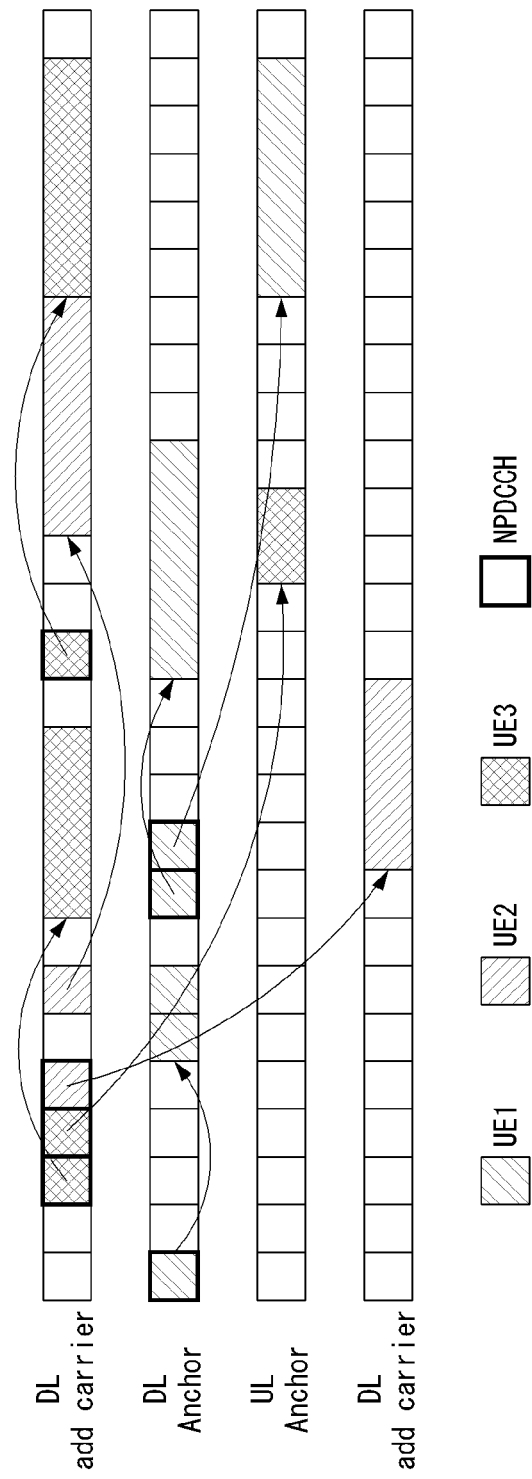
[ FIG. 26 ]

[FIG. 27]
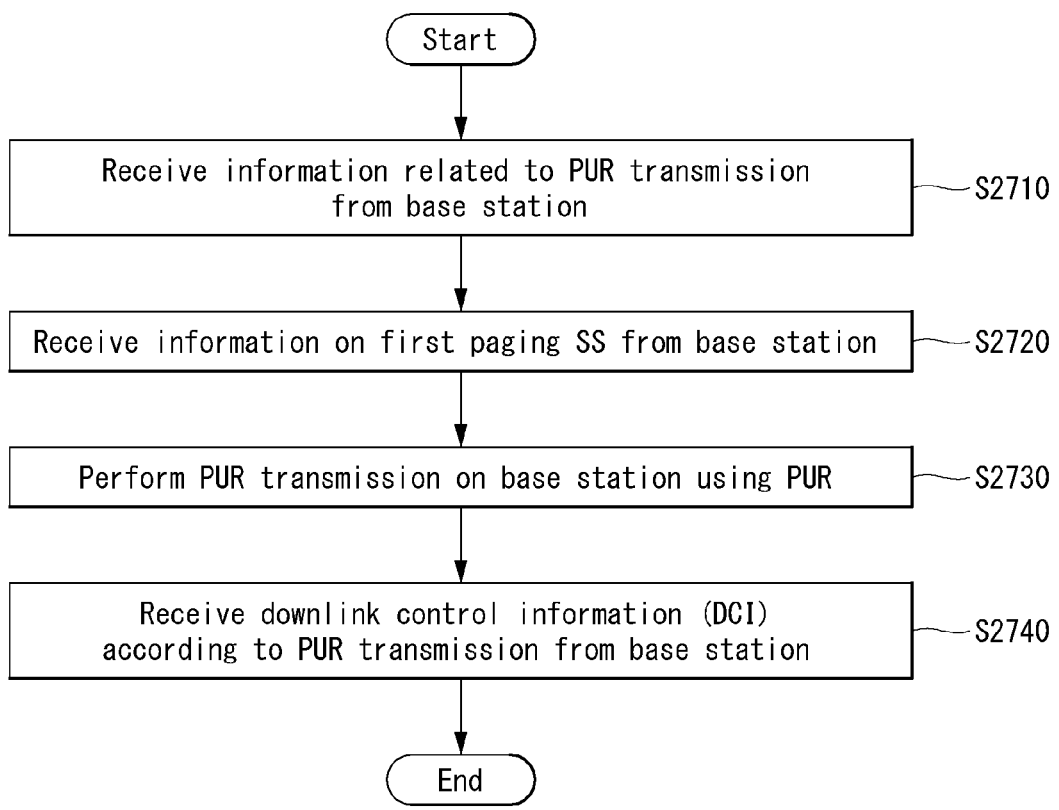

[FIG. 28]
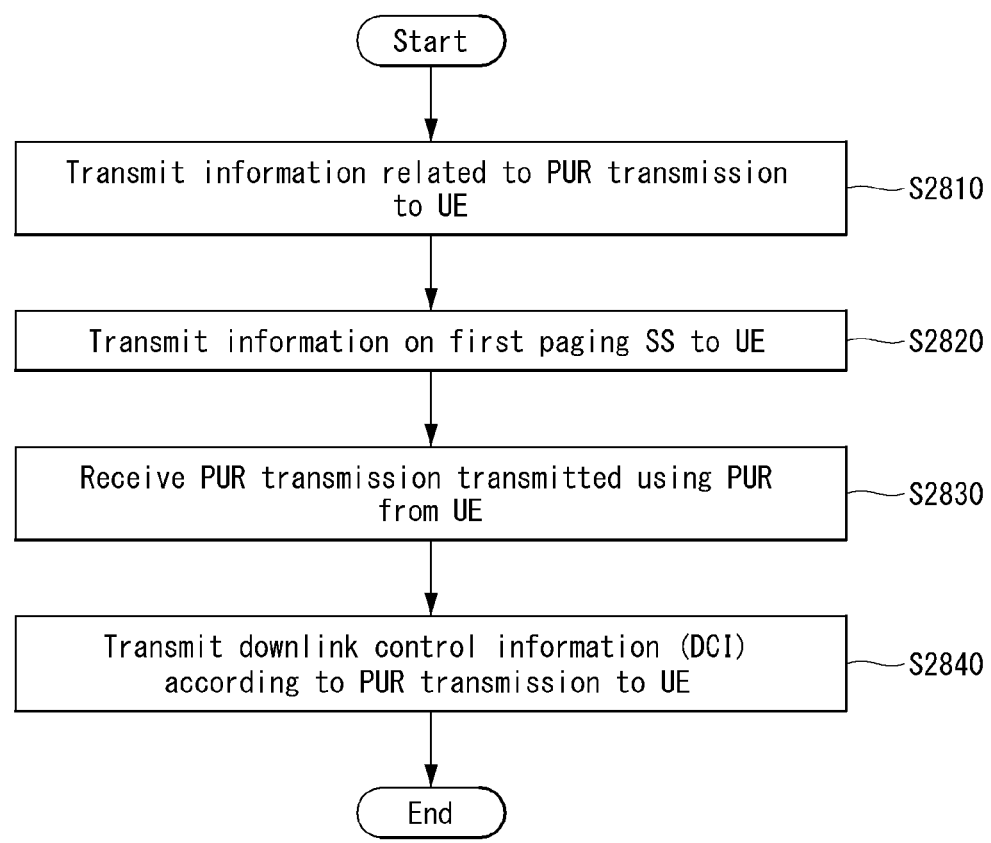

[FIG. 29]
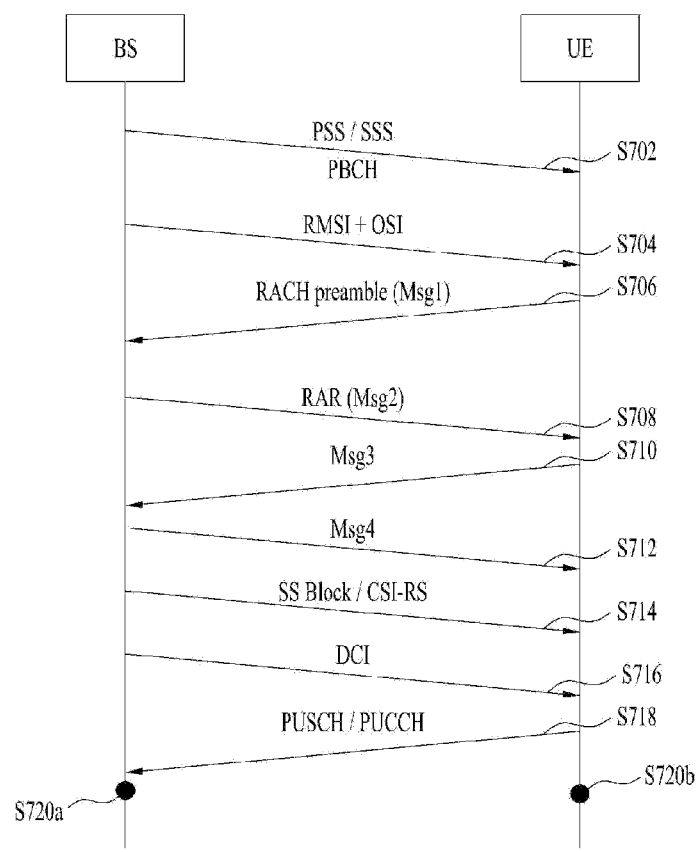

[FIG. 30]
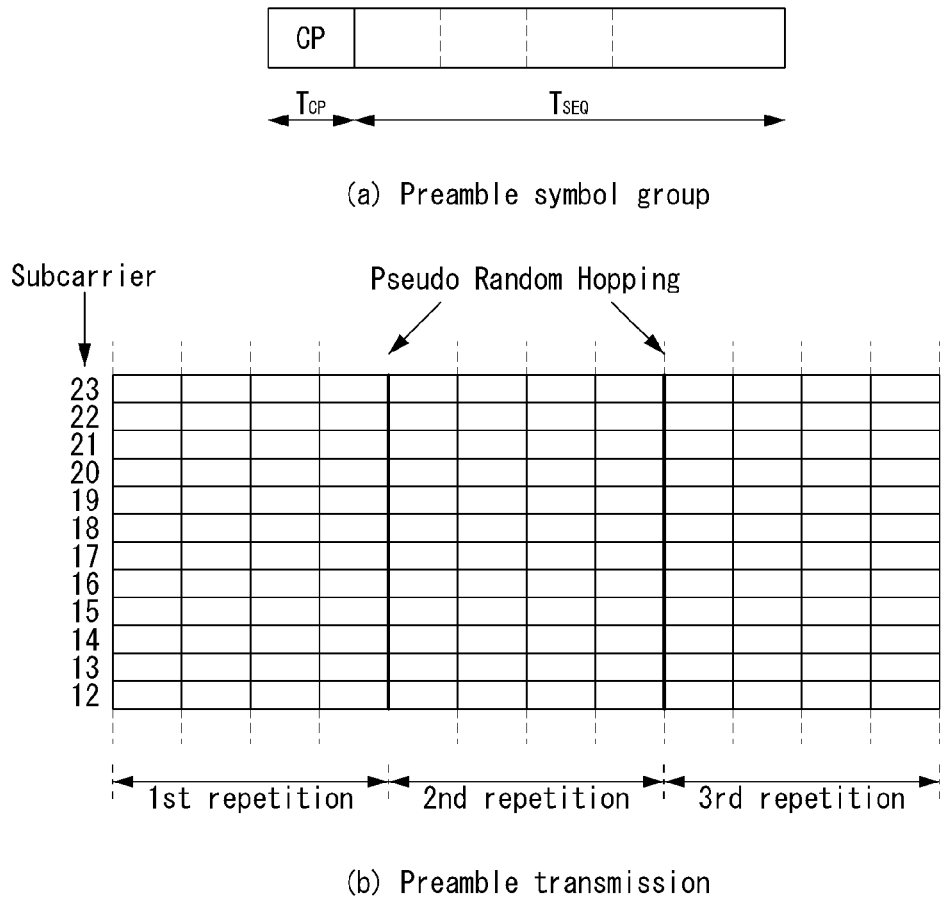
(a) Preamble symbol group
(b) Preamble transmission
[FIG. 31]
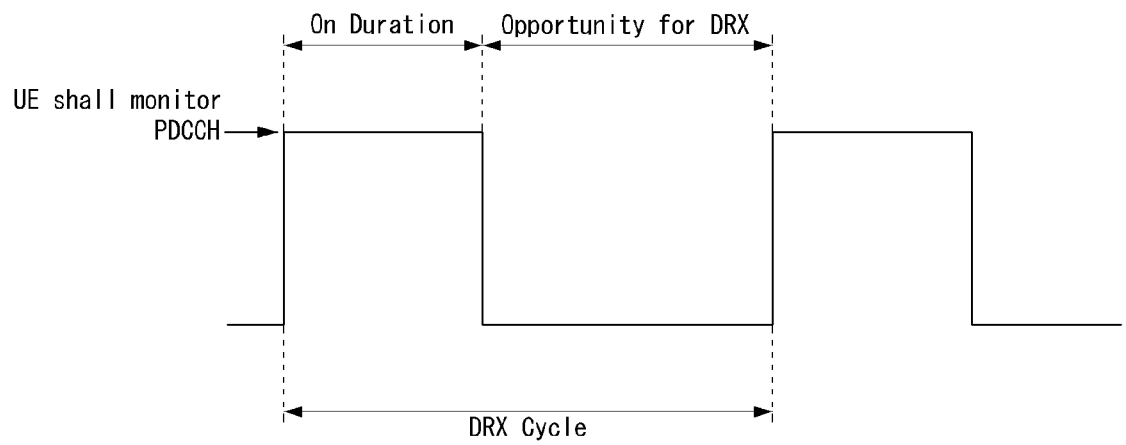

[FIG. 32]
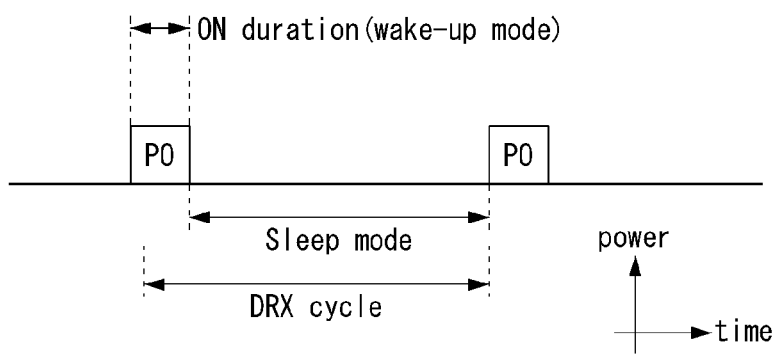
[FIG. 33]
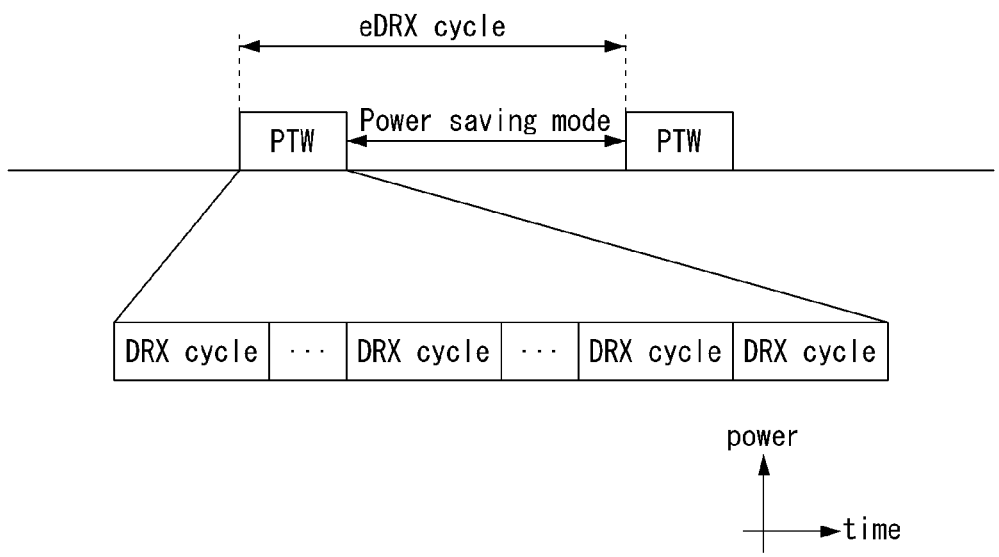

[FIG. 34]
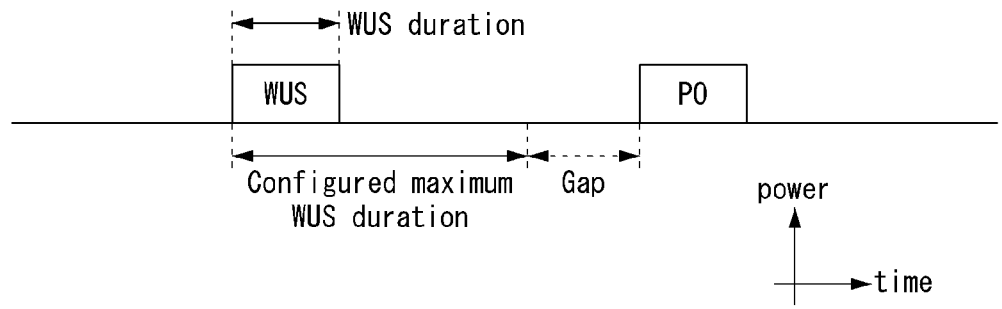
[FIG. 35]
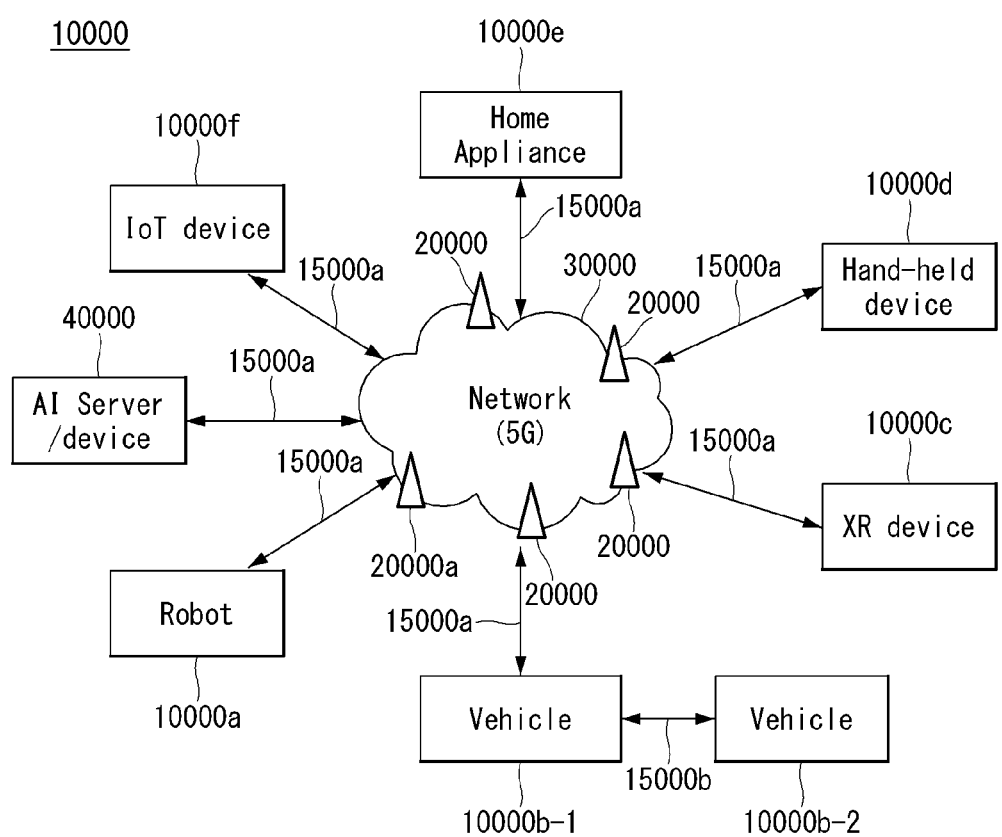

[FIG. 36]
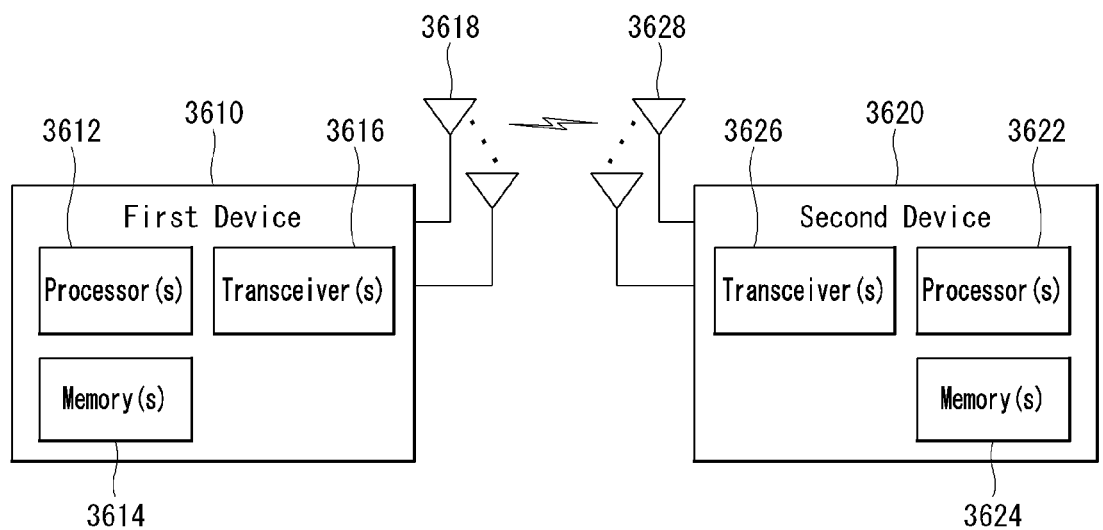
[FIG. 37]
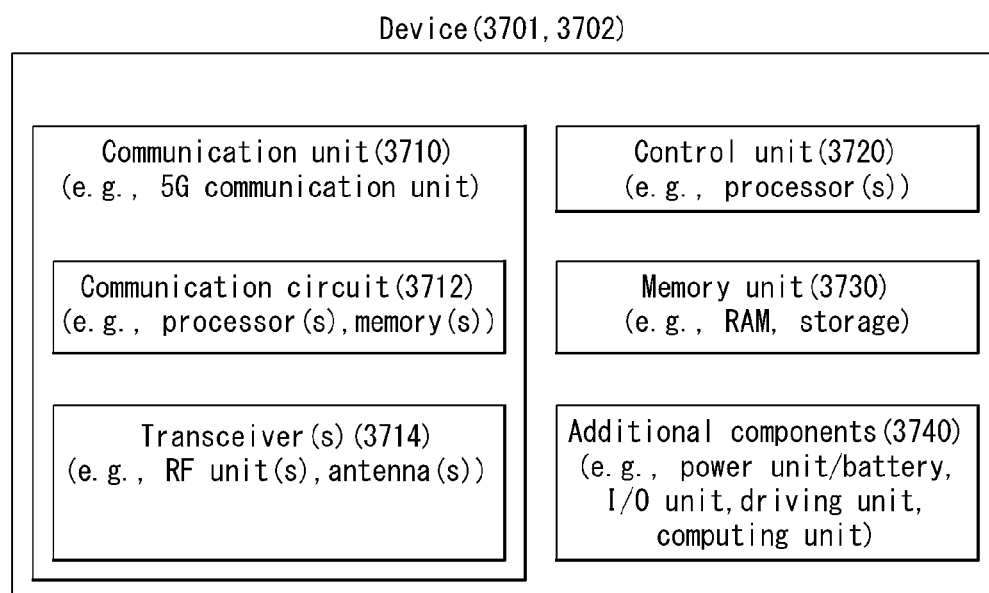

[FIG. 38]
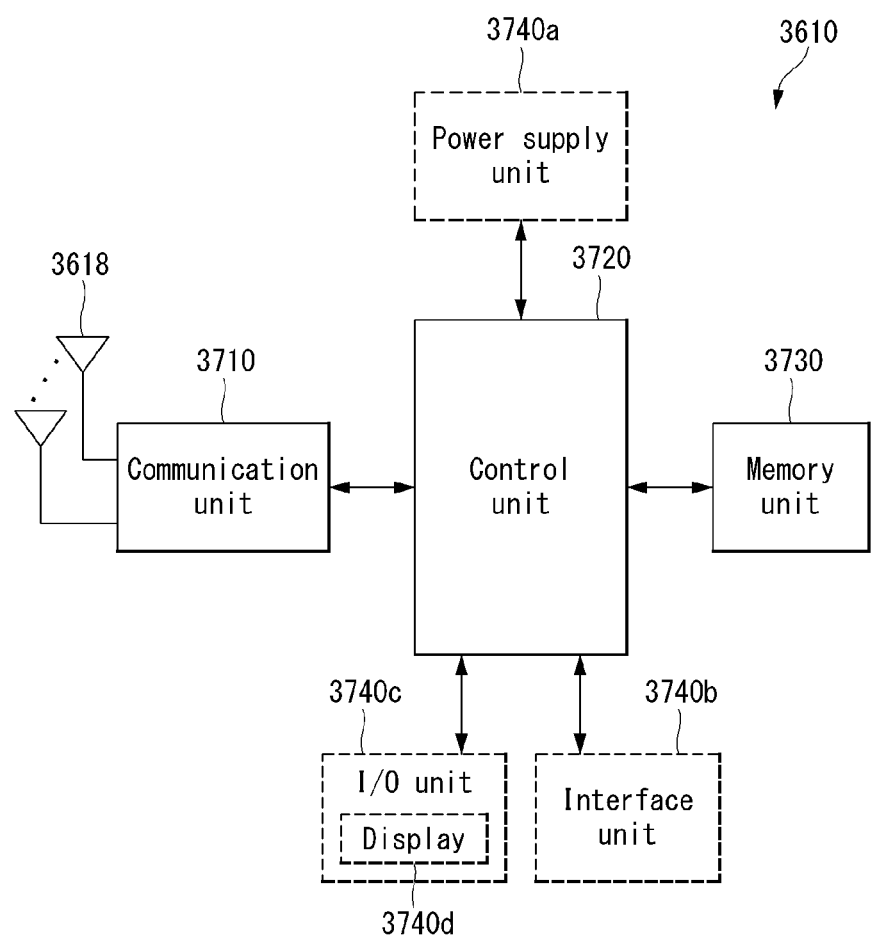

[FIG. 39]
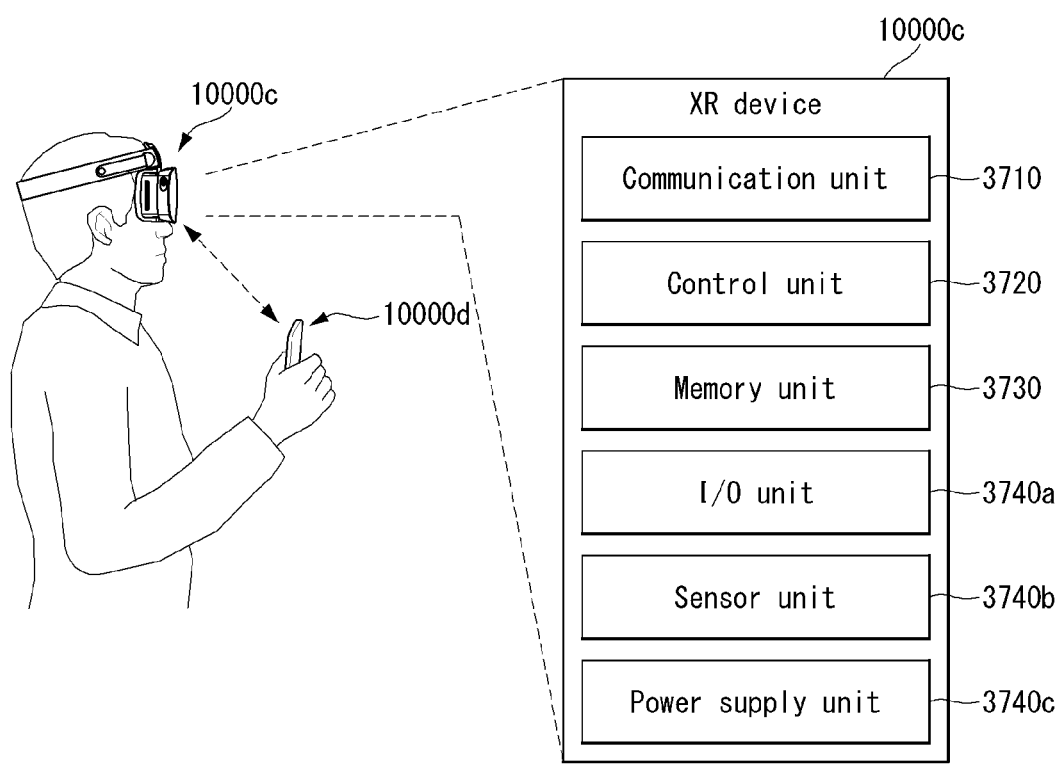

METHOD FOR PERFORMING UPLINK TRANSMISSION USING PRECONFIGURED RESOURCE IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/004338, filed on Mar. 30, 2020, which claims the benefit of Korea Application No. 10-2019-0036399, filed on Mar. 28, 2019, the contents of which are all hereby incorporated by reference herein their entirety.

TECHNICAL FIELD

The present disclosure relates to a wireless communication system, and more particularly, to a method for performing an uplink transmission using a preconfigured resource and a device therefor.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

An object of the present disclosure is to provide a method for performing an uplink transmission using a preconfigured uplink resource (PUR).

Another object of the present disclosure is to provide, when a collision occurs between a PUR transmission related resource and a paging related resource, a method for solving the collision.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure provides a method of performing, by a user equipment (UE), a preconfigured uplink resource (PUR) transmission using a PUR in a wireless communication system.

Specifically, the method comprises receiving, from a base station, information related to the PUR transmission, wherein the information related to the PUR transmission includes information for a PUR and a PUR search space (SS); receiving, from the base station, information for a first paging SS; performing the PUR transmission on the base station using the PUR; and receiving, from the base station, downlink control information (DCI) according to the PUR transmission, wherein the PUR or the PUR SS and the first paging SS or a resource of a preconfigured first paging physical downlink shared channel (PDSCH) overlap, wherein the DCI includes at least one of paging indication information, scheduling information of a second paging PDSCH, and location information of a second paging SS, and wherein the second paging SS and the first paging SS are different from each other.

When the PUR SS and the first paging SS overlap, monitoring for paging in the first paging SS is not performed.

The DCI further includes feedback information for the PUR transmission.

The DCI is transmitted on the PUR SS.

The feedback information is ACK/NACK information indicating whether the PUR transmission is successful.

The paging indication information is included in a field with 1-bit size of the DCI.

The PUR transmission is performed in a RRC idle state.

A ratio of a first resource constituting the first paging SS to a second resource, that overlaps the first resource and constitutes the PUR SS, or the resource of the preconfigured first paging PDSCH is greater than or equal to a preset value.

The preset value is determined based on the first resource.

When the PUR SS and the resource of the preconfigured first paging PDSCH overlap, the preconfigured first paging PDSCH is not received, and the resource of the preconfigured first paging PDSCH is received on the first paging SS.

In one aspect of the present disclosure, there is provided a user equipment (UE) performing a preconfigured uplink resource (PUR) transmission using a PUR in a wireless communication system, the UE comprising one or more transceivers; one or more processors; and one or more memories connected to the one or more processors and configured to store instructions for operations executed by the one or more processors, wherein the operations comprise receiving, from a base station, information related to the PUR transmission, wherein the information related to the PUR transmission includes information for a PUR and a PUR search space (SS), receiving, from the base station, information for a first paging SS; performing the PUR transmission on the base station using the PUR, and receiving, from the base station, downlink control information (DCI) according to the PUR transmission, wherein the PUR or the PUR SS and the first paging SS or a resource of a preconfigured first paging physical downlink shared channel (PDSCH) overlap, wherein the DCI includes at least one of paging indication information, scheduling information of a second paging PDSCH, and location information of a second paging SS, and wherein the second paging SS and the first paging SS are different from each other.

In another aspect of the present disclosure, there is provided a method of receiving, by a base station, a preconfigured uplink resource (PUR) transmission using a PUR in a wireless communication system, the method comprising transmitting, to a user equipment (UE), information related to the PUR transmission, wherein the information related to the PUR transmission includes information for a PUR and a PUR search space (SS); transmitting, to the UE, information for a first paging SS; receiving, from the UE, the PUR transmission transmitted using the PUR; and transmitting, to the UE, downlink control information (DCI) according to the PUR transmission, wherein the PUR or the PUR SS and the first paging SS or a resource of a preconfigured first paging physical downlink shared channel (PDSCH) overlap, wherein the DCI includes at least one of paging indication information, scheduling information of a second paging PDSCH, and location information of a second paging SS, and wherein the second paging SS and the first paging SS are different from each other.

In another aspect of the present disclosure, there is provided a base station receiving a preconfigured uplink resource (PUR) transmission using a PUR in a wireless communication system, the base station comprising one or more transceivers; one or more processors; and one or more memories connected to the one or more processors and configured to store instructions for operations executed by the one or more processors, wherein the operations comprise transmitting, to a user equipment (UE), information related to the PUR transmission, wherein the information related to the PUR transmission includes information for a PUR and a PUR search space (SS), transmitting, to the UE, information for a first paging SS, receiving, from the UE, the PUR transmission transmitted using the PUR, and transmitting, to the UE, downlink control information (DCI) according to the PUR transmission, wherein the PUR or the PUR SS and the first paging SS or a resource of a preconfigured first paging physical downlink shared channel (PDSCH) overlap, wherein the DCI includes at least one of paging indication information, scheduling information of a second paging PDSCH, and location information of a second paging SS, and wherein the second paging SS and the first paging SS are different from each other.

In another aspect of the present disclosure, there is provided a device comprising one or more memories and one or more processors operatively connected to the one or more memories, wherein the one or more processors are configured to allow the device to receive, from a base station, information related to the PUR transmission, wherein the information related to the PUR transmission includes information for a PUR and a PUR search space (SS), receive, from the base station, information for a first paging SS, perform the PUR transmission on the base station using the PUR, and receive, from the base station, downlink control information (DCI) according to the PUR transmission, wherein the PUR or the PUR SS and the first paging SS or a resource of a preconfigured first paging physical downlink shared channel (PDSCH) overlap, wherein the DCI includes at least one of paging indication information, scheduling information of a second paging PDSCH, and location information of a second paging SS, and wherein the second paging SS and the first paging SS are different from each other.

In another aspect of the present disclosure, there is provided one or more non-transitory computer readable media (CRM) storing one or more commands, wherein the one or more commands executable by one or more processors comprise receiving, from a base station, information related to the PUR transmission, wherein the information related to the PUR transmission includes information for a PUR and a PUR search space (SS), receiving, from the base station, information for a first paging SS, performing the PUR transmission on the base station using the PUR, and receiving, from the base station, downlink control information (DCI) according to the PUR transmission, wherein the PUR or the PUR SS and the first paging SS or a resource of a preconfigured first paging physical downlink shared channel (PDSCH) overlap, wherein the DCI includes at least one of paging indication information, scheduling information of a second paging PDSCH, and location information of a second paging SS, and wherein the second paging SS and the first paging SS are different from each other.

Advantageous Effects

The present disclosure has an effect in that efficient preconfigured uplink resource (PUR) transmission can be achieved by providing a PUR transmission method when a collision occurs between a resource related to uplink transmission using a PUR and a resource related to paging.

The present disclosure also has an effect in that effective data transmissions/reception can be achieved by providing a transmission method according to a resource priority when a collision occurs between a PUR and other resource.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 is a perspective view of an augmented reality electronic device according to an embodiment of the present disclosure.

FIG. 2 illustrates an AI device according to an embodiment of the present disclosure.

FIG. 3 illustrates an AI server to which a method described in the present disclosure is applicable.

FIG. 4 illustrates an AI system to which a method described in the present disclosure is applicable.

FIG. 5 illustrates a structure of a radio frame in a wireless communication system to which the present disclosure is applicable.

FIG. 6 illustrates an example of a resource grid for one downlink slot in a wireless communication system to which the present disclosure is applicable.

FIG. 7 illustrates a structure of a downlink subframe in a wireless communication system to which the present disclosure is applicable.

FIG. 8 illustrates a structure of an uplink subframe in a wireless communication system to which the present disclosure is applicable.

FIG. 9 illustrates an example of a structure of an uplink subframe used in a wireless communication system to which the present disclosure is applicable.

FIG. 10 illustrates physical channels used in a wireless communication system to which the present disclosure is applicable and a general signal transmission method using the physical channels.

FIG. 11 illustrates a structure of a radio frame in a wireless communication system to which the present disclosure is applicable.

FIG. 12 illustrates a slot structure of a NR frame that is a wireless system to which the present disclosure is applicable.

FIG. 13 illustrates an example of a self-contained slot structure to which a method described in the present disclosure is applicable.

FIG. 14 illustrates MTC communication to which the present disclosure is applicable.

FIG. 15 illustrates physical channels used in MTC to which the present disclosure is applicable and a general signal transmission using the physical channels.

FIG. 16 illustrates cell coverage enhancement in MTC to which the present disclosure is applicable.

FIG. 17 illustrates a signal band for MTC to which the present disclosure is applicable.

FIG. 18 illustrates scheduling in legacy LTE and MTC to which the present disclosure is applicable.

FIG. 19 illustrates physical channels used in NB-IoT to which the present disclosure is applicable and a general signal transmission using the physical channels.

FIG. 20 illustrates a frame structure when a subcarrier spacing to which the present disclosure is applicable is 15 kHz.

FIG. 21 illustrates a frame structure when a subcarrier spacing to which the present disclosure is applicable is 3.75 kHz.

FIG. 22 illustrates three operation modes of NB-IoT.

FIG. 23 illustrates deployment of an in-band anchor carrier in an LTE bandwidth of 10 MHz to which the present disclosure is applicable.

FIG. 24 illustrates transmission of NB-IoT downlink physical channels/signals in a FDD LTE system applicable to the present disclosure.

FIG. 25 illustrates a NPUSCH format applicable to the present disclosure.

FIG. 26 illustrates an operation when a multi-carrier is configured in FDD NB-IoT to which the present disclosure is applicable.

FIG. 27 is a flow chart illustrating an operation process in a user equipment (UE) performing a preconfigured uplink resource (PUR) transmission using a PUR in a wireless communication system according to an embodiment of the present disclosure.

FIG. 28 is a flow chart illustrating an operation process in a base station receiving a preconfigured uplink resource (PUR) transmission using a PUR in a wireless communication system according to an embodiment of the present disclosure.

FIG. 29 illustrates network initial access and subsequent communication process to which the present disclosure is applicable.

FIG. 30 illustrates a structure and transmission of NPRACH preamble to which the present disclosure is applicable.

FIG. 31 illustrates a DRX cycle for discontinuous reception of PDCCH to which the present disclosure is applicable.

FIG. 32 illustrates a DRX cycle for paging to which the present disclosure is applicable.

FIG. 33 illustrates an extended DRX cycle to which the present disclosure is applicable.

FIG. 34 illustrates a timing relationship between a wake-up signal and a paging occasion to which the present disclosure is applicable.

FIG. 35 illustrates an example of a wireless communication system to which methods described in the present disclosure are applicable.

FIG. 36 illustrates an example of a wireless device to which methods described in the present disclosure are applicable.

FIG. 37 illustrates another example of a wireless device to which methods described in the present disclosure are applicable.

FIG. 38 illustrates an example of a portable device to which methods described in the present disclosure are applicable.

FIG. 39 illustrates an example of a XR device to which methods described in the present disclosure are applicable.

MODE FOR INVENTION

Reference will now be made in detail to implementations of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without radio service (GPRS)/enhanced data rates for GSM evolution (EDGE).

The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using EUTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Implementations of the present disclosure can be supported by standard documents disclosed in at least one of IEEE 802, 3GPP, and 3GPP2 which are the wireless access systems. That is, steps or parts in implementations of the present disclosure which are not described to clearly show the technical spirit of the present disclosure can be described by the standard document.

3GPP LTE/LTE-A/New RAT (NR) is primarily described for clear description, but technical features of the present disclosure are not limited thereto.

In the present disclosure, 'A and/or B' may be interpreted in the same sense as 'including at least one of A or B'.

An example of 5G use scenarios to which the method described in the present disclosure is applicable is described below.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Next, multiple use cases are described in detail.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive device and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive occasion in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of the training of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving or Autonomous-Driving

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a perspective view of an augmented reality electronic device according to an embodiment of the present disclosure.

As illustrated in FIG. 1, an electronic device according to an embodiment of the present disclosure may include a frame 1000, a controller 2000, and a display 3000.

The electronic device may be provided in a glass type. The glass-type electronic device is configured to be wearable on the head of the human body and may include the frame 1000 (case, housing, etc.). The frame 1000 may be formed of a flexible material to facilitate the wearing.

The frame 1000 is supported on the head and provides spaces for mounting various components. As illustrated, the frame 1000 may be equipped with electronic components such as the controller 2000, a user input unit 1300, or an audio output unit 1400. In addition, the frame 1000 may be detachably equipped with a lens covering at least one of the left and right eyes.

The frame 1000 may have a shape of glasses worn on the face of the user's body as illustrated in FIG. 1, but the present disclosure is not necessarily limited thereto. For example, the frame 1000 may have a shape such as a goggle that is worn in close contact with the user's face.

The frame 1000 may include a front frame 1100 having at least one opening and a pair of side frames 1200 that extend in a first direction (y) intersecting the front frame 1100 and are parallel to each other.

The controller 2000 is provided to control various electronic components included in the electronic device.

The controller 2000 may generate an image shown to the user or a video in which images are consecutive. The controller 2000 may include an image source panel generating images and a plurality of lenses that diffuses and coverages light generated by the image source panel.

The controller 2000 may be fixed to one of the two side frames 1200. For example, the controller 2000 may be fixed to the inside or the outside of the one side frame 1200, or may be embedded in the one side frame 1200 and integrally formed. Alternatively, the controller 2000 may be fixed to the front frame 1100 or provided separately from the electronic device.

The display 3000 may be implemented in the form of a head mounted display (HMD). The HMD is a display method that is mounted on the head and displays images directly in front of the user's eyes. When the user wears the electronic device, the display 3000 may be disposed corresponding to at least one of the left and right eyes so that the electronic device can directly provide images in front of the user's eyes. FIG. 1 illustrates that the display 3000 is positioned corresponding to the right eye so that the image can be output to the user's right eye, by way of example.

The display 3000 may allow the user to visually recognize an external environment, and at the same time, allow the image generated by the controller 2000 to be shown to the user. For example, the display 3000 may project the image into a display area using a prism.

The display 3000 may have light-transmitting properties so that the projected image and the general front view (the range of the user's view through his or her eyes) can be seen simultaneously. For example, the display 3000 may be translucent and may be formed as an optical element containing glass.

The display 3000 may be inserted into the opening included in the front frame 1100 and fixed, or may be positioned at a rear surface of the opening (i.e., between the opening and the user) and fixed to the front frame 1100. FIG. 1 illustrates that the display 3000 is positioned at the rear surface of the opening and is fixed to the front frame 1100, by way of example. However, the display 3000 may be positioned and fixed at various positions on the frame 1000.

As illustrated in FIG. 1, in the electronic device, if the controller 2000 allows an image light for an image to be incident on one side of the display 3000, the image light may be emitted from other side of the display 3000 through the display 3000, and an image generated in the controller 2000 may be visible to the user.

Hence, the user can view an external environment through the opening of the frame 1000, and at the same time, can view the image generated in the controller 2000. That is, the image output through the display 3000 may be viewed overlapping a normal field of view. The electronic device can provide augmented reality (AR) in which one image is viewed by overlapping a current image or background and a virtual image using the display characteristics.

FIG. 2 illustrates an AI device 100 according to an embodiment of the present disclosure.

The AI device 100 may be implemented as a stationary device or mobile device, such as TV, a projector, a mobile phone, a smartphone, a desktop computer, a notebook, a terminal for digital broadcasting, a personal digital assistant (PDA), a portable multimedia player (PMP), a navigator, a tablet PC, a wearable device, a set-top box (STB), a DMB receiver, a radio, a washing machine, a refrigerator, a desktop computer, digital signage, a robot, and a vehicle.

Referring to FIG. 2, a terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200 using wired/wireless communication technologies. For example, the communication unit 110 may transmit and receive sensor information, user input, a learning model, or a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, and near field communication (NFC).

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, a lidar, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

FIG. 3 illustrates an AI server 200 according to an embodiment of the present disclosure.

Referring to FIG. 3, the AI server 200 may mean an apparatus which trains an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 4 illustrates an AI system 1 according to an embodiment of the present disclosure.

Referring to FIG. 4, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 4 may be considered to be detailed embodiments of the AI device 100 shown in FIG. 2.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among a lidar, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI+XR

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through LIDAR, a radar, a camera, etc.

The robot 100*a* interacting with the self-driving vehicle 100*b* is present separately from the self-driving vehicle 100*b*, and may perform an operation associated with a self-driving function inside or outside the self-driving vehicle 100*b* or associated with a user got in the self-driving vehicle 100*b*.

In this case, the robot 100*a* interacting with the self-driving vehicle 100*b* may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if a driver is determined to be a drowsiness state, the robot 100*a* may activate the self-driving function of the self-driving vehicle 100*b* or assist control of the driving unit of the self-driving vehicle 100*b*. In this case, the function of the self-driving vehicle 100*b* controlled by the robot 100*a* may include a function provided by a navigation system or audio system provided within the self-driving vehicle 100*b*, in addition to a self-driving function simply.

Alternatively, the robot 100*a* interacting with the self-driving vehicle 100*b* may provide information to the self-driving vehicle 100*b* or may assist a function outside the self-driving vehicle 100*b*. For example, the robot 100*a* may provide the self-driving vehicle 100*b* with traffic information, including signal information, as in a smart traffic light, and may automatically connect an electric charger to a filling inlet through an interaction with the self-driving vehicle 100*b* as in the automatic electric charger of an electric vehicle.

AI+Robot+XR

An AI technology and an XR technology are applied to the robot 100*a*, and the robot 100*a* may be implemented as a guidance robot, a transport robot, a cleaning robot, a wearable robot, an entertainment robot, a pet robot, an unmanned flight robot, a drone, etc.

The robot 100*a* to which the XR technology has been applied may mean a robot, that is, a target of control/interaction within an XR image. In this case, the robot 100*a* is different from the XR device 100*c*, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one sub-carrier spacing in a frequency domain. By scaling a reference subcarrier spacing by an integer N, different numerologies can be defined.

NR: NR radio access or new radio.

System General

FIG. 5 illustrates a structure of a radio frame in a wireless communication system to which the present disclosure is applicable.

FIG. 5 illustrates an LTE radio frame structure. LTE supports frame type 1 for frequency division duplex (FDD), frame type 2 for time division duplex (TDD), and frame type 3 for unlicensed cell (UCell). In addition to primary cell (PCell), up to 31 secondary cells (SCells) may be aggregated. Unless otherwise stated, operations described below may be independently applied for each cell. In multi-cell aggregation, different frame structures may be used in different cells. In addition, time resources (e.g., subframes, slots, subslots) in the frame structure may be collectively referred to as a time unit (TU).

FIG. 5(a) illustrates frame type 1. A downlink radio frame is defined as ten 1 ms subframes (SFs). The subframe includes 14 or 12 symbols according to a cyclic prefix (CP). When a normal CP is used, the subframe includes 14 symbols. When an extended CP is used, the subframe includes 12 symbols. The symbol may mean an OFDM(A) symbol or an SC-FDM(A) symbol according to a multiple access scheme. For example, the symbol may mean an OFDM(A) symbol in downlink and mean an SC-FDM(A) symbol in uplink. The OFDM(A) symbol may be referred to as a cyclic prefix (CP)-OFDM(A) symbol, and the SC-FDM(A) symbol may be referred to as Discrete Fourier Transform (DFT)-spread (s)-OFDM(A) (DFT-s-OFDM(A)) symbol.

The subframe may be defined as one or more slots as below depending on a subcarrier spacing (SCS).

If SCS=7.5 kHz or 15 kHz, subframe #i is defined as two 0.5 ms slots #2i and #2i+1 (where i=0 to 9).

If SCS=1.25 kHz, subframe #i is defined as one 1 ms slot #2i.

if SCS=15 kHz, subframe #i may be defined as six subslots as shown in Table 1.

Table 1 illustrates a subslot configuration in the subframe (normal CP).

TABLE 1

| Slot number | Subslot number | | | | | |
|---|---|---|---|---|---|---|
| | 0 | 1 | 2 | 3 | 4 | 5 |
| | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |

TABLE 1-continued

| Slot number | Subslot number | | | | | |
|---|---|---|---|---|---|---|
| | 0 | 1 | 2 | 3 | 4 | 5 |
| | | 2i | | | 2i + 1 | |
| Downlink subslot pattern 2 (Symbol number) | 0, 1 | 2, 3, 4 | 5, 6 | 0, 1 | 2, 3 | 4, 5, 6 |

FIG. 5(b) illustrates frame type 2. The frame type 2 consists of two half frames. The half frame includes 4 (or 5) normal subframes and 1 (or 0) special subframe. The normal subframe is used for uplink or downlink according to uplink-downlink (UL-DL) configuration. The subframe consists of two slots.

Table 2 illustrates subframe configuration in a radio frame according to the UL-DL configuration.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Here, D denotes a DL subframe, U denotes a UL subframe, and S denotes a special subframe. The special subframe includes a Downlink Pilot TimeSlot (DwPTS), a Guard Period (GP), and an Uplink Pilot TimeSlot (UpPTS). The DwPTS is used for initial cell search, synchronization, or channel estimation in a UE. The UpPTS is used to match the channel estimation at a base station and uplink transmission synchronization of the UE. The GP is a period for eliminating interference caused in the uplink due to a multi-path latency of a downlink signal between the uplink and the downlink.

Table 3 illustrates configuration of the special subframe.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Here, X is configured by higher layer (e.g., RRC) signal or given as 0.

FIG. 6 illustrates an example of a resource grid for one downlink slot in a wireless communication system to which the present disclosure is applicable.

FIG. 6 illustrates a slot structure of an LTE frame.

Referring to FIG. 6, a slot includes a plurality of symbols in a time domain and a plurality of resource blocks (RBs) in a frequency domain. The symbol may mean a symbol period. The structure of the slot may be expressed by a resource grid consisting of $N^{DL/UL}_{RB} \times N^{RB}_{sc}$ subcarriers and $N^{DL/UL}_{symb}$ symbols, where $N^{DL}_{RB}$ denotes the number of RBs in a downlink slot, and $N^{UL}_{RB}$ denotes the number of RBs in an uplink slot. $N^{DL}_{RB}$ and $N^{UL}_{RB}$ depend on a DL bandwidth and an UL bandwidth, respectively. $N^{DL}_{symb}$ denotes the number of symbols in the DL slot, and $N^{UL}_{symb}$ denotes the number of symbols in the UL slot. $N^{RB}_{sc}$ denotes the number of subcarriers constituting the RB. The number of symbols in the slot may be variously changed depending on the SCS and the CP length (see Table 1). For example, one slot includes 7 symbols in the case of normal CP, while one slot includes 6 symbols in the case of extended CP.

The RB is defined by $N^{DL/UL}_{symb}$ (e.g., 7) consecutive symbols in the time domain and is defined by $N^{RB}_{sc}$ (e.g., 12) consecutive subcarriers in the frequency domain. Here, the RB may mean a physical resource block (PRB) or a virtual resource block (VRB), and the PRB and the VRB may be mapped 1:1. Two RBs respectively located in two slots of the subframe are referred to as an RB pair. Two RBs constituting the RB pair have the same RB number (or also referred to as an RB index). A resource consisting of one symbol and one subcarrier is referred to as a resource element (RE) or tone. Each RE in the resource grid may be uniquely defined by an in-slot index pair (k, l), where k denotes an index given from 0 to $N^{DL/UL}_{RB} \times N^{RB}_{sc} - 1$ in the frequency domain, and 1 denotes an index given from 0 to $N^{DL/UL}_{symb}-1$ in the time domain.

FIG. 7 illustrates a structure of a downlink subframe in a wireless communication system to which the present disclosure is applicable.

FIG. 7 illustrates a structure of a downlink subframe of an LTE system.

Referring to FIG. 7, up to three (or four) OFDM(A) symbols located in front of a first slot within a subframe correspond to a control region to which a downlink control channel is allocated. The remaining OFDM(A) symbols correspond to a data region to which a physical downlink shared chancel (PDSCH) is allocated, and a basic unit of the data region is RB. The downlink control channel includes a physical control format indicator channel (PCFICH), a physical downlink control channel (PDCCH), a physical hybrid ARQ indicator channel (PHICH), etc. The PCFICH is transmitted on a first OFDM symbol of a subframe and carries information on the number of OFDM symbols used for transmission of the control channel within the subframe. The PHICH is a response to uplink transmission and carries an HARQ acknowledgment (ACK)/negative-acknowledgment (NACK) signal. Control information transmitted on the PDCCH is referred to as downlink control information (DCI). The DCI includes uplink or downlink scheduling information or includes an uplink transmit power control command for any UE group.

FIG. 8 illustrates a structure of an uplink subframe in a wireless communication system to which the present disclosure is applicable.

Referring to FIG. 8, an uplink subframe may be divided into a control region and a data region in the frequency domain. A physical uplink control channel (PUCCH) carrying uplink control information is allocated to the control region. A physical uplink shared channel (PUSCH) carrying user data is allocated to the data region. One UE does not simultaneously transmit the PUCCH and the PUSCH in order to maintain single carrier characteristics.

A pair of resource blocks (RB) in the subframe are allocated to the PUCCH for one UE. The RBs belonging to the RB pair occupy different subcarriers in two slots. This refers to frequency hopping of the RB pair allocated to the PUCCH at a slot boundary.

FIG. 9 illustrates an example of a structure of an uplink subframe used in a wireless communication system to which the present disclosure is applicable.

FIG. 9 illustrates a structure of an uplink subframe used in LTE.

Referring to FIG. 9, a subframe 500 consists of two 0.5 ms slots 501. Each slot consists of a plurality of symbols 502, and one symbol corresponds to one SC-FDMA symbol. An RB 503 is a resource allocation unit corresponding to 12 subcarriers in a frequency domain and one slot in a time domain. The structure of the uplink subframe of LTE is roughly divided into a data region 504 and a control region 505. The data region refers to a communication resource used to transmit data such as voice and packet transmitted to each UE and includes a physical uplink shared channel (PUSCH). The control region refers to a communication resource used to transmit an uplink control signal, for example, a downlink channel quality report from each UE, a reception ACK/NACK for a downlink signal, an uplink scheduling request, etc., and includes a physical uplink control channel (PUCCH). A sounding reference signal (SRS) is transmitted on an SC-FDMA symbol that is located last on a time axis in one subframe.

FIG. 10 illustrates physical channels used in a wireless communication system to which the present disclosure is applicable and a general signal transmission method using the physical channels.

Referring to FIG. 10, in the wireless communication system, the UE receives information from the base station via downlink (DL) and transmits information to the base station via uplink (UL). The information that the base station and the UE transmit and receive includes data and various control information, and there are various physical channels according to a type/usage of the information that the base station and the UE transmit and receive.

When a UE is powered on or newly enters a cell, the UE performs an initial cell search operation such as synchronizing with a base station in S201. To this end, the UE may receive a primary synchronization signal (PSS) and a secondary synchronization signal (SSS) from the base station to synchronize with the base station and acquire information such as a cell ID. Thereafter, the UE may receive a physical broadcast channel (PBCH) from the base station and acquire in-cell broadcast information. The UE may receive a downlink reference signal (DL RS) in an initial cell search step to check a downlink channel state.

The UE that completes the initial cell search operation may receive a physical downlink control channel (PDCCH) and a physical downlink shared channel (PDSCH) according to information loaded on the PDCCH to acquire more specific system information, in S202.

If the UE first accesses the base station or there is no radio resource for signal transmission, the UE may perform a random access channel (RACH) procedure on the base station in S203 to S206. To this end, the UE may transmit a specific sequence to a preamble via a physical random access channel (PRACH) in S203 and S205, and receive a response message (random access response (RAR) message) to the preamble via the PDCCH and a corresponding PDSCH. In the case of a contention based RACH, a contention resolution procedure may be additionally performed in S206.

Next, the UE performing the above-described procedure may perform PDCCH/PDSCH reception (S207) and physical uplink shared channel (PUSCH)/physical uplink control channel (PUCCH) transmission (S208) as a general uplink/downlink signal transmission procedure. In particular, the UE may receive downlink control information (DCI) on the PDCCH. Here, the DCI may include control information such as resource allocation information for the UE, and different formats may be applied to the DCI according to the use purpose.

The control information that the UE transmits to the base station via the uplink or receives from the base station may include a downlink/uplink ACK/NACK signal, a channel quality indicator (CQI), a precoding matrix index (PMI), a rank indicator (RI), and the like. The UE may transmit the control information such as the CQI/PMI/RI, etc., on the PUSCH and/or PUCCH.

As more and more communication devices require larger communication capacity, there is a need for improved mobile broadband communication compared to the existing radio access technology. Further, massive machine type communications (MTCs), which provide various services anytime and anywhere by connecting multiple devices and objects, are one of the major issues to be considered in the next generation communication. In addition, a communication system design considering a service/UE sensitive to reliability and latency is being discussed. As above, the introduction of next generation radio access technology considering enhanced mobile broadband communication, massive MTC, ultra-reliable and low latency communication (URLLC), etc. is discussed, and in the present disclosure, the corresponding technology is called new RAT for convenience.

NR

As more and more communication devices require larger communication capacity, there is a need for improved mobile broadband communication compared to the existing radio access technology. Further, massive machine type communications (MTCs), which provide various services anytime and anywhere by connecting multiple devices and objects, are one of the major issues to be considered in the next generation communication. In addition, a communication system design considering a service/UE sensitive to reliability and latency is being discussed. As above, the introduction of next generation radio access technology considering enhanced mobile broadband communication, massive MTC, ultra-reliable and low latency communication (URLLC), etc. is discussed, and in the present disclosure, the corresponding technology is called NR for convenience.

FIG. 11 illustrates a structure of a radio frame in a wireless communication system to which the present disclosure is applicable.

FIG. 11 illustrates an example of a structure of a radio frame used in NR.

In NR, uplink and downlink transmission is configured by a frame. A radio frame has a length of 10 ms and is defined as two 5 ms half-frames (HFs). The half-frame is defined as five 1 ms subframes (SFs). The subframe is split into one or more slits, and the number of slots in the subframe depends on a subcarrier spacing (SCS). Each slot includes 12 or 14 OFDM(A) symbols depending on a cyclic prefix (CP). When a normal CP is used, each slot includes 14 symbols. When an extended CP is used, each slot includes 12 symbols. Here, the symbol may include an OFDM symbol (or CP-OFDM symbol) and an SC-FDMA symbol (or DFT-s-OFDM symbol).

The NR supports multiple numerologies (or subcarrier spacing (SCS)) for supporting various 5G services. For example, the NR supports a wide area in traditional cellular bands when the SCS is 15 kHz, supports dense-urban, lower latency, and wider carrier bandwidth when the SCS is 30 kHz/60 kHz, and supports a bandwidth larger than 24.25 GHz to overcome a phase noise when the SCS is 60 kHz or higher.

An NR frequency band is defined as frequency ranges of two types (FR1 and FR2). The FR1 is sub-6 GHz range, and the FR2 is above 6 GHz range and may mean millimeter wave (mmW).

The following Table 4 represents definition of the NR frequency band.

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

Table 5 illustrates that when the normal CP is used, the number of symbols per slot, the number of slots per frame, and the number of slots per subframe vary depending on the SCS.

TABLE 5

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in slot
* $N^{frame, u}_{slot}$: Number of slots in frame
* $N^{subframe, u}_{slot}$: Number of slots in subframe Table 6 illustrates that when the extended CP is used, the number of symbols per slot, the number of slots per frame, and the number of slots per subframe vary depending on the SCS.

TABLE 6

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, OFDM(A) numerology (e.g., SCS, CP length, etc.) may be differently set between a plurality of cells merged into one UE. Hence, an (absolute time) duration of a time resource (e.g., SF, slot or TTI) (for convenience, collectively referred to as a time unit (TU)) consisting of the same number of symbols may be configured differently between the merged cells.

FIG. 12 illustrates a slot structure of a NR frame that is a wireless system to which the present disclosure is applicable.

A slot includes a plurality of symbols in the time domain. For example, one slot includes 14 symbols in the case of normal CP, while one slot includes 12 symbols in the case of extended CP. A carrier includes a plurality of subcarriers in the frequency domain. A resource block (RB) is defined as a plurality of (e.g., 12) consecutive subcarriers in the frequency domain. A bandwidth part (BWP) may be defined as a plurality of consecutive (P)RBs in the frequency domain and may correspond to one numerology (e.g., SCS, CP length, etc.). The carrier may include up to N (e.g., 5) BWPs. The data communication may be performed through an activated BWP, and only one BWP may be activated in one UE. In a resource grid, each element is referred to as a resource element (RE), and one complex symbol may be mapped to each RE.

FIG. 13 illustrates an example of a self-contained slot structure to which a method described in the present disclosure is applicable.

In the NR system, a frame is characterized by a self-contained structure in which all of a DL control channel, DL or UL data, and an UL control channel can be included in one slot. For example, the first N symbols in the slot may be used to transmit the DL control channel (hereinafter, referred to as a DL control region), and the last M symbols in the slot may be used to transmit the UL control channel (hereinafter, referred to as an UL control region), where N and M are an integer greater than or equal to 0. A resource region (hereinafter, referred to as a data region) between the DL control region and the UL control region may be used for DL data transmission or UL data transmission. For example, the following configuration may be considered. Each duration is listed in chronological order.

1. DL only configuration
2. UL only configuration
3. Mixed UL-DL configuration
   DL region+Guard Period (GP)+UL control region
   DL control region+GP+UL region
   DL region: (i) DL data region, (ii) DL control region+ DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. On the PDCCH, downlink control information (DCI), for example, DL data scheduling information, UL data scheduling information, etc., may be transmitted. On the PUCCH, uplink control information (UCI), for example, positive acknowledgement/negative acknowledgement (ACK/NACK) information, channel state information (CSI), scheduling request (SR), etc., for DL data may be transmitted. The GP provides a time gap in a process of switching the base station and the UE from a transmission mode to a reception mode or a process of switching from the reception mode to the transmission mode. Some symbols at time at which DL is switched to UL in the subframe may be configured as the GP.

Machine Type Communication (MTC)

MTC as a type of data communication including one or more machines and may be applied to Machine-to-Machine (M2M) or Internet-of-Things (IoT). Here, the machine is an entity that does not require direct human manipulation or intervention. For example, the machine includes a smart meter with a mobile communication module, a vending machine, a portable terminal having an MTC function, etc.

In 3GPP, the MTC may be applied from release 10 and may be implemented to satisfy criteria of low cost and low complexity, enhanced coverage, and low power consumption. For example, a feature for a low-cost MTC device is added to 3GPP Release 12 and to this end, UE category 0 is defined. UE category is an index indicating how many data the UE may process in a communication modem. The UE of UE category 0 uses a half-duplex operation having a reduced peak data rate and relieved radio frequency (RF) requirements, and a single receiving antenna to reduce baseband/RF complexity. In 3GPP Release 12, enhanced MTC (eMTC) is introduced and the MTC terminal is configured to operate only at 1.08 MHz (i.e., 6 RBs) which is a minimum frequency bandwidth supported in legacy LTE to further reduce a price and power consumption of the MTC UE.

In the following description, the MTC may be mixedly used with terms such as eMTC, LTE-M1/M2, Bandwidth reduced low complexity/coverage enhanced (BL/CE), non-BL UE (in enhanced coverage), NR MTC, enhanced BL/CE, etc., or other equivalent terms. Further, the MT CUE/device encompasses a UE/device (e.g., the smart meter, the vending machine, or the portable terminal with the MTC function) having the MTC function.

FIG. 14 illustrates MTC communication to which the present disclosure is applicable.

Referring to FIG. 14, the MTC device 100m as a wireless device providing the MTC may be fixed or mobile. For example, the MTC device 100m includes the smart meter with the mobile communication module, the vending machine, the portable terminal having the MTC function, etc. The BS 200m may be connected to the MTC device 100m by using radio access technology and connected to the MTC server 700 through a wired network. The MTC server 700 is connected to the MTC devices 100m and provides an MTC service to the MTC devices 100m. The service provided through the MTC has discrimination from a service in communication in which human intervenes in the related art and various categories of services including tracking, metering, payment, a medical field service, remote control, and the like may be provided. For example, services including electric meter reading, water level measurement, utilization of a monitoring camera, reporting of an inventory of the vending machine, and the like may be provided through the MTC. The MTC has a characteristic in that a transmission data amount is small and uplink/downlink data transmission/reception occurs occasionally. Accordingly, it is efficient to lower a unit price of the MTC device and reduce battery consumption according to a low data rate. The MTC device generally has low mobility, and as a result, the MTC has a characteristic in that a channel environment is hardly changed.

FIG. 15 illustrates physical channels used in MTC to which the present disclosure is applicable and a general signal transmission using the physical channels.

In a wireless communication system, the MTC UE receives information from the BS through Downlink (DL) and the UE transmits information to the BS through Uplink (UL). The information which the BS and the UE transmit and receive includes data and various control information and there are various physical channels according to a type/use of the information which the BS and the UE transmit and receive.

A UE that is powered on again while being powered off or enters a new cell performs an initial cell search operation such as synchronizing with the BS (S1001). To this end, the UE receives a Primary Synchronization Signal (PSS) and a Secondary Synchronization Signal (SSS) from the BS to synchronize with the BS and obtain information such as a cell identifier (ID), etc. The PSS/SSS used for the initial cell search operation of the UE may be a PSS/SSS of the legacy LTE. Thereafter, the MTC UE may receive a Physical Broadcast Channel (PBCH) from the BS and obtain in-cell broadcast information (S1002). Meanwhile, the UE receives a Downlink Reference Signal (DL RS) in an initial cell search step to check a downlink channel state.

Upon completion of the initial cell search, the UE receives MTC PDCCH (MPDCCH) and PDSCH corresponding thereto to obtain more specific system information (S1102).

Thereafter, the UE may perform a random access procedure in order to complete an access to the BS (S1003 to S1006). Specifically, the UE may transmit a preamble through a physical random access channel (PRACH) (S1003) and receive a random access response (RAR) for the preamble through the PDCCH and the PDSCH corresponding thereto (S1004). Thereafter, the UE may transmit a physical uplink shared channel (PUSCH) by using scheduling information in the RAR (S1005) and perform a contention resolution procedure such as the PDCCH and the PDSCH corresponding thereto (S1006).

The UE that performs the aforementioned procedure may then perform reception of an MPDCCH signal and/or a PDSCH signal (S1107) and transmission of a physical uplink shared channel (PUSCH) signal and/or a physical uplink control channel (PUCCH) signal (S5080) as a general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a channel quality indication (CQI), a precoding matrix indicator (PMI), a rank indicator (RI), etc.

FIG. 16 illustrates cell coverage enhancement in MTC to which the present disclosure is applicable.

Various cell coverage extension techniques are being discussed in order to extend coverage extension or coverage enhancement (CE) of the BS for the MTC device 100m. For example, for the extension of the cell coverage, the BS/UE may transmit one physical channel/signal over multiple occasions (a bundle of physical channels). Within a bundle section, the physical channel/signal may be repeatedly transmitted according to a pre-defined rule. A receiving apparatus may increase a decoding success rate of the physical channel/signal by decoding a part or the entirety of the physical channel/signal bundle. Here, the occasion may mean a resource (e.g., time/frequency) in which the physical channel/signal may be transmitted/received. The occasion for the physical channel/signal may include a subframe, a slot, or a symbol set in a time domain. Here, the symbol set may be constituted by one or more consecutive OFDM-based symbols. The OFDM-based symbols may include an OFDM(A) symbol and a DFT-s-OFDM(A) (=SC-FDM(A)) symbol. The occasion for the physical channel/signal may include a frequency band and an RB set in a frequency domain. For example, PBCH, PRACH, MPDCCH, PDSCH, PUCCH, and PUSCH may be repeatedly transmitted.

FIG. 17 illustrates a signal band for MTC to which the present disclosure is applicable.

Referring to FIG. 17, as a method for lowering the unit price of the MT CUE, the MTC may operate only in a specific band (or channel band) (hereinafter, referred to as an MTC subband or narrowband (NB)) regardless of a system bandwidth of a cell. For example, an uplink/downlink operation of the MT CUE may be performed only in a frequency band of 1.08 MHz. 1.08 MHz corresponds to 6 consecutive physical resource blocks (PRBs) in the LTE system is defined to follow the same cell search and random access procedures as the LTE UE. FIG. 17(a) illustrates a case where an MTC subband is configured at a center (e.g., 6 PRBs) of the cell, and FIG. 17(b) illustrates a case where a plurality of MTC subbands is configured in the cell. The plurality of MTC subbands may be consecutively/inconsecutively configured in the frequency domain. The physical channels/signals for the MTC may be transmitted/received in one MTC subband. In the NR system, the MTC subband may be defined by considering a frequency range and a subcarrier spacing (SCS). As an example, in the NR system, a size of the MTC subband may be defined as X consecutive PRBs (i.e., a bandwidth of $0.18*X*(2^u)$ MHz) (see Table A4 for u). Here, X may be defined as 20 according to the size of a Synchronization Signal/Physical Broadcast Channel (SS/PBCH). In the NR system, the MTC may operate in at least one bandwidth part (BWP). In this case, the plurality of MTC subbands may be configured in the BWP.

FIG. 18 illustrates scheduling in legacy LTE and MTC to which the present disclosure is applicable.

Referring to FIG. 18, in the legacy LTE, the PDSCH is scheduled by using the PDCCH. Specifically, the PDCCH may be transmitted in first N OFDM symbols in the subframe (N=1 to 3) and the PDSCH scheduled by the PDCCH is transmitted in the same subframe. Meanwhile, in the MTC, the PDSCH is scheduled by using the MPDCCH. As a result, the MT CUE may monitor an MPDCCH candidate in a search space in the subframe. Here, monitoring includes blind-decoding the MPDCCH candidates. The MPDCCH transmits the DCI and the DCI includes uplink or downlink scheduling information. The MPDCCH is FDM-multiplexed with the PDSCH in the subframe. The MPDCCH is repeatedly transmitted in a maximum of 256 subframes and the DCI transmitted by the MPDCCH includes information on the number of MPDCCH repetitions. In the case of downlink scheduling, when repeated transmission of the MPDCCH ends in subframe #N, the PDSCH scheduled by the MPDCCH starts to be transmitted in subframe #N+2. The PDSCH may be repeatedly transmitted in a maximum of 2048 subframes. The MPDCCH and the PDSCH may be transmitted in different MTC subbands. As a result, the MT CUE may perform radio frequency (RF) retuning for receiving the PDSCH after receiving the MPDCCH. In the case of uplink scheduling, when repeated transmission of the MPDCCH ends in subframe #N, the PUSCH scheduled by the MPDCCH starts to be transmitted in subframe #N+4. When the repeated transmission is applied to the physical channel, frequency hopping is supported between different MTC subbands by the RF retuning. For example, when the PDSCH is repeatedly transmitted in 32 subframes, the PDSCH may be transmitted in a first MTC subband in first 16 subframes and the PDSCH may be transmitted in a second MTC subband in 16 remaining subframes. The MTC operates in a half duplex mode. HARQ retransmission of the MTC is an adaptive asynchronous scheme.

Narrowband Internet of Things (NB-IoT)

NB-IoT represents a narrow-band Internet of Things technology that supports a low-power wide area network through a legacy wireless communication system (e.g., LTE, NR). In addition, the NB-IoT may refer to a system for supporting low complexity and low power consumption through a narrowband. The NB-IoT system uses OFDM parameters such as subcarrier spacing (SCS) in the same manner as the legacy system, so that there is no need to separately allocate an additional band for the NB-IoT system. For example, one PRB of the legacy system band may be allocated for the NB-IoT. Since the NB-IoT UE recognizes a single PRB as each carrier, the PRB and the carrier may be interpreted as the same meaning in the description of the NB-IoT.

Hereinafter, the description of the NB-IoT mainly focuses on a case where the description of the NB-IoT is applied to the legacy LTE system, but the description below may be extensively applied even to a next generation system (e.g., NR system, etc.). Further, in the present disclosure, contents related to the NB-IoT may be extensively applied to MTC which aims for similar technical purposes (e.g., low-power, low-cost, coverage enhancement, etc.). Further, the NB-IoT may be replaced with other equivalent terms such as NB-LTE, NB-IoT enhancement, enhanced NB-IoT, further enhanced NB-IoT, NB-NR, and the like.

FIG. 19 illustrates physical channels used in NB-IoT to which the present disclosure is applicable and a general signal transmission using the physical channels.

In the wireless communication system, the UE receives information from the BS through Downlink (DL) and the UE transmits information from the BS through Uplink (UL). The information which the BS and the UE transmit and receive includes data and various control information and there are various physical channels according to a type/use of the information which the BS and the UE transmit and receive.

A UE that is powered on again while being powered off or enters a new cell performs an initial cell search operation such as synchronizing with the BS (S11). To this end, the UE receives a Narrowband Primary Synchronization Signal (NPSS) and a Narrowband Secondary Synchronization Signal (NSSS) from the BS to synchronize with the BS and obtain information such as a cell identifier (ID), etc. Thereafter, the UE receives a Narrowband Physical Broadcast Channel (NPBCH) from the BS to obtain in-cell broadcast information (S12). The UE receives a Downlink Reference Signal (DL RS) in an initial cell search step to check a downlink channel state.

Upon completion of the initial cell search, the UE receives Narrowband PDCCH (NPDCCH) and Narrowband PDSCH (NPDSCH) corresponding thereto to obtain more specific system information in step S12 (S12).

Thereafter, the UE may perform a random access procedure in order to complete an access to the BS (S13 to S16). Specifically, the UE may transmit a preamble through a narrowband physical random access channel (NPRACH) (S13) and receive the Random Access Response (RAR) for the preamble through the NPDCCH and the NPDSCH corresponding thereto (S14). Thereafter, the UE may transmit a narrowband physical uplink shared channel (NPUSCH) by using scheduling information in the RAR (S15) and perform a contention resolution procedure such as the NPDCCH and the NPDSCH corresponding thereto (S16).

The UE that performs the aforementioned procedure may then perform reception of the NPDCCH signal and/or NPDSCH signal (S17) and NPUSCH transmission (S18) as the general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indication (CQI), a Precoding Matrix Indicator (PMI), Rank Indicator (RI), etc. In the NB-IoT, the UCI is transmitted through the NPUSCH. According to the request/instruction of the network (e.g., BS), the UE may transmit the UCI through the NPUSCH periodically, aperiodically, or semi-persistently.

An NB-IoT frame structure may be configured differently depending on the subcarrier spacing (SCS). FIG. 20 illustrates a frame structure when a subframe spacing is 15 kHz, and FIG. 21 illustrates a frame structure when a subframe spacing is 3.75 kHz. The frame structure of FIG. 20 may be used in downlink/uplink, and the frame structure of FIG. 21 may be used only in uplink.

Referring to FIG. 20 the NB-IoT frame structure for the subcarrier spacing of 15 kHz may be configured to be the same as the frame structure of the legacy system (i.e., LTE system). That is, a 10-ms NB-IoT frame may include ten 1-ms NB-IoT subframes, and a 1-ms NB-IoT subframe may include two 0.5-ms NB-IoT slots. Each 0.5-ms NB-IoT slot may include seven symbols. The 15-kHz subcarrier spacing may be applied to both downlink and uplink. The symbol includes an OFDMA symbol in downlink and an SC-FDMA symbol in uplink. In the frame structure of FIG. 20, the system band is 1.08 MHz and is defined by 12 subcarriers. The 15-kHz subcarrier spacing is applied to both downlink and uplink and orthogonally with the LTE system is guaranteed, and as a result, coexistence with the LTE system may be facilitated.

Referring to FIG. 21, when the subcarrier spacing is 3.75 kHz, the 10-ms NB-IoT frame may include five 2-ms NB-IoT subframes, and the 2-ms NB-IoT subframe may include seven symbols and one guard period (GP) symbol. The 2-ms NB-IoT subframe may be expressed as an NB-IoT slot or an NB-IoT resource unit (RU). Here, the symbol may include the SC-FDMA symbol. In the frame structure of FIG. 21, the system band is 1.08 MHz and is defined by 48 subcarriers. The subcarrier spacing of 3.75 kHz may be applied only to the uplink and the orthogonality with the LTE system may be impaired, resulting in performance degradation due to interference.

This figure illustrates the NB-IoT frame structure based on the LTE system frame structure, and the illustrated NB-IoT frame structure can be extended and applied to the next generation system (e.g., NR system). For example, the subframe spacing in the frame structure of FIG. 20 may be replaced by the subframe spacing of Table 4.

FIG. 22 illustrates three operation modes of NB-IoT. More specifically, FIG. 22(a) illustrates an in-band system, FIG. 22(b) illustrates a guard-band system, and FIG. 22(c) illustrates a stand-alone system. Here, the in-band system may be expressed as an in-band mode, the guard-band system may be expressed as guard-band mode, and the stand-alone system may be expressed as a stand-alone mode. For convenience, the NB-IoT operation mode is described based on the LTE band, but the LTE band may be replaced with a band of another system (e.g., NR system band).

The in-band mode means an operation mode to perform the NB-IoT in the (legacy) LTE band. In the in-band mode, some resource blocks of an LTE system carrier may be allocated for the NB-IoT. For example, in the in-band mode, specific 1 RB (i.e., PRB) in the LTE band may be allocated for the NB-IoT. The in-band mode may be operated in a structure in which the NB-IoT coexists in the LTE band. The guard-band mode means an operation mode to perform the NB-IoT in a reserved space for the guard-band of the (legacy) LTE band. Accordingly, in the guard-band mode, the guard-band o the LTE carrier not used as the resource block in the LTE system may be allocated for the NB-IoT. The (legacy) LTE band may have a guard-band of at least 100 kHz at the end of each LTE band. The stand-alone mode means an operation mode to perform the NB-IoT in a frequency band independently from the (legacy) LTE band. For example, in the stand-alone mode, a frequency band (e.g., a GSM carrier to be reallocated in the future) used in a GSM EDGE Radio Access Network (GERAN) may be allocated for the NB-IoT.

The NB-IoT UE searches an anchor carrier in units of 100 kHz and in the in-band and the guard-band, a center frequency of the anchor carrier should be located within ±7.5 kHz from a 100 kHz channel raster. Further, six center PRBs among LTE PRBs are not allocated to the NB-IoT. Accordingly, the anchor carrier may be located only in a specific PRB.

FIG. 23 illustrates deployment of an in-band anchor carrier in an LTE bandwidth of 10 MHz.

Referring to FIG. 23, a direct current (DC) subcarrier is located in the channel raster. Since a center frequency spacing between adjacent PRBs is 180 kHz, the center frequency is located at ±2.5 kH from the channel raster in the case of PRB indexes 4, 9, 14, 19, 30, 35, 40, and 45. Similarly, the center frequency of the PRB suitable as the anchor carrier at an LTE bandwidth of 20 MHz is located at ±2.5 kHz from the channel raster and the center frequency of the PRB suitable as the anchor carrier at LTE bandwidths of 3 MHz, 5 MHz, and 15 MHz is located at ±7.5 kHz from the channel raster.

In the case of guard-band mode, the center frequency is located at ±2.5 kHz from the channel raster in the case of a PRB immediately adjacent to an edge PRB of LTE at the bandwidths of 10 MHz and 20 MHz. In the case of bandwidths 3 MHz, 5 MHz, and 15 MHz, a guard frequency band corresponding to three subcarriers from the edge PRB is used to locate the center frequency of the anchor carrier at ±7.5 kHz from the channel raster.

The anchor carrier of the stand-alone mode may be aligned in the 100 kHz channel raster and all GSM carriers including a DC carrier may be used as the NB-IoT anchor carrier.

The NB-IoT may support multi-carriers, and combinations of in-band and in-band, in-band and guard-band, guard band and guard-band, and stand-alone and stand-alone may be used.

In NB-IoT downlink, physical channels such as a Narrowband Physical Broadcast Channel (NPBCH), a Narrowband Physical Downlink Shared Channel (NPDSCH), and a Narrowband Physical Downlink Control Channel (NPDCCH) are provided, and physical signals such as a Narrowband Primary Synchronization Signal (NPSS), a Narrowband Primary Synchronization Signal (NSSS), and a Narrowband Reference Signal (NRS) are provided.

The NPBCH transfers, to the UE, a Master Information Block-Narrowband (MIB-NB) which is minimum system information which the NB-IoT requires for accessing the system. The NPBCH signal may be repeatedly transmitted eight times in total for coverage enhancement. A transport bock size (TBS) of the MIB-NB is 34 bits and is newly updated every 640 ms TTI period. The MIB-NB includes information such as an operation mode, a system frame number (SFN), a Hyper-SFN, the number of Cell-specific Reference Signal (CRS) ports, a channel raster offset, etc.

The NPSS consists of a zadoff-chu (ZC) sequence with a sequence length of 11 and a root index of 5. The NPSS may be generated according to the following equation.

$$d_l(n) = S(l) \cdot e^{-j\frac{\pi in(n+1)}{11}}, n = 0, 1, \ldots, 10 \qquad \text{[Equation 1]}$$

Here, S(1) for OFDM symbol index 1 may be defined as in Table 7.

TABLE 7

| Cyclic prefix length | S (3) ... S (13) |
|---|---|
| Normal | 1  1  1  1  −1  −1  1  1  1  −1  1 |

The NSSS consists of a combination of a ZC sequence with a sequence length of 131 and a binary scrambling sequence such as a Hadamard sequence. The NSSS indicates PCID to NB-IoT UEs in the cell through the combination of the sequences.

The NPSS may be generated according to the following equation.

$$d_l(n) = b_q(m)e^{-j2\pi\theta_f n}e^{-j\frac{\pi in'(n'+1)}{131}} \qquad \text{[Equation 2]}$$

Here, variables applied to Equation 2 may be defined as follows.

$$n = 0, 1, \ldots, 131 \qquad \text{[Equation 3]}$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

Here, a binary sequence b_q(m) is defined as in Table 8, and b_0 (m) to b_3 (m) correspond to columns 1, 32, 64, and 128 of 128th order Hadamard matrix, respectively. The cyclic shift θf for the frame number of may be defined as in Equation 4.

TABLE 8

| q | b_q (0) ... b_q (127) |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1] |
| 2 | [1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1] |
| 3 | [1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1] |

$$\theta_f = \frac{33}{132}(n_f/2) \bmod 4 \qquad \text{[Equation 4]}$$

Here, of denotes a radio frame number, and mod denotes a modulo function.

The downlink physical channel/signal includes NPSS, NSSS, NPBCH, NRS, NPDCCH, and NPDSCH.

FIG. 24 illustrates transmission of NB-IoT downlink physical channel/signal in a FDD LTE system applicable to the present disclosure. The downlink physical channel/signal is transmitted via one PRB and supports 15 kHz subcarrier spacing/multi-tone transmission.

Referring to FIG. 24, the NPSS is transmitted in a sixth subframe of every frame, and the NSSS is transmitted in a last (e.g., tenth) subframe of every even frame. The UE may obtain frequency, symbol, and frame synchronization using the synchronization signals (NPSS and NSSS) and search 504 physical cell IDs (PCIDs) (i.e., BS IDs). The NPBCH is transmitted in a first subframe of every frame and carries NB-MIB. The NRS is provided as a reference signal for downlink physical channel demodulation and is generated in the same scheme as LTE. However, NB-physical cell ID (PCID) (or NCell ID or NB-IoT BS ID) is used as an initialization value for NRS sequence generation. The NRS is transmitted through one or two antenna ports. The NPDCCH and the NPDSCH may be transmitted in the remaining subframes except for the NPSS/NSSS/NPBCH. The NPDCCH and the NPDSCH cannot be transmitted together in the same subframe. The NPDCCH carries DCI, and the DCI supports three types of DCI formats. DCI format N0 includes narrowband physical uplink shared channel (NPUSCH) scheduling information, and DCI formats N1 and N2 include NPDSCH scheduling information. The NPDCCH can be repeatedly transmitted up to 2048 times for coverage enhancement. The NPDSCH is used to transmit data (e.g., TB) of transmission channels such as a downlink-shared channel (DL-SCH) and a paging channel (PCH). The maximum TBS is 680 bits and can be repeatedly transmitted up to 2048 times for coverage enhancement.

The uplink physical channel includes a narrowband physical random access channel (NPRACH) and the NPUSCH and supports single-tone transmission and multi-tone transmission. The single-tone transmission is supported for the subcarrier spacings of 3.5 kHz and 15 kHz, and the multi-tone transmission is supported only for the subcarrier spacing of 15 kHz.

FIG. 25 illustrates a NPUSCH format applicable to the present disclosure.

The NPUSCH supports two formats. NPUSCH format 1 is used for UL-SCH transmission, and the maximum TBS is 1000 bits. NPUSCH format 2 is used for transmission of uplink control information such as HARQ ACK signaling. NPUSCH format 1 supports the single-/multi-tone transmission, and NPUSCH format 2 supports only the single-tone transmission. In the case of single-tone transmission, pi/2-binary phase shift keying (BPSK) and pi/4-quadrature phase shift keying (QPSK) are used to reduce a peat-to-average power ratio (PAPR). In the NPUSCH, the number of slots occupied by one resource unit (RU) may vary depending on the resource allocation. The RU represents the smallest resource unit to which the TB is mapped, and consists of $N^{UL}_{symb} * N^{UL}_{slots}$ consecutive SC-FDMA symbols in the time domain and $N^{RU}_{sc}$ consecutive subcarriers in the frequency domain. Here, $N^{UL}_{symb}$ denotes the number of SC-FDMA symbols in the slot, $N^{UL}_{slots}$ denotes the number of slots, and $N^{RU}_{sc}$ denotes the number of subcarriers constituting the RU.

Table 9 illustrates configuration of the RU depending on the NPUSCH format and the subcarrier spacing. In the case of TDD, the supported NPUSCH format and the SCS vary depending on the uplink-downlink configuration. The uplink-downlink configuration may refer to Table 2.

TABLE 9

| NPUSCH format | Subcarrier spacing | Supported uplink-downlink configurations | $N^{RU}_{sc}$ | $N^{UL}_{slots}$ | $N^{UL}_{symb}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

Scheduling information for transmission of UL-SCH data (e.g., UL-SCH TB) is included in DCI format NO, and the DCI format NO is transmitted on the NPDCCH. The DCI format NO includes information on a start time of the NPUSCH, the number of repetitions, the number of RUs used for TB transmission, the number of subcarriers, resource location in the frequency domain, MCS, etc.

Referring to FIG. 25, DMRS is transmitted in one or three SC-FDMA symbols per slot according to the NPUSCH format. The DMRS is multiplexed with data (e.g., TB, UCI) and is transmitted only in the RU including data transmission.

FIG. 26 illustrates an operation when a multi-carrier is configured in FDD NB-IoT to which the present disclosure is applicable.

In FDD NB-IoT, a DL/UL anchor-carrier may be basically configured, and a DL (and UL) non-anchor carrier may be additionally configured. Information on the non-anchor carrier may be contained in RRCConnectionReconfiguration. When the DL non-anchor carrier is configured (DL add carrier), the UE receives data only in the DL non-anchor carrier. On the other hand, a synchronization signal (NPSS, NSSS), a broadcast signal (MIB, SIB), and a paging signal are provided only in the anchor-carrier. When the DL non-anchor carrier is configured, the UE listens to only the DL non-anchor carrier while being in RRC_CONNECTED state. Similarly, when the UL non-anchor carrier is configured (UL add carrier), the UE transmits data only in the UL non-anchor carrier, and simultaneous transmission on the UL non-anchor carrier and the UL anchor-carrier is not allowed. When the UE is transitioned to RRC_IDLE state, the UE returns to the anchor-carrier.

FIG. 26 illustrates that only the anchor-carrier is configured for a UE1, the DL/UL non-anchor carrier is additionally configured for a UE2, and the DL non-anchor carrier is additionally configured for a UE3. As a result, carriers on which data is transmitted/received in each UE are as follows.

UE1: Date reception (DL anchor-carrier) and data transmission (UL anchor-carrier)

UE2: Date reception (DL non-anchor-carrier) and data transmission (UL non-anchor-carrier)

UE3: Date reception (DL non-anchor-carrier) and data transmission (UL anchor-carrier)

The NB-IoT UE cannot perform transmission and reception at the same time, and the transmission and reception operations each are limited to one band. Therefore, even if the multi-carrier is configured, the UE requires only one transmission/reception chain of 180 kHz band.

The present disclosure describes a method of supporting so that a UE can effectively perform uplink transmission and downlink reception via a preconfigured resource. If the preconfigured resource is used as described above, there is an effect in terms of a reduction in transmission and reception power consumption of the UE and the efficiency of uplink transmission and downlink reception. A method of performing uplink/downlink transmission/reception using the preconfigured resource described in the present disclosure can be applied to the LTE MTC system, the NB-IoT system, the NR IoT system, etc.

A preconfigured UL resource (PUR) described in the present disclosure means a resource for uplink transmission configured via higher layer signaling so that a UE can perform the uplink transmission even if there is no UL grant when the UE is in RRC_IDLE state or RRC_CONNECTED state. In addition, the PUR may have a meaning including an operation and a procedure that the UE in the RRC_IDLE state or the RRC_CONNNECTED state is pre-allocated an uplink transmission resource from a base station and performs uplink transmission from the allocated resource.

The uplink transmission using the PUR described in the present disclosure is referred to as PUR transmission. After the PUR transmission, a search space (SS) for monitoring downlink feedback information (e.g., information for HARQ operation, etc.), UL grant DCI, DL assignment DCI, etc. is referred to as PUR SS.

In this instance, the PUR and a PUR SS resource may be configured independently of each other. For example, each of the PUR and the PUR SS resource may be configured to have a different periodicity and a different start point. For the UE in the RRC_IDLE state, the PUR transmission may be performed when a timing advance (TA) is valid.

For the efficient PUR utilization of the UE in the RRC_IDLE state, when the UE performs the PUR transmission or performs a monitoring operation of DCI via the PUR SS, a method is needed, in which the UE configures a resource so that the UE operates organically with other conventional RRC_IDLE state operation (e.g., paging, system information reception, etc.), or performs priority configuration, collision avoidance, etc. The present disclosure describes a method of avoiding a collision with a paging subframe for supporting the efficient PUR transmission and an operation method of the UE upon the collision. The collision described in the present disclosure may mean a case where resources overlap in the time/frequency domain.

Hereinafter, a serving-cell described in the present disclosure may mean a cell configuring the PUR and/or a cell receiving uplink transmission via the PUR.

The PUR described in the present disclosure may mean a shared PUR that is equally configured to a plurality of UEs and is shared between the plurality of UEs, or mean a dedicated PUR that is configured only to a specific UE without contention between the UEs, or mean both the shared PUR and the dedicated PUR.

The PDCCH described in the present disclosure may mean a general physical control channel and include MPDCCH, NPDCCH, etc. The PDSCH may mean a general physical downlink shared channel and include NPDSCH. The PUSCH may mean a general physical uplink shared channel and include NPUSCH.

Hereinafter, a method is described in which a UE solves a collision when a resource for PUR transmission or a PUR SS resource collides with a paging related resource.

(Method 1)

Method 1 relates to a UE operation when PUR transmission collides with a paging SS (e.g., Type1-CSS) or a paging PDSCH. Here, the paging PDSCH is a PDSCH used to send a paging message, i.e., a PDSCH assigned by a PDCCH. In this instance, the PDCCH transmits DCI with CRC scrambled by P-RNTI.

(Method 1-a)—PUR Transmission Priority when a Collision Occurs Between PUR Transmission and Paging SS Method 1-a is a method in which a UE performs PUR transmission when all or some of subframes or slots constituting a paging SS include a subframe or a slot for PUR transmission. The UE may be required/configured not to monitor the paging SS when a resource for PUR transmission collides with the paging SS.

In addition, after a base station receives the PUR transmission performed by the UE, the base station may include paging indication information and information scheduling a corresponding paging PDSCH in DCI (e.g., DCI with CRC scrambled by PUR-RNTI) for DL feedback monitoring or DL assignment and may transmit it to the UE. In this instance, the DCI may indicate a location of the paging SS, and the location may be given as an offset value. The DCI indicates a SS other than an original paging SS period. The paging indication information may be included in a specific field of DCI with 1-bit size, or indicated to a state of the specific field, or indirectly signaled depending on whether paging PDSCH scheduling information is included. If the paging SS includes direct indication information indicating a system information (SI) change, etc., the paging indication information may be replaced by the direct indication information, and all or some of remaining DCI contents except a paging/direct indication field may be replaced by direct indication related information. In this instance, the direct indication related information may mean SI modification information, earthquake tsunami warning system (ETWS) information, commercial mobile alert service (CMAS) information, and the like.

The paging/direct indication information may be 1-bit flag form, and the UE may differently interpret the DCI content depending on a value of the corresponding field.

(Method 1-b)—PUR Transmission Priority when a Collision Occurs Between PUR Transmission and Paging PDSCH Method 1-b is a method in which a UE performs PUR transmission when all or some of subframes or slots for paging PDSCH transmission include a subframe or a slot for PUR transmission. In this instance, the UE may be required/configured not to receive a paging PDSCH.

When a collision occurs between the PUR transmission and the paging PDSCH although the UE has normally received the paging PDCCH on a paging SS, after a base station receives the PUR transmission performed by the UE, the base station may include paging indication information and information scheduling a corresponding paging PDSCH in DCI (e.g., DCI with CRC scrambled by PUR-RNTI) for DL feedback monitoring or DL assignment and may transmit it to the UE. In this instance, the DCI may indicate a location of the paging SS, and the location may be given as an offset value. The DCI indicates a SS other than an original paging SS period. Here, the paging PDSCH may be a PDCCH that may include paging information or direct indication information, and may transmit DCI with CRC scrambled by P-RNTI.

Further, the paging indication information may be included in a specific field of DCI with 1-bit size, or indicated to a state of the specific field, or indirectly signaled depending on whether paging PDSCH scheduling information is included.

(Method 1-c) PUR Transmission Priority when PUR Transmission Collides with Both Paging SS and Paging PDSCH Method 1-c is a method in which a UE performs PUR transmission when the PUR transmission collides with both a paging SS and a paging PDSCH. In this instance, the UE may be required/configured not to monitor the paging SS and not to receive the paging PDSCH.

In this instance, after a base station receives the PUR transmission performed by the UE, the base station includes paging indication information and information scheduling a corresponding paging PDSCH in DCI (e.g., DCI with CRC scrambled by PUR-RNTI) for DL feedback monitoring or DL assignment and may transmit it to the UE. The DCI may indicate a location of the paging SS, and the location may be given as an offset value. The DCI indicates a SS other than an original paging SS period. The paging indication information may be included in a specific field of DCI with 1-bit size, or indicated to a state of the specific field, or indirectly signaled depending on whether paging PDSCH scheduling information is included. If the paging SS includes direct indication information indicating a system information (SI) change, etc., the paging indication information may be replaced by the direct indication information, and all or some of remaining DCI contents except a paging/direct indication field may be replaced by direct indication related information. In this instance, the direct indication related information may mean SI modification information, earthquake tsunami warning system (ETWS) information, commercial mobile alert service (CMAS) information, and the like.

The paging/direct indication information may be 1-bit flag form, and the UE may differently interpret the DCI content depending on a value of the corresponding field.

(Method 1-d—Drop or Skip PUR Transmission when a Collision Occurs Between PUR Transmission and Paging SS Method 1-d is a method of dropping or skipping PUR transmission in all or some of the above-described methods 1-a to 1-c. In other words, the method 1-d is a method of dropping or skipping PUR transmission when the PUR transmission collides with a paging SS and/or a paging PDSCH.

When the PUR transmission is skipped due to a collision between the PUR transmission and other channel or SS, it cannot be decided/recognized as an occasion in which a PUR is no longer needed since there is no PUR transmission data, or the PUR transmission is no longer possible since a TA is invalid. Therefore, when the PUR transmission is skipped, it may not be counted as a PUR skipping event for PUR release. In other words, a PUR skipping counter value for PUR release can be held.

For example, a PUR skipping counter may set a specific initial value and may be configured/designed to release the PUR when the counter value is zero while a skipping event is counted down. In this case, the counter value may be held depending on a counter initial value (e.g., initial value=1) or only when the PUR skipping counter value is less than or equal to a specific value (e.g., counter value=1).

As described above, holding the counter value is to prevent the PUR resource from being efficiently unavailable since the PUR is excessively released by period configuration of other channel and/or SS colliding with the PUR transmission.

(Method 2)

Method 2 describes a UE operation when PUR SS collides with a paging SS (e.g., Type1-CSS) or a paging PDSCH. In this instance, the PUR SS means a search space monitored for DL feedback information and/or DL assignment during and/or after PUR (re)transmission, and the paging PDSCH is a PDSCH used to send a paging message, i.e., a PDSCH assigned by a PDCCH. In addition, the PDCCH transmits DCI with CRC scrambled by P-RNTI.

(Method 2-a—PUR Transmission Priority when a Collision Occurs Between PUR SS and Paging SS Method 2-a is a method in which a UE performs PUR transmission when all or some of subframes or slots constituting a paging SS include all or some of subframes or slots constituting a PUR SS. In this instance, the UE may be required/configured not to monitor the paging SS.

In addition, a base station includes paging indication information and information scheduling a corresponding paging PDSCH in DCI (e.g., DCI with CRC scrambled by PUR-RNTI) for DL feedback monitoring or DL assignment transmitted on the PUR SS and may transmit it to the UE. In this instance, the DCI may indicate a location of the paging SS, and the location may be given as an offset value. The DCI indicates a SS other than an original paging SS period. The paging indication information may be included in a specific field of DCI with 1-bit size, or indicated to a state of the specific field, or indirectly signaled depending on whether paging PDSCH scheduling information is included. If the paging SS includes direct indication information indicating a system information (SI) change, etc., the paging indication information may be replaced by the direct indication information, and all or some of remaining DCI contents except a paging/direct indication field may be replaced by direct indication related information. In this instance, the direct indication related information may mean SI modification information, earthquake tsunami warning system (ETWS) information, commercial mobile alert service (CMAS) information, and the like.

The paging/direct indication information may be 1-bit flag form, and the UE may differently interpret the DCI content depending on a value of the corresponding field.

(Method 2-b—PUR Transmission Priority when a Collision Occurs Between PUR SS and Paging PDSCH Method 2-b is a method in which a UE performs PUR transmission when all or some of subframes or slots for paging PDSCH transmission include all or some of subframes or slots constituting a PUR SS. In this instance, the UE may be required/configured not to receive a paging PDSCH.

When a collision occurs between a resource constituting the PUR SS and a resource for paging PDSCH transmission although the UE has normally received the paging PDSCH on a paging SS, after a base station receives the PUR transmission performed by the UE, the base station includes paging indication information and information scheduling a corresponding paging PDSCH in DCI (e.g., DCI with CRC scrambled by PUR-RNTI) for DL feedback monitoring or DL assignment transmitted on the PUR SS and may transmit it to the UE. In this instance, the DCI may indicate a location of the paging SS, and the location may be given as an offset value. The DCI indicates a SS other than an original paging SS period. Here, the paging PDSCH may be a PDCCH that may include paging information or direct indication information, and may transmit DCI with CRC scrambled by P-RNTI.

Further, the paging indication information may be included in a specific field of DCI with 1-bit size, or indicated to a state of the specific field, or indirectly signaled depending on whether paging PDSCH scheduling information is included.

(Method 2-c)—PUR Transmission Priority when PUR SS Collides with Both Paging SS and Paging Pdsch Method 2-c is a method in which a UE performs PUR transmission when it corresponds to all the above-described methods 2-a and 2-c. In other words, the method 2-c relates to a method in which the UE performs PUR transmission when a PUR SS collides with both a paging SS and a paging PDSCH. In this instance, the UE may be required/configured not to monitor the paging SS and not to receive the paging PDSCH.

In this instance, after a base station receives the PUR transmission performed by the UE, the base station includes paging indication information and information scheduling a corresponding paging PDSCH in DCI (e.g., DCI with CRC scrambled by PUR-RNTI) for DL feedback monitoring or DL assignment and may transmit it to the UE. The DCI may indicate a location of the paging SS, and the location may be given as an offset value. The DCI indicates a SS other than an original paging SS period. The paging indication information may be included in a specific field of DCI with 1-bit size, or indicated to a state of the specific field, or indirectly signaled depending on whether paging PDSCH scheduling information is included. If the paging SS includes direct indication information indicating a system information (SI) change, etc., the paging indication information may be replaced by the direct indication information, and all or some of remaining DCI contents except a paging/direct indication field may be replaced by direct indication related information. In this instance, the direct indication related information may mean SI modification information, earthquake tsunami warning system (ETWS) information, commercial mobile alert service (CMAS) information, and the like.

The paging/direct indication information may be 1-bit flag form, and the UE may differently interpret the DCI content depending on a value of the corresponding field.

The above-described methods (the methods 1 and 2) may be applied to not all the PUR SSS configured from the base station but some PUR SSS depending on a relationship with the PUR. For example, if a period of the PUR SS is less than a period of the PUR, all or some of the PUR SSS may be included from X subframe (or slot or millisecond (ms)) before the PUR to Y subframe (or slot or ms) after the PUR. In this instance, values of X and Y may be a fixed specific value described on the standard spec, or a value configured via higher layer, or zero depending on whether or not the PUR is transmitted.

In the above-described methods (the methods 1 and 2), if a wake-up signal or a go-to-sleep signal, etc. for the paging SS precedes, the paging SS may include a wake-up signal duration or a go-to-sleep signal duration.

In the above-described methods (the methods 1 and 2), when the number of subframes or slots constituting the paging SS or the paging PDSCH is T, and the number of subframes or slots constituting the PUR SS among these is O, a ratio of T to O is greater than or equal to a specific value, the above-described methods may be applied. In other words, the above-described methods may be applied based on a ratio of subframes or slots constituting the paging SS or the paging PDSCH to subframes or slots overlapping with the PUR SS among the subframes or the slots constituting the paging SS or the paging PDSCH.

For example, if O/T is greater than or equal to Z (O/T>Z), the above-described methods may be applied. In this instance, Z may be a fixed specific value (e.g., 0.5), and may be a value differently defined depending on T, i.e., the repetition number of the paging SS or the paging PDSCH. This may be defined in the form of a separate table.

In addition, in the method of dropping or skipping the PUR transmission in the above-described method 1, only when the collision of the PUR is greater than or equal to a predetermined ratio, the PUR transmission may be dropped or skipped.

The methods 1 and 2 relate to an operation of performing the PUR transmission when a collision occurs between the PUR related operation and the paging related operation. The PUR transmission is an operation of the UE in Idle_state, and an available channel in the Idle_state is two channels including a PUR related channel and a paging related channel. Thus, when a collision occurs between the two channels, the UE may perform transmission using a PUR channel, and the PUR channel may include paging related information. This is to prevent an unnecessary latency that may occur until the paging related information that is periodically transmitted at predetermined intervals is again received.

There is a problem in that if the UE is transitioned to RRC_state and provides the paging related information, an unnecessary latency, power consumption, and signaling overhead may occur. Therefore, if the UE in RRC_Idle state receives the paging related information, there is an effect capable of solving this problem.

(Method 3)

Method 3 relates to a method of solving a collision when the collision occurs between a PUR and other channel and/or SS.

(Method 3-1)

Method 3-1 relates to a method of solving a collision when the collision occurs between a paging SS and/or a paging PDSCH.

Specifically, the method 3-1 is a method of configuring a period and a start point of a PUR considering a period and a location of a paging subframe or a paging occasion (PO) configured to a UE when the PUR and a SS are UE-specific configured.

For example, the period of the PUR may be configured/limited to N times (where N is an integer) a paging cycle (e.g., any one value of 32, 64, 128, and 256 radio frames) of the UE, and a start point or an end point of the period of the PUR may be configured/limited so that it is located equal to or before X subframe (or slot or ms) from the PO of the UE.

The paging cycle may be a cell-specific and/or UE-specific configured value. When the paging cycle is simultaneously cell-specific and UE-specific configured, the paging cycle may be the smaller value of a cell-specific configured value and a UE-specific configured value. A location of the PO may be determined depending on the paging cycle, the number of paging subframes per paging cycle, an ID (UEID) of the UE, etc. The number of paging subframes per paging cycle may be configured via higher layer, and the UEID may be the remainder (IMSI mod 1024) of dividing an international mobile subscriber identity (IMSI) of the UE by 1024.

A base station may determine the period and the start point/end point of the PUR considering the paging subframe, the period and the location of the PO, etc., and the N value and the X value may be dynamically configured/reconfigured to the UE via higher layer. In this instance, the X value may be a fixed specific value described on the standard spec.

If the start point of the PUR is determined based on the PO, a length or a duration of a PUR time resource may be configured so that the end point of the PUR is located equal to or before Y subframe (or slot or ms) from the PO, in order to avoid a collision between the PUR and the paging SS and/or the paging PDSCH.

If the end point of the PUR is determined based on the PO, the UE may determine the PUR start point based on the configured length or duration of the PUR time resource.

(Method 4)

Method 4 is a method of determining which data is transmitted/received when a collision occurs between a PUR and other resource (e.g., transmission/reception resource, SS, etc.).

Specifically, the method 4 is a method of determining a priority depending on a period of a resource that that is expected to be transmitted or received. For example, when comparing a transmission/reception priority between the PUR and the paging, a channel or a signal transmitted using a resource with a large period may be prioritized and transmitted/received by comparing a PUR period and a paging cycle (or period).

For example, if the above-described method is used, the paging cycle may be set to 128 radio frames (1.28 sec), and there may be a situation where the IoT UE shall perform an uplink report one every specific time (e.g., few hours) using the PUR in the RRC_IDLE state. In this instance, since intermittently received uplink data is prioritized, and the base station receives the uplink data, there is an effect of preventing an excessive latency in data collection. In addition, this method can reduce a latency effect by transmitting/receiving the paging on the resource with a period after the collision.

The transmission/reception period of data may be configured depending on a type of data. For example, data (e.g., URLLC) in which the latency is important may be configured to have a short period, and hence, a channel or a signal transmitted on a resource with a short period may be configured to be preferentially transmitted/received. As a result, there is an effect in that data requiring a low latency can be preferentially transmitted/received.

The operation method, the collision avoiding method, etc. when the collision occurs between the uplink transmission (e.g., PUR transmission) and the downlink transmission may not be applied to a full duplex UE, or applied only to a half duplex UE.

The methods or the operations of the present disclosure described above have described from a "UE" or "base station" perspective, but the methods or the operations can be performed or implemented by a transmitting or receiving device, a (digital signal) processor, a microprocessor, etc. to be described later, instead of the "UE" and "base station". Further, the "UE" is a general term and can be used interchangeably with a device with mobility, such as a mobile station (MS), a user equipment (UE), and a mobile terminal, and the "base station" is a general term and can be used interchangeably with a device such as a base station (BS), evolved NodeB (eNB), next generation-eNode B (ng-eNB), and next generation NodeB (gNB).

Since examples of the above-described proposal methods can also be included as one of the implementation methods of the present disclosure, it is obvious that the examples can be considered as a type of proposal methods. Further, the above-described proposal methods may be independently implemented, but may be implemented in the form of a combination (or merge) of some proposal methods. A rule may be defined so that the base station informs the UE of information about whether to apply the proposal methods (or information on rules of the proposal methods) via pre-defined signaling (e.g., physical layer signaling or upper layer signaling). In addition, the proposal methods described in the methods of the present disclosure and methods extensible from the proposal methods can be implemented by a device, and the present disclosure includes the content of the device implementing the proposal methods. The corresponding device is described below with reference to figures attached thereto.

The UE/base station described in the present disclosure, as illustrated in FIGS. 35 to 39, may be replaced by various devices and applied.

FIG. 27 is a flow chart illustrating an operation process in a UE performing a preconfigured uplink resource (PUR) transmission using a PUR in a wireless communication system according to an embodiment of the present disclosure.

First, a UE receives, from a base station, information related to a PUR transmission, in S2710.

In this instance, the information related to the PUR transmission may include information for a PUR and a PUR search space (SS).

The UE receives information for a first paging SS from the base station, in S2720.

The UE performs the PUR transmission on the base station using the PUR, in S2730.

The UE receives, from the base station, downlink control information (DCI) according to the PUR transmission, in S2740.

In this instance, the PUR or the PUR SS and the first paging SS or a resource of a preconfigured first paging physical downlink shared channel (PDSCH) overlap, and the DCI may include at least one of paging indication information, scheduling information of a second paging PDSCH, and location information of a second paging SS.

The second paging SS and the first paging SS may be different from each other.

When the PUR SS and the first paging SS overlap, monitoring for paging in the first paging SS may not be performed.

The DCI may further include feedback information for the PUR transmission.

The DCI may be transmitted on the PUR SS.

The feedback information may be ACK/NACK information indicating whether the PUR transmission is successful.

The paging indication information may be included in a field with 1-bit size of the DCI.

The PUR transmission may be performed in a RRC idle state.

A ratio of a first resource constituting the first paging SS to a second resource, that overlaps the first resource and constitutes the PUR SS, or the resource of the preconfigured first paging PDSCH may be greater than or equal to a preset value.

The preset value may be determined based on the first resource.

When the PUR SS and the resource of the preconfigured first paging PDSCH overlap, the preconfigured first paging PDSCH is not received, and the resource of the preconfigured first paging PDSCH may be received on the first paging SS.

With reference to FIGS. 35 to 39, a UE performing a preconfigured uplink resource (PUR) transmission using a PUR in a wireless communication system described in the present disclosure is described below.

The UE may include one or more transceivers configured to transmit and receive a radio signal, one or more processors operatively connected to the transceivers, and one or more memories connected to the one or more processors and configured to store instructions for operations executed by the one or more processors.

The operations executed by the one or more processors may be the same as the above-described operations related to FIG. 27.

FIG. 28 is a flow chart illustrating an operation process in a base station receiving a preconfigured uplink resource (PUR) transmission using a PUR in a wireless communication system according to an embodiment of the present disclosure.

First, a base station transmits, to a UE, information related to a PUR transmission, in S2810.

In this instance, the information related to the PUR transmission may include information for a PUR and a PUR search space (SS).

The base station transmits information for a first paging SS to the UE, in S2820.

The base station receives, from the UE, the PUR transmission transmitted using the PUR, in S2830.

Thereafter, the base station transmits, to the UE, downlink control information (DCI) according to the PUR transmission, in S2840.

In this instance, the PUR SS and the first paging SS or a resource of a preconfigured first paging PDSCH overlap, and the DCI may include at least one of paging indication information, scheduling information of a second paging PDSCH, and location information of a second paging SS.

The second paging SS and the first paging SS may be different from each other.

With reference to FIGS. 35 to 39, a base station receiving a preconfigured uplink resource (PUR) transmission using a PUR in a wireless communication system described in the present disclosure is described below.

The base station may include one or more transceivers configured to transmit and receive a radio signal, one or more processors operatively connected to the transceivers, and one or more memories connected to the one or more processors and configured to store instructions for operations executed by the one or more processors.

The operations executed by the one or more processors may be the same as the above-described operations related to FIG. 28.

The UE/base station described in the present disclosure, as illustrated in FIGS. 35 to 39, may be replaced by various devices and applied.

For example, operations performing/receiving a preconfigured uplink resource (PUR) transmission using a PUR in a wireless communication system of the UE/base station described in FIGS. 27 and 28 may be implemented by a device of FIGS. 35 to 39 described below. For example, referring to FIG. 36, one or more processors 3612 and 3622 may control one or more memories 3614 and 3624 and/or one or more transceivers 3616 and 3626, or the like, in order to receive related information. The one or more transceivers 3616 and 3626 may transmit related information.

Operations related to a method performing/receiving a preconfigured uplink resource (PUR) transmission using a PUR in a wireless communication system of the UE/base station described above may be implemented by a device (e.g., FIGS. 35 to 39) described below. For example, operations related to a method of performing uplink transmission/reception on the PUR may be processed by one or more processors 3612 and 3622 of FIGS. 35 to 39, and the operations related to the method of performing uplink transmission/reception on the PUR may store commands/programs (e.g., instructions, executable codes) for driving one or more processors 3612 and 3622 of FIGS. 35 to 39 in the memories 3614 and 3624.

For example, in a device including one or more memories and one or more processors operatively connected to the one or more memories, the one or more processors may be configured to allow the device to receive, from a base station, information related to a PUR transmission, the information related to the PUR transmission including information for a PUR and a PUR search space (SS), receive information for a first paging SS from the base station, perform the PUR transmission on the base station using the PUR, and receive, from the base station, downlink control information (DCI) according to the PUR transmission, wherein the PUR or the PUR SS and the first paging SS or a resource of a preconfigured first paging PDSCH overlap, wherein the DCI includes at least one of paging indication information, scheduling information of a second paging PDSCH, and location information of a second paging SS, and wherein the second paging SS and the first paging SS are different from each other.

As another example, in a non-transitory computer readable medium (CRM) storing one or more commands, one or more commands executable by one or more processors may allow a UE to receive, from a base station, information related to a PUR transmission, the information related to the PUR transmission including information for a PUR and a PUR search space (SS), receive information for a first paging SS from the base station, perform the PUR transmission on the base station using the PUR, and receive, from the base station, downlink control information (DCI) according to the PUR transmission, wherein the PUR or the PUR SS and the first paging SS or a resource of a preconfigured first paging PDSCH overlap, wherein the DCI includes at least one of paging indication information, scheduling information of a second paging PDSCH, and location information of a second paging SS, and wherein the second paging SS and the first paging SS are different from each other.

Network Access and Communication Process

A UE may perform a network access process in order to perform the procedures and/or methods described/proposed above. For example, the UE may receive system information and configuration information required to perform the procedures and/or methods described/proposed above and store them in a memory while accessing a network (e.g., base station). The configuration information required for the present disclosure may be received via higher layer (e.g., RRC layer; medium access control (MAC) layer, etc.) signaling.

FIG. 29 illustrates network initial access and subsequent communication process to which the present disclosure is applicable.

FIG. 29 illustrates network initial access and subsequent communication process. In NR, a physical channel and a reference signal may be transmitted using beamforming. If beamforming based signal transmission is supported, a beam management process for aligning beams between the base station and the UE may be involved. Signals proposed in the present disclosure may be transmitted/received using beamforming. The beam alignment in a radio resource control (RRC)_IDLE mode may be performed based on SSB. On the other hand, the beam alignment in an RRC_CONNECTED mode may be performed based on CSI-RS (in DL) and SRS (in UL). If the beamforming based signal transmission is not supported, the operation related to the beam may be omitted in the following description.

Referring to FIG. 29, a base station (e.g., BS) may periodically transmit SSB (S702). Here, the SSB includes PSS/SSS/PBCH. The SSB may be transmitted using beam sweeping (see FIG. 24). The PBCH may include a master information block (MIB), and the MIB may include scheduling information about remaining minimum system information (RMSI). Thereafter, the base station may transmit the RMSI and other system information (OSI) (S704). The RMSI may include information (e.g., PRACH configuration information) required for the UE to initially access the base station. The UE detects the SSB and then identifies the best SSB. Thereafter, the UE may transmit RACH preamble (Message 1, Msg1) to the base station using PRACH resource linked/corresponding to an index (i.e., beam) of the best SSB (S706). A beam direction of the RACH preamble is associated with the PRACH resource. The association between the PRACH resource (and/or RACH preamble) and the SSB (index) may be configured via system information (e.g., RMSI). Thereafter, as part of the RACH procedure, the base station may transmit a random access response (RAR) (Msg2) as a response to the RACH preamble (S708), the UE may transmit Msg3 (e.g., RRC connection request) using UL grant within the RAR (S710), and the base station may send a contention resolution message (Msg4) (S720). The Msg4 may include RRC connection setup.

If RRC connection is configured between the base station and the UE through the RACH procedure, a subsequent beam alignment may be performed based on SSB/CSI-RS (in DL) and SRS (in UL). For example, the UE may receive SSB/CSI-RS (S714). The SSB/CSI-RS may be used by the UE to generate beam/CSI report. The base station may request the UE to report beam/CSI via DCI (S716). In this case, the UE may generate the beam/CSI report based on SSB/CSI-RS and transmit the generated beam/CSI report to the base station on PUSCH/PUCCH (S718). The beam/CSI report may include information about preferred beams, etc., as a result of beam measurement. The base station and the UE may switch the beam based on the beam/CSI report (S720a and S720b).

Next, the UE and the base station may perform the procedures and/or methods described/proposed above. For example, the UE and the base station may, based on the configuration information obtained from the network access process (e.g., system information acquisition process, RRC connection process on RACH, etc.), process information of the memory according to the proposal of the present disclosure to transmit a radio signal, or process a received radio signal to store it in the memory. Here, the radio signal may include at least one of PDCCH, PDSCH, and a reference signal (RS) in downlink, and may include at least one of PUCCH, PUSCH, and SRS in uplink.

The content described above may be basically applied commonly to MTC and NB-IoT. The content that may be changed in MTC and NB-IoT is additionally described below.

MTC Network Access Process

An MTC network access process based on LTE is additionally described. The following description may be extended and applied to NR. A MIB in LTE includes ten reserved bits. Five most significant bits (MSBs) of the ten reserved bits within the MIB in the MTC are used to indicate scheduling information for SIB1-BR (System Information Block for bandwidth reduced device). The five MSBs are used to indicate the repetition number of SIB1-BR and a transport block size (TBS). The SIB1-BR is transmitted on PDSCH. The SIB1-BR may not change in 512 radio frames (5120 ms) to allow a combination of a plurality of subframes. Information carried on the SIB1-BR is similar to SIB1 of the LTE system.

An MTC RACH procedure is basically the same as an LTE RACH procedure and is different from the LTE RACH procedure in the following details: the MTC RACH procedure is performed based on a coverage enhancement (CE) level. For example, for PRACH coverage enhancement, whether to repeatedly transmit the PRACH and/or the number of PRACH repetition transmissions may vary per CE level.

Table 10 shows CE mode/level supported in the MTC. The MTC supports two modes (CE mode A and CE mode B) and four levels 1 to 4 for coverage enhancement.

TABLE 10

| Mode | Level | Description |
| --- | --- | --- |
| Mode A | Level 1 | No repetition |
|  | Level 2 | Small Number of Repetition |
| Mode B | Level 3 | Medium Number of Repetition |
|  | Level 4 | Large Number of Repetition |

The CE mode A is a mode for small coverage enhancement in which full mobility and CSI feedback are supported, and may be configured with no repetition or the small number of repetitions. The CE mode B is a mode for a UE of extremely poor coverage conditions in which CSI feedback and limited mobility are supported, and may be configured with the large number of repetitions.

The base station may broadcast system information including a plurality of (e.g., three) reference signal received power (RSRP) thresholds, and the UE may determine the CE level by comparing the RSRP thresholds and RSRP measurement values. The following information may be independently configured per CE level through system information.

PRACH resource information: period/offset of PRACH opportunity and PRACH frequency resource Preamble group: a set of preambles allocated to each CE level The number of repetitions per preamble attempt and the maximum number of preamble attempts RAR window time: length of time duration in which RAR reception is expected (e.g., the number of subframes)

Contention resolution window time: length of time duration in which reception of a contention resolution message is expected The UE may select a PRACH resource corresponding to the CE level of the UE, and then perform PRACH transmission based on the selected PRACH resource. A PRACH waveform used in the MTC is the same as a PRACH waveform used in the LTE (e.g., OFDM and Zadoff-Chu sequence). Signals/messages transmitted after the PRACH may be repeatedly transmitted, and the number of repetitions may be independently configured depending on the CE mode/level.

NB-IoT Network Access Process

An NB-IoT network access process based on LTE is additionally described. The following description may be extended and applied to NR. The PSS, SSS and PBCH of S702 in FIG. 29 are replaced by NPSS, NSSS and NPBCH in NB-IoT, respectively. The details for the NPSS, NSSS and NPBCH may refer to FIG. 24.

An NB-IoT RACH procedure is basically the same as the LTE RACH procedure and is different from the LTE RACH procedure in the following details. Firstly, they have a difference in a RACH preamble format. While a preamble in LTE is based on code/sequence (e.g., zadoff-chu sequence), a preamble in NB-IoT is a subcarrier. Secondly, the NB-IoT RACH procedure is performed based on the CE level. Thus, the PRACH resource is differently allocated per CE level. Thirdly, since SR resource is not configured in NB-IoT, an uplink resource allocation request in NB-IoT is performed using the RACH procedure.

FIG. 30 illustrates a structure and transmission of NPRACH preamble to which the present disclosure is applicable.

FIG. 30 illustrates preamble transmission on NB-IoT RACH.

Referring to FIG. 30, an NPRACH preamble may consist of four symbol groups, and each symbol group may consist of a CP and a plurality of (e.g., five) SC-FDMA symbols. In NR, the SC-FDMA symbol may be replaced by an OFDM symbol or a DFT-s-OFDM symbol. The NPRACH supports only single-tone transmission with 3.75 kHz subcarrier spacing and offers 66.7 us and 266.67 us length CPs to support different cell radii. Each symbol group performs frequency hopping, and a hopping pattern is as follows. Subcarriers transmitting a first symbol group are determined in a pseudo-random manner. A second symbol group performs 1-subcarrier jump, a third symbol group performs 6-subcarrier jump, and a fourth symbol group performs 1-subcarrier jump. For the repetition transmission, a frequency hopping procedure is repeatedly applied, and the NPRACH preamble can perform the repetition transmission {1, 2, 4, 8, 16, 32, 64, 128} times for coverage enhancement. The NPRACH resource may be configured per CE level. The UE may select the NPRACH resource based on the CE level determined depending on a downlink measurement result (e.g., RSRP), and transmit a RACH preamble using the selected NPRACH resource. The NPRACH may be transmitted on an anchor carrier, or transmitted on a non-anchor carrier in which the NPRACH resource is configured.

Discontinuous Reception (DRX) Operation

A UE may perform a DRX operation while performing the procedures and/or methods described/proposed above. The UE, to which the DRX is configured, discontinuously receives a DL signal and can reduce power consumption. The DRX may be performed in a radio resource control (RRC)_IDLE state, an RRC_INACTIVE state, and an RRC_ CONNECTED state.

RRC_CONNECTED DRX

In the RRC_CONNECTED state, the DRX is used for discontinuous reception of the PDCCH. For convenience, the DRX performed in the RRC_CONNECTED state is referred to as RRC_CONNECTED DRX.

FIG. 31 illustrates a DRX cycle for discontinuous reception of PDCCH.

Referring to FIG. 31, a DRX cycle consists of On Duration and Opportunity for DRX. The DRX cycle defines a time interval in which the On Duration is periodically repeated. The On Duration represents a time interval which the UE monitors in order to receive the PDCCH (or MPDCCH or NPDCCH). If the DRX is configured, the UE monitors the PDCCH during the On-duration. If there is a PDCCH which is successfully detected while monitoring the PDCCH, the UE runs an inactivity timer and maintains an awake state. On the other hand, if there is no PDCCH which is successfully detected while monitoring the PDCCH, the UE enters a sleep state after the On Duration ends. Therefore, if the DRX is configured, the PDCCH monitoring/reception may be discontinuously performed in the time domain in performing the procedures and/or methods described/proposed above. For example, if the DRX is configured, the PDCCH monitoring in the present disclosure may be discontinuously performed according to the DRX configuration in an activated cell(s). Specifically, if a PDCCH occasion (e.g., a time duration configured to monitor the PDCCH (e.g., one or more consecutive OFDM symbols)) corresponds to the On Duration, the PDCCH monitoring may be performed, and if the PDCCH occasion corresponds to the Opportunity for DRX, the PDCCH monitoring may be omitted. On the other hand, if the DRX is not configured, PDCCH monitoring/reception may be continuously performed in the time domain in performing the procedures and/or methods described/proposed above. For example, if the DRX is not configured, the PDCCH reception occasion in the present disclosure may be continuously configured. Regardless of whether the DRX is configured, the PDCCH monitoring may be limited in the time duration configured as a measurement gap.

Table 11 represents a process of the UE related to the DRX (RRC_CONNECTED state). Referring to Table 11, DRX configuration information is received via higher layer (e.g., RRC) signaling, and whether the DRX is on or off is controlled by a DRX command of an MAC layer. If the DRX is configured, the UE, as illustrated in FIG. 31, may discontinuously monitor the PDCCH in performing the procedures and/or methods described/proposed in the present disclosure.

TABLE 11

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

Here, MAC-CellGroupConfig includes configuration information required for configuring a medium access control (MAC) parameter for a cell group. MAC-CellGroupConfig may include configuration information for the DRX. For example, MAC-CellGroupConfig may include information as follows when defining the DRX.

Value of drx-OnDurationTimer: Defining a length of a start duration of the DRX cycle Value of drx-InactivityTimer: Defining a length of a time duration in which the UE is in an awake state after a PDCCH occasion in which a PDCCH indicating initial UL or DL data is detected Value of drx-HARQ-RTT-TimerDL: Defining a length of a maximum time duration until DL retransmission is received after DL initial transmission is received Value of drx-HARQ-RTT-TimerDL: Defining the length of a maximum time interval until a grant for UL retransmission is received after a grant for UL initial transmission is received drx-LongCycleStartOffset: Defining a time length and a start time point of the DRX cycle drx-ShortCycle (optional): Defining a time length of a short DRX cycle Here, if any one of drx-OnDurationTimer, drx-InactivityTimer, drx-HARQ-RTT-TimerDL, and drx-HARQ-RTT-TimerDL is running, the UE monitors the PDCCH every PDCCH occasion while maintaining the awake state.

RRC_IDLE DRX

In the RRC_IDLE state and the RRC_INACTIVE state, the DRX is used for discontinuously receiving a paging signal. For convenience, the DRX performed in the RRC_IDLE (or RRC_INACTIVE) state is referred to as RRC_IDLE DRX.

Thus, if the DRX is configured, the PDCCH monitoring/reception may be discontinuously performed in the time domain in performing the procedures and/or methods described/proposed above.

FIG. 32 illustrates a DRX cycle for paging.

Referring to FIG. 32, DRX may be configured for discontinuous reception of a paging signal. The UE may receive DRX configuration information from the base station via higher layer (e.g., RRC) signaling. The DRX configuration information may include configuration information for a DRX cycle, a DRX offset, and DRX timer, etc. The UE repeats On Duration and Sleep Duration according to the DRX cycle. The UE may operate in a wakeup mode in the On duration and operate in a sleep mode in the Sleep duration. In the wakeup mode, the UE may monitor a PO in order to receive a paging message. The PO means a time resource/duration (e.g., subframe or slot) in which the UE expects to receive the paging message. PO monitoring includes monitoring PDCCH (or MPDCCH or NPDCCH) (hereinafter, referred to as paging PDCCH) scrambled by P-RNTI in the PO. The paging message may be included in the paging PDCCH or included in a PDSCH scheduled by the paging PDCCH. One or a plurality of PO(s) may be included in a paging frame (PF), and the PF may be periodically configured based on UE ID. Here, the PF may correspond to one radio frame, and the UE ID may be determined based on an international mobile subscriber identity (IMSI) of the UE. If the DRX is configured, the UE monitors only one PO per DRX cycle. If the UE receives the paging message indicating changes in an ID of the UE and/or system information in the PO, the UE may perform a RACH procedure in order to initialize (or reconfigure) connectivity with the base station, or receive (or obtain) new system information from the base station. Thus, in performing the procedure and/or method described/proposed above, the PO monitoring may be discontinuously performed in the time domain in order to perform the RACH for connectivity with the base station or receive (or obtain) the new system information from the base station.

FIG. 33 illustrates an extended DRX (eDRX) cycle.

According to DRX cycle configuration, a maximum cycle duration may be limited to 2.56 seconds. However, for a UE, in which data transmission/reception is intermittently performed, such as an MTC UE or an NB-IoT UE, unnecessary power consumption may occur during the DRX cycle. In order to further reduce power consumption of the UE, a method for greatly extending the DRX cycle based on a power saving mode (PSM) and a paging time window or paging transmission window (PTW) has been introduced, and the extended DRX cycle is simply referred to as an eDRX cycle. Specifically, paging hyper-frames (PH) is periodically configured based on the UE ID, and the PTW is defined in the PH. The UE may perform the DRX cycle in a PTW duration and switch to the wakeup mode in the PO of the UE to monitor the paging signal. The PTW duration may include one or more DRX cycles (e.g., wakeup mode and sleep mode) of FIG. 32. The number of DRX cycles in the PTW duration may be configured via a higher layer (e.g., RRC) signal by the base station.

Wake-Up Signal (WUS)

In MTC and NB-IoT, a WUS may be used to reduce power consumption related to paging monitoring. The WUS is a physical layer signal indicating whether or not a UE monitors a paging signal (e.g., MPDCCH/NPDCCH scrambled by P-RNTI) depending on cell configuration. For a UE to which eDRX is not configured (i.e., only DRX is configured), the WUS may be associated with one PO (N=1). On the other hand, for a UE to which eDRX is configured, the WUS may be associated with one or more POs (N≥1). If the WUS is detected, after the UE is associated with the WUS, the UE may monitor N POs. On the other hand, if the WUS is not detected, the UE may maintain a sleep mode by omitting the PO monitoring until the UE monitors a next WUS.

FIG. 34 illustrates a timing relationship between WUS and PO.

A UE may receive configuration information for WUS from a base station and monitor the WUS based on the WUS configuration information. For example, the configuration information for WUS may include a maximum WUS duration, the number of POs associated with the WUS, gap information, etc. The maximum WUS duration represents a maximum time duration in which the WUS can be transmitted, and may be expressed in a ratio with the maximum repetition number (e.g., Rmax) related to PDCCH (e.g., MPDCCH, NPDCCH). The UE may expect WUS repetition transmission in the maximum WUS duration, but the actual number of WUS transmissions may be less than the maximum number of WUS transmissions in the maximum WUS duration. For example, for a UE in good coverage, the WUS repetition number may be small. For convenience, a resource/occasion on which the WUS can be transmitted in the maximum WUS duration is referred to as a WUS resource. The WUS resource may be defined as a plurality of consecutive OFDM symbols and a plurality of consecutive subcarriers. The WUS resource may be defined as a plurality of consecutive OFDM symbols and a plurality of consecutive subcarriers in a subframe or a slot. For example, the WUS resource may be defined as 14 consecutive OFDM symbols and 12 consecutive subcarriers. The UE detecting the WUS does not monitor the WUS until a first PO associated with the WUS. If the UE fails to detect the WUS during the maximum WUS duration, the UE does not monitor a paging signal in POs associated with the WUS (or the UE remains in a sleep mode).

Example of Communication System to which the Present Disclosure is Applied

Although not limited thereto, but various descriptions, functions, procedures, proposals, methods, and/or operation flowcharts described in the present disclosure can be applied to various fields requiring wireless communication/connection (e.g., 5G) between devices.

Hereinafter, the communication system will be described in more detail with reference to drawings. In the following drawings/descriptions, the same reference numerals will refer to the same or corresponding hardware blocks, software blocks, or functional blocks, if not differently described.

FIG. 35 illustrates a communication system 10000 applied to the present disclosure.

Referring to 35, a communication system 10000 applied to the present disclosure includes a wireless device, a base station, and a network. Here, the wireless device may mean a device that performs communication using a wireless access technology (e.g., 5G new RAT (NR) or long term evolution (LTE)) and may be referred to as a communication/wireless/5G device. Although not limited thereto, the wireless device may include a robot 10000a, vehicles 10000b-1 and 10000b-2, an eXtended Reality (XR) device 10000c, a hand-held device 10000d, a home appliance 10000e, an Internet of Thing (IoT) device 10000f, and an AI device/server 40000. For example, the vehicle may include a vehicle with a wireless communication function, an autonomous vehicle, a vehicle capable of performing inter-vehicle communication, and the like. Further, the vehicle may include an unmanned aerial vehicle (UAV) (e.g., drone). The XR device may include an augmented reality (AR)/virtual reality (VR)/mixed reality (MR) device and may be implemented as a head-mounted device (HMD), a head-up display (HUD) provided in the vehicle, a television, a smart phone, a computer, a wearable device, a home appliance device, digital signage, a vehicle, a robot, etc. The hand-held device may include a smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even as the wireless device, and a specific wireless device 20000a may operate as a base station/network node for other wireless devices.

The wireless devices 10000a to 10000f may be connected to a network 30000 over a base station 20000. An artificial intelligence (AI) technology may be applied to the wireless devices 10000a to 10000f, and the wireless devices 10000a to 10000f may be connected to the AI server 40000 over the network 30000. The network 30000 may be configured using a 3G network, a 4G (e.g., LTE) network, or a 5G (e.g., NR) network. The wireless devices 10000a to 10000f may communicate with each other over the base station 20000/network 30000, but may directly communicate with each other without going through the base station/network (sidelink communication). For example, the vehicles 10000b-1 and 10000b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 10000a to 10000f Wireless communications/connections 15000a, 15000b, and 15000c may be made between the wireless devices 10000a to 10000f and the base station 20000 and between the base station 20000 and the base station 20000. The wireless communication/connection may be made through various wireless access technologies (e.g., 5G NR) such as uplink/downlink communication 15000a, sidelink communication 15000b (or D2D communication), and inter-base station communication 15000c (e.g., relay, integrated access backhaul (IAB)). The wireless device and the base station/ the wireless device and the base station and the base station may transmit/receive radio signals to/from each other through wireless communications/connections 15000a, 15000b, and 15000c. For example, the wireless communications/connections 15000a, 15000b, and 15000c may transmit/receive signals on various physical channels. To this end, based on various descriptions of the present disclosure, at least some of various configuration information setting processes, various signal processing processes (e.g., channel encoding/decoding, modulation/demodulation, resource mapping/de-mapping, etc.), a resource allocation process, etc. for transmission/reception of the radio signal may be performed.

Example of Wireless Device to which the Present Disclosure is Applicable

FIG. 36 illustrates a wireless device applicable to the present disclosure.

Referring to FIG. 36, a first wireless device 3610 and a second wireless device 3620 may transmit and receive radio signals through various wireless access technologies (e.g., LTE and NR). The first wireless device 3610 and the second wireless device 3620 may correspond to the wireless device 10000x and the base station 20000 and/or the wireless device 10000x and the wireless device 1000x of FIG. 35.

The first wireless device 3610 may include one or more processors 3612 and one or more memories 3614 and may further include one or more transceivers 3616 and/or one or more antennas 3618. The processor 3612 may control the memory 3614 and/or the transceiver 3616 and may be configured to implement descriptions, functions, procedures, proposals, methods, and/or operation flowcharts described in the present disclosure. For example, the processor 3612 may process information in the memory 3614 to generate first information/signal, and then transmit a radio signal including the first information/signal through the transceiver 3616. Further, the processor 3612 may receive a radio signal including second information/signal through the transceiver 3616, and then store in the memory 3614 information obtained from signal processing of the second information/signal. The memory 3614 may be connected to the processor 3612 and store various information related to an operation of the processor 3612. For example, the memory 3614 may store a software code including instructions for performing all or some of processes controlled by the processor 3612 or performing the descriptions, functions, procedures, proposals, methods, and/or operation flowcharts described in the present disclosure. The processor 3612 and the memory 3614 may be a part of a communication modem/circuit/chip designed to implement the wireless communication technology (e.g., LTE and NR). The transceiver 3616 may be connected to the processor 3612 and may transmit and/or receive the radio signals via one or more antennas 3618. The transceiver 3616 may include a transmitter and/or a receiver. The transceiver 3616 may be mixed with a radio frequency (RF) unit. In the present disclosure, the wireless device may mean the communication modem/circuit/chip.

The second wireless device 3620 may include one or more processors 3622 and one or more memories 3624 and may further include one or more transceivers 3626 and/or one or more antennas 3628. The processor 3622 may control the memory 3624 and/or the transceiver 3626 and may be configured to implement descriptions, functions, procedures, proposals, methods, and/or operation flowcharts described in the present disclosure. For example, the processor 3622 may process information in the memory 36240 to generate third information/signal and then transmit a radio signal including the third information/signal through the transceiver 3626. Further, the processor 3622 may receive a radio signal including fourth information/signal through the transceiver 3626 and then store in the memory 3624 information obtained from signal processing of the fourth information/signal. The memory 3624 may be connected to the processor 3622 and store various information related to an operation of the processor 3622. For example, the memory 3624 may store a software code including instructions for performing all or some of processes controlled by the processor 3622 or performing the descriptions, functions, procedures, proposals, methods, and/or operation flowcharts described in the present disclosure. The processor 3622 and the memory 3624 may be a part of a communication modem/circuit/chip designated to implement the wireless communication technology (e.g., LTE and NR). The transceiver 3626 may be connected to the processor 3622 and may transmit and/or receive the radio signals through one or more antennas 3628. The transceiver 3626 may include a transmitter and/or a receiver, and the transceiver 3626 may be mixed with the RF unit. In the present disclosure, the wireless device may mean the communication modem/circuit/chip.

Hardware elements of the wireless devices 3610 and 3620 are described in more detail below. Although not limited thereto, one or more protocol layers may be implemented by one or more processors 3612 and 3622. For example, one or more processors 3612 and 3622 may implement one or more layers (e.g., functional layers such as PHY, MAC, RLC, PDCP, RRC, and SDAP). One or more processors 3612 and 3622 may generate one or more protocol data units (PDUs) and/or one or more service data units (SDUs) according to the descriptions, functions, procedures, proposals, methods, and/or operation flowcharts described in the present disclosure. One or more processors 3612 and 3622 may generate a message, control information, data, or information according to the descriptions, functions, procedures, proposals, methods, and/or operation flowcharts described in the present disclosure. One or more processors 3612 and 3622 may generate a signal (e.g., a baseband signal) including the PDU, the SDU, the message, the control information, the data, or the information according to the function, the procedure, the proposal, and/or the method described in the present disclosure, and provide the generated signal to one or more transceivers 3616 and 3626. One or more processors 3612 and 3622 may receive the signal (e.g., baseband signal) from one or more transceivers 3616 and 3626 and acquire the PDU, the SDU, the message, the control information, the data, or the information according to the descriptions, functions, procedures, proposals, methods, and/or operation flowcharts described in the present disclosure.

One or more processors 3612 and 3622 may be referred to as a controller, a microcontroller, a microprocessor, or a microcomputer. One or more processors 3612 and 3622 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 3612 and 3622. The descriptions, functions, procedures, proposals, and/or operation flowcharts described in the present disclosure may be implemented using firmware or software, and the firmware or software may be implemented to include modules, procedures, functions, and the like. Firmware or software configured to perform the descriptions, functions, procedures, proposals, and/or operation flowcharts described in the present disclosure may be included in one or more processors 3612 and 3622 or stored in one or more memories 3614 and 3624 and may be executed by one or more processors 3612 and 3622. The descriptions, functions, procedures, proposals, and/or operation flowcharts described in the present disclosure may be implemented using firmware or software in the form of codes, instructions and/or a set form of instructions.

One or more memories 3614 and 3624 may be connected to one or more processors 3612 and 3622 and may store various types of data, signals, messages, information, programs, codes, indications and/or instructions. One or more memories 3614 and 3624 may be comprised of a ROM, a RAM, an EPROM, a flash memory, a hard drive, a register, a cache memory, a computer reading storage medium and/or a combination thereof. One or more memories 3614 and 3624 may be positioned inside and/or outside one or more processors 3612 and 3622. Further, one or more memories 3614 and 3624 may be connected to one or more processors 3612 and 3622 through various technologies such as wired or wireless connection.

One or more transceivers 3616 and 3626 may transmit to one or more other devices user data, control information, a wireless signal/channel, etc., mentioned in the methods and/or operation flowcharts of the present disclosure. One or more transceivers 3616 and 3626 may receive from one or more other devices user data, control information, a wireless signal/channel, etc., mentioned in the descriptions, functions, procedures, proposals, methods, and/or operation flowcharts described in the present disclosure. For example, one or more transceivers 3616 and 3626 may be connected to one or more processors 3612 and 3622 and transmit and receive the radio signals. For example, one or more processors 3612 and 3622 may control one or more transceivers 3616 and 3626 to transmit the user data, the control information, or the radio signal to one or more other devices. Further, one or more processors 3612 and 3622 may control one or more transceivers 3616 and 3626 to receive the user data, the control information, or the radio signal from one or more other devices. Further, one or more transceivers 3616 and 3626 may be connected to one or more antennas 3618 and 3628, and one or more transceivers 3616 and 3626 may be configured to transmit and receive the user data, control information, wireless signal/channel, etc., mentioned in the descriptions, functions, procedures, proposals, methods, and/or operation flowcharts described in the present disclosure via one or more antennas 3618 and 3628. In the present disclosure, one or more antennas may be a plurality of physical antennas or a plurality of logical antennas (e.g., antenna ports). One or more transceivers 3616 and 3626 may convert the received radio signal/channel from an RF band signal into a baseband signal, in order to process the received user data, control information, radio signal/channel, etc., using one or more processors 3612 and 3622. One or more transceivers 3616 and 3626 may convert the user data, control information, radio signal/channel, etc., processed using one or more processors 3612 and 3622, from the baseband signal into the RF band signal. To this end, one or more transceivers 3616 and 3626 may include an (analog) oscillator and/or filter.

Utilization example of wireless device to which the present disclosure is applicable FIG. 37 illustrates another example of a wireless device applied to the present disclosure. The wireless device may be implemented in various types of devices according to usage examples/services.

Referring to FIG. 37, wireless devices 3701 and 3702 may correspond to the wireless devices 3610 and 3620 of FIG. 36 and may be comprised of various elements, components, units, and/or modules. For example, the wireless devices 3610 and 3620 may include a communication unit 3710, a control unit 3720, and a memory unit 3730, and an additional element 3740. The communication unit 3710 may include a communication circuit 3712 and a transceiver(s) 3714. For example, the communication circuit 3712 may include one or more processors 3612 and 3622 and/or one or more memories 3614 and 3624 of FIG. 36. For example, the transceiver(s) 3714 may include one or more transceivers 3616 and 3626 and/or one or more antennas 3618 and 3628 of FIG. 36. The control unit 3720 is electrically connected to the communication unit 3710, the memory unit 3730, and the additional element 3740 and controls an overall operation of the wireless device. For example, the control unit 3720 may an electrical/mechanical operation of the wireless device based on a program/code/instruction/information stored in the memory unit 3730. Further, the control unit 3720 may transmit the information stored in the memory unit 3730 to the outside (e.g., other communication devices) through the communication unit 3710 via a wireless/wired interface, or store information received from the outside (e.g., other communication devices) via the wireless/wired interface through the communication unit 3710.

The additional element 3740 may be variously configured according to the type of wireless device. For example, the additional element 3740 may include at least one of a power unit/battery, an input/output (I/O) unit, a driving unit, and a computing unit. Although not limited thereto, the wireless device may be implemented as a form such as the robot 10000a of FIG. 35, the vehicles 10000b-1 and 10000b-2 of FIG. 35, the XR device 10000c of FIG. 35, the portable device 10000d of FIG. 35, the home appliance 10000e of FIG. 35, the IoT device 10000f of FIG. 35, a digital broadcasting terminal, a hologram device, a public safety device, an MTC device, a medical device, a FinTech device (or financial device), a security device, a climate/environment device, an AI server/device 40000 of FIG. 35, the base station 20000 of FIG. 35, a network node, etc. The wireless device may be movable or may be used at a fixed place according to use examples/services.

In FIG. 37, all of various elements, components, units, and/or modules in the wireless devices 3701 and 3702 may be interconnected via the wired interface or at least a part may be wirelessly connected via the communication unit 3710. For example, the control unit 3720 and the communication 3710 in the wireless devices 3701 and 3702 may be wiredly connected, and the control unit 3720 and the first unit (e.g., 3730 or 3740) may be wirelessly connected via the communication unit 3710. Further, each element, component, unit, and/or module in the wireless devices 3701 and 3702 may further include one or more elements. For example, the control unit 3720 may consist of a set of one or more processors. For example, the control unit 3720 may consist of a set of a communication control processor, an application processor, an electronic control unit (ECU), a graphic processing processor, a memory control processor, etc. As another example, the memory unit 3730 may consist of a random access memory (RAM), a dynamic RAM (DRAM), a read only memory (ROM), a flash memory, a volatile memory, a non-volatile memory, and/or combinations thereof.

An implementation example of FIG. 37 is described below with reference to figures.

Example of Portable Device to which the Present Disclosure is Applicable

FIG. 38 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a mobile station (MS), a user terminal (UT), a mobile subscriber station (MSS), a subscriber station (SS), an advanced mobile station (AMS), or a wireless terminal (WT).

Referring to FIG. 38, a portable device 3610 may include an antenna unit 3618, a communication unit 3710, a control unit 3720, a memory unit 3730, a power supply unit 3740a, an interface unit 3740b, and an input/output unit 3740c. The antenna unit 3618 may be configured as a part of the communication unit 3710. The blocks 3710 to 3730/3740a to 3740c correspond to the blocks 3710 to 3730/3740 of FIG. 37, respectively.

The communication unit 3710 may transmit/receive a signal (e.g., data, a control signal, etc.) to/from other wireless devices and base stations. The control unit 3720 may perform various operations by controlling components of the portable device 3610. The control unit 3720 may include an application processor (AP). The memory unit 3730 may store data/parameters/programs/codes/instructions required for driving the portable device 3610. Further, the memory unit 3730 may store input/output data/information, etc. The power supply unit 3740a may supply power to the portable device 3610 and include a wired/wireless charging circuit, a battery, and the like. The interface unit 3740b may support a connection between the portable device 3610 and another external device. The interface unit 3740b may include various ports (e.g., an audio input/output port, a video input/output port) for the connection with the external device. The input/output unit 3740c may receive or output a video information/signal, an audio information/signal, data, and/or information input from a user. The input/output unit 3740c may include a camera, a microphone, a user input unit, a display 3740d, a speaker, and/or a haptic module.

For example, in the case of data communication, the input/output unit 3740c may acquire information/signal (e.g., touch, text, voice, image, video, etc.) input from the user, and the acquired information/signal may be stored in the memory unit 3730. The communication unit 3710 may convert the information/signal stored in the memory into the radio signal and directly transmit the radio signal to another wireless device or transmit the radio signal to the base station. Further, the communication unit 3710 may receive the radio signal from another wireless device or the base station and then reconstruct the received radio signal into original information/signal. The reconstructed information/signal may be stored in the memory unit 3730 and then output in various forms (e.g., text, voice, image, video, haptic) through the input/output unit 3740c.

Example of XR Device to which the Present Disclosure is Applied

FIG. 39 illustrates an example of an XR device applied to the present disclosure. The XR device may be implemented as an HMD, a head-up display (HUD) mounted in a vehicle, a television, a smartphone, a computer, a wearable device, a home appliance, a digital signage, a vehicle, a robot, etc.

Referring to FIG. 39, an XR device 10000c may include a communication unit 3710, a control unit 3720, a memory unit 3730, an input/output unit 3740a, a sensor unit 3740b, and a power supply unit 3740c. The blocks 3710 to 3730/3740a to 3740c correspond to the blocks 3710 to 3730/3740 of FIG. 37, respectively.

The communication unit 3710 may transmit and receive signals (e.g., media data, control signal, etc.) to and from external devices such as other wireless devices, handheld devices, or media servers. The media data may include video, images, sound, etc. The control unit 3720 may control components of the XR device 10000c to perform various operations. For example, the control unit 3720 may be configured to control and/or perform procedures such as video/image acquisition, (video/image) encoding, and metadata generation and processing. The memory unit 3720 may store data/parameters/programs/codes/commands required to drive the XR device 10000c/generate an XR object. The input/output unit 3740a may obtain control information, data, etc. from the outside and output the generated XR object. The input/output unit 3740a may include a camera, a microphone, a user input unit, a display, a speaker, and/or a haptic module. The sensor unit 3740b may obtain a state, surrounding environment information, user information, etc. of the XR device. The sensor 3740b may include a proximity sensor, an illumination sensor, an acceleration sensor, a magnetic sensor, a gyro sensor, an inertial sensor, an RGB sensor, an IR sensor, a fingerprint scan sensor, an ultrasonic sensor, a light sensor, a microphone, and/or a radar. The power supply unit 3740c may supply power to the XR device 10000c and include a wired/wireless charging circuit, a battery, etc.

For example, the memory unit 3730 of the XR device 10000c may include information (e.g., data) required to generate the XR object (e.g., an AR/VR/MR object). The input/output unit 3740a may obtain, from a user, a command for manipulating the XR device 10000c, and the control unit 3720 may drive the XR device 10000c according to a driving command of the user. For example, if the user desires to watch a film, news, etc. through the XR device 10000c, the control unit 3720 may transmit content request information to another device (e.g., a handheld device 10000d) or a media server through the communication unit 3710. The communication unit 3710 may download/stream content such as films and news from another device (e.g., the handheld device 10000d) or the media server to the memory unit 3730. The control unit 3720 may control and/or perform procedures, such as video/image acquisition, (video/image) encoding, and metadata generation/processing, for the content and generate/output the XR object based on information about a surrounding space or a real object obtained through the input/output unit 3740a/sensor unit 3740b.

The XR device 10000c may be wirelessly connected to the handheld device 10000d through the communication unit 3710, and the operation of the XR device 10000c may be controlled by the handheld device 10000d. For example, the handheld device 10000d may operate as a controller of the XR device 10000c. To this end, the XR device 10000c may obtain a 3D location information of the handheld device 10000d and generate and output an XR object corresponding to the handheld device 10000d.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR system, the present disclosure can be applied to various wireless communication systems other than the 3GPP LTE/LTE-A/NR system.

The invention claimed is:

1. A method of transmitting, by a user equipment (UE), a physical uplink shared channel (PUSCH) using a preconfigured uplink resource (PUR) in a wireless communication system, the method comprising:
receiving, from a base station, PUR configuration information, wherein the PUR information includes information for the PUR and information for a PUR search space (SS);
receiving, from the base station, information for a paging SS; and
transmitting the PUSCH to the base station using the PUR,
wherein, based on subframes related to the paging SS including a subframe for the PUSCH, monitoring for the paging SS is not performed.

2. The method of claim 1, wherein the subframe for the PUSCH is a subframe in which the UE transmits the PUSCH using the PUR.

3. The method of claim 1, wherein the paging SS is a Type1-common search space.

4. The method of claim 1, further comprising: receiving downlink control information (DCI) based on a transmission of the PUSCH.

5. The method of claim 4, wherein the DCI includes feedback information for a PUSCH transmission using the PUR.

6. The method of claim 4, wherein the DCI includes a cyclic redundancy check (CRC) scrambled by a preconfigured uplink resource-radio network temporary identifier (PUR-RNTI) and is received in the PUR SS.

7. The method of claim 1, wherein a PUSCH transmission is performed in a radio resource control (RRC) idle state.

8. The method of claim 1, wherein the wireless communication system supports a narrowband-internet of things (NB-IoT).

9. The method of claim 8, wherein the PUSCH is a narrowband physical uplink shared channel.

10. A user equipment (UE) configured to transmit a physical uplink shared channel (PUSCH) using a preconfigured uplink resource (PUR) in a wireless communication system, the UE comprising:
a transceiver;
at least one processor; and
at least one memory operably connectable to the at least one processor and storing instructions that, based on being executed by the at least one processor, perform operations comprising:
receiving, from a base station, PUR configuration information, wherein the PUR information includes information for the PUR and information for a PUR search space (SS);
receiving, from the base station, information for a paging SS; and
transmitting the PUSCH to the base station using the PUR,
wherein, based on subframes related to the paging SS including a subframe for the PUSCH, monitoring for the paging SS is not performed.

11. The UE of claim 10, wherein the subframe for the PUSCH is a subframe in which the UE transmits the PUSCH using the PUR.

12. The UE of claim 10, wherein the paging SS is a Type1-common search space.

13. The UE of claim 10, further comprising: receiving downlink control information (DCI) based on a transmission of the PUSCH.

14. The UE of claim 13, wherein the DCI includes feedback information for a PUSCH transmission using the PUR.

15. The UE of claim 13, wherein the DCI includes a cyclic redundancy check (CRC) scrambled by a preconfigured uplink resource-radio network temporary identifier (PUR-RNTI) and is received in the PUR SS.

16. The UE of claim 10, wherein a PUSCH transmission is performed in a radio resource control (RRC) idle state.

17. The UE of claim 10, wherein the wireless communication system supports a narrowband-internet of things (NB-IOT).

18. The UE of claim 10, wherein the PUSCH is a narrowband physical uplink shared channel.

19. A base station configured to receive a physical uplink shared channel (PUSCH) using a preconfigured uplink resource (PUR) in a wireless communication system, the base station comprising:
- a transceiver;
- at least one processor; and
- at least one memory operably connectable to the at least one processor and storing instructions that, based on being executed by the at least one processor, perform operations comprising:
- transmitting, to a user equipment (UE), PUR configuration information, wherein the PUR information includes information for the PUR and information for a PUR search space (SS);
- transmitting, to the UE, information for a paging SS; and
- receiving the PUSCH from the UE using the PUR, wherein, based on subframes related to the paging SS including a subframe for the PUSCH, monitoring for the paging SS is not performed.

20. The base station of claim 19, wherein the subframe for the PUSCH is a subframe in which the UE transmits the PUSCH using the PUR.

* * * * *